United States Patent
Kimura

[11] Patent Number: 5,834,911
[45] Date of Patent: Nov. 10, 1998

[54] BRUSHLESS DC MOTOR CAPABLE OF BEING STARTED STABLY

[75] Inventor: Taizou Kimura, Kusatsu, Japan

[73] Assignee: Daikin Industries, Ltd., Osaka, Japan

[21] Appl. No.: 640,806

[22] PCT Filed: Sep. 11, 1995

[86] PCT No.: PCT/JP95/01794

§ 371 Date: May 3, 1996

§ 102(e) Date: May 3, 1996

[87] PCT Pub. No.: WO96/09689

PCT Pub. Date: Mar. 28, 1996

[30] Foreign Application Priority Data

Sep. 20, 1994 [JP] Japan .................................. 6-224657

[51] Int. Cl.⁶ .................................................. H02P 6/02
[52] U.S. Cl. .......................... 318/254; 318/705; 318/721; 388/815; 388/822
[58] Field of Search .................................... 318/720, 721, 318/722, 723, 254, 599, 716, 705, 801, 439; 388/815, 805, 814, 812, 820, 822

[56] References Cited

U.S. PATENT DOCUMENTS

| | | | |
|---|---|---|---|
| 4,295,085 | 10/1981 | Lafuze | 318/721 |
| 4,565,957 | 1/1986 | Gary et al. | 318/723 |
| 4,591,767 | 5/1986 | Koide | 318/599 |
| 4,641,066 | 2/1987 | Nagata et al. | |
| 4,949,021 | 8/1990 | Rozman et al. | 318/254 |
| 5,512,811 | 4/1996 | Latos et al. | 318/254 |
| 5,581,168 | 12/1996 | Rozman et al. | 318/723 |

FOREIGN PATENT DOCUMENTS

| | | |
|---|---|---|
| 465181A2 | 1/1992 | European Pat. Off. . |
| 495611A2 | 7/1992 | European Pat. Off. . |
| 0556117 | 8/1993 | European Pat. Off. . |
| 571076A1 | 11/1993 | European Pat. Off. . |
| 57-154960 | 11/1983 | Japan . |
| 61-572197 | 8/1986 | Japan . |
| 4304193 | 10/1992 | Japan . |
| 5219784 | 8/1993 | Japan . |

Primary Examiner—John W. Cabeca

[57] ABSTRACT

In a state of synchronous operation in which a voltage and a frequency of an inverter output are increased in a stage of starting, when it is decided that a voltage difference signal is not at a specified level by a voltage difference signal level deciding section (41) or when a comparison result in a mode comparing section (42) signifies that a position signal and an inverter mode do not have a specified relation, a V/F pattern setting section (44) outputs a voltage command signal for lowering the inverter output voltage to a PWM section (54). Meanwhile, when it is decided that the voltage difference signal is at the specified level by the voltage difference signal level deciding section (41) and when the position signal and the inverter mode have the specified relation upon receiving a decision signal from the voltage difference signal level deciding section (41) and a signal representing the comparison result from the mode comparing section (42), a position sensing operation switching section (43) switches an operation switching switch SW from a synchronous operation side to a position sensing operation side.

10 Claims, 37 Drawing Sheets

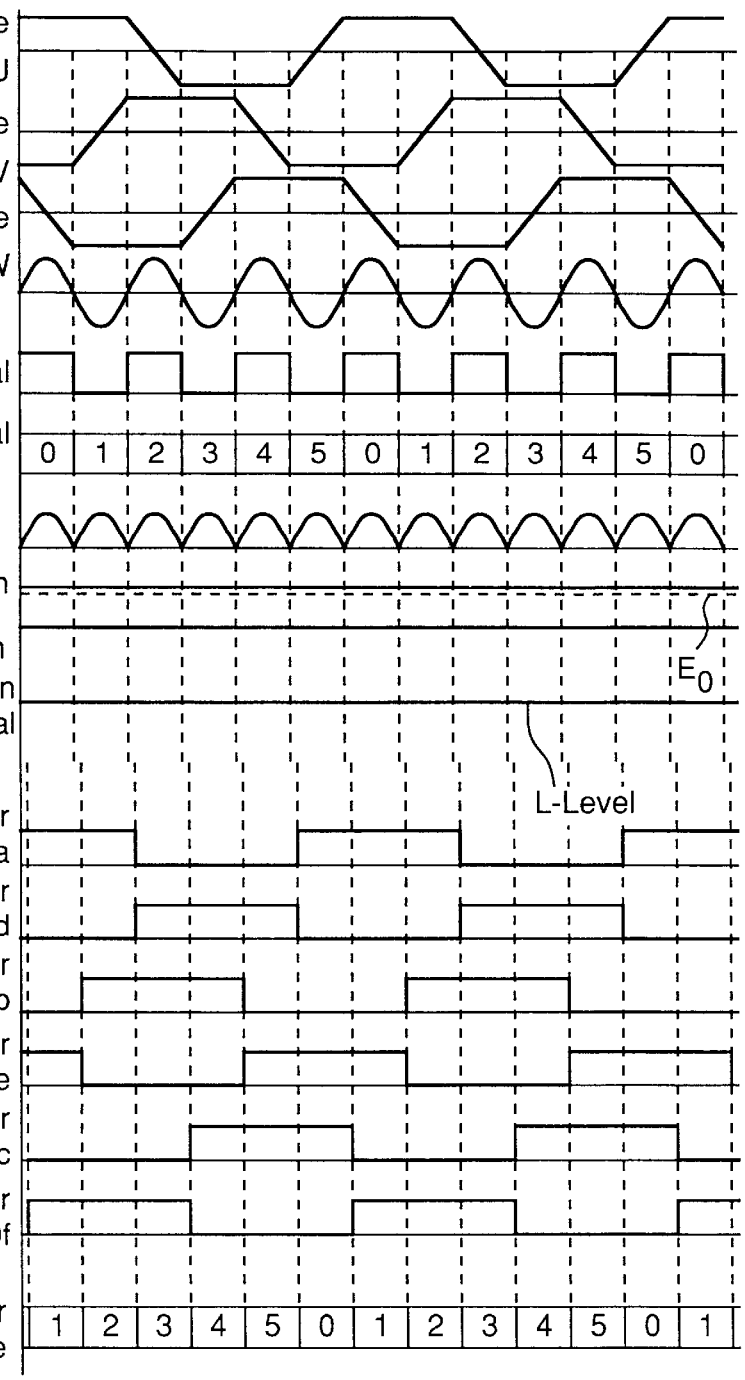

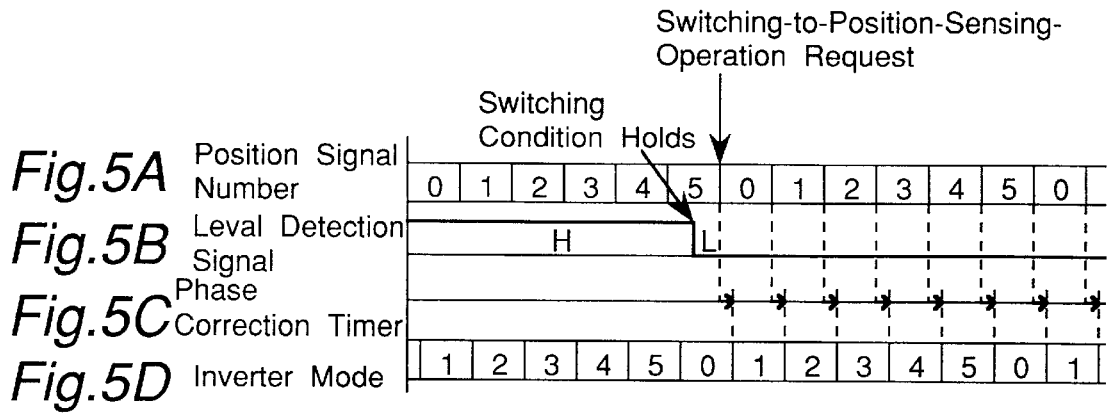
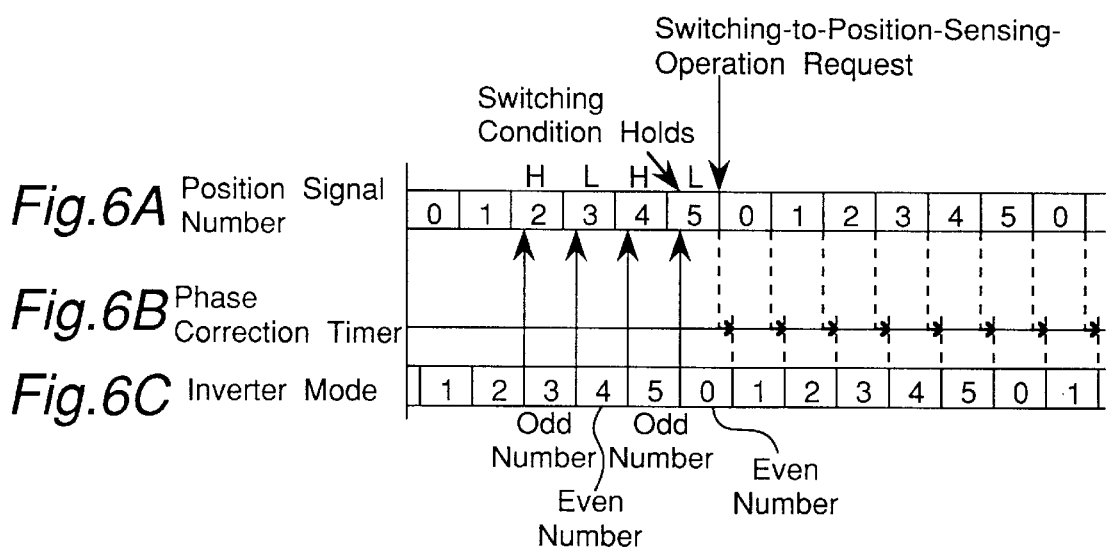
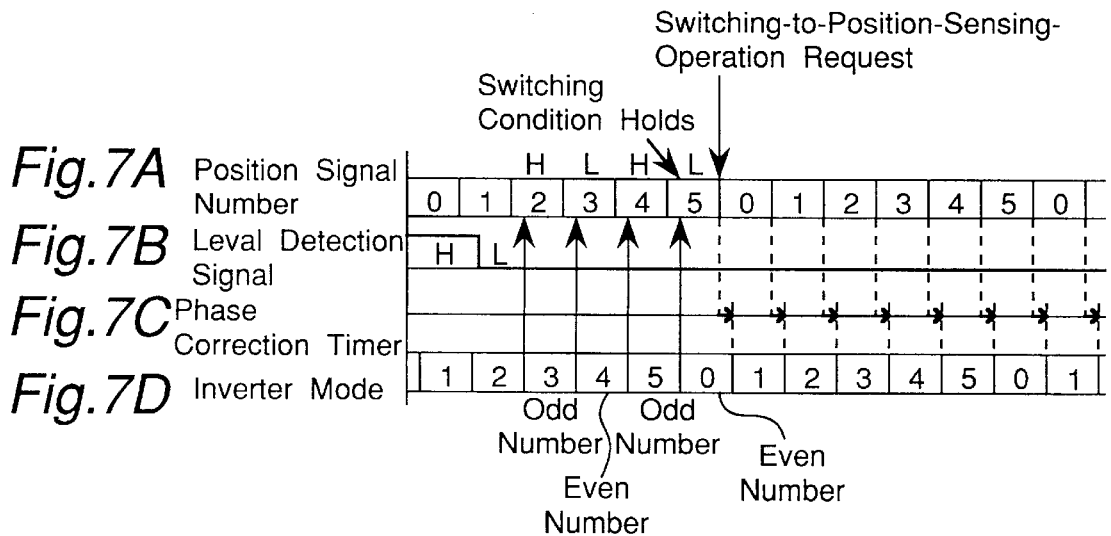

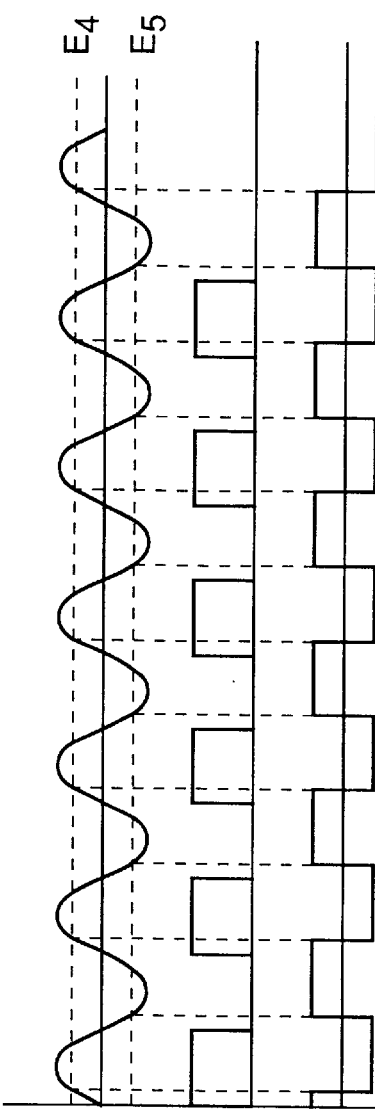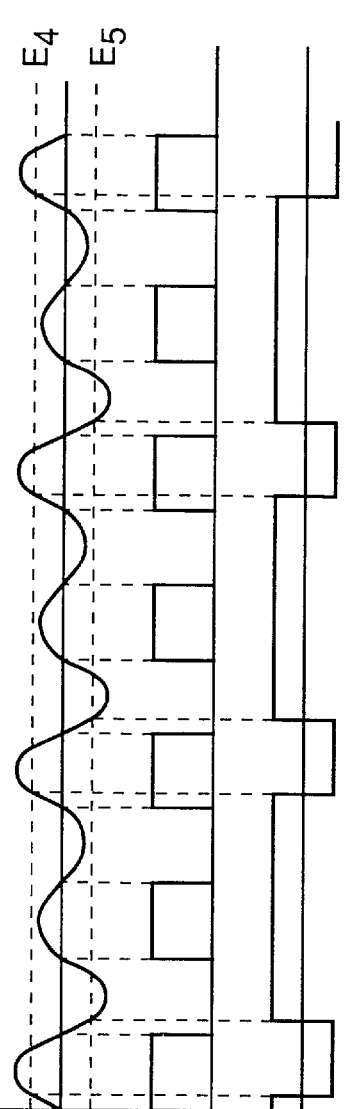
Fig.24A $\int v_{MN}dt$
Fig.24B Position Signal
Fig.24C Level Detection Signal
Fig.24D $\int v_{MN}dt$
Fig.24E Position Signal
Fig.24F Level Detection Signal

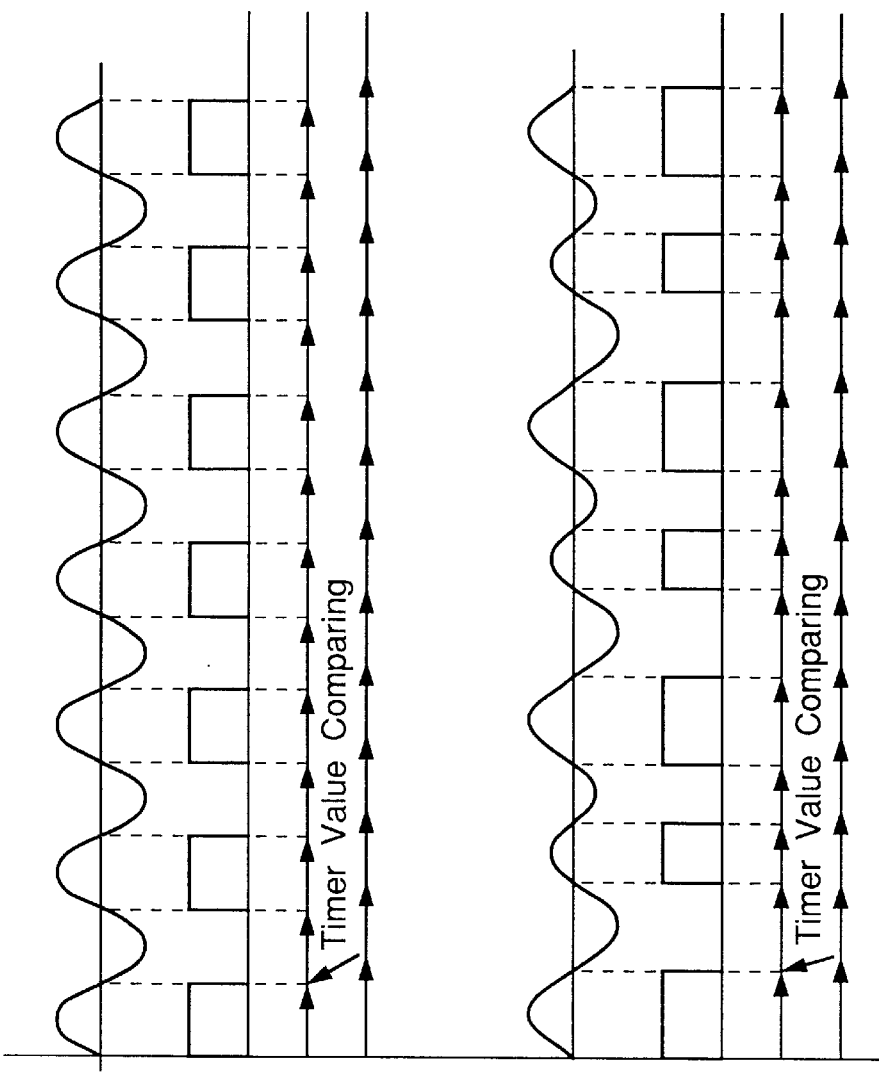
Fig.25A ∫$v_{MN}dt$
Fig.25B Position Signal
Fig.25C Cycle Measuring Timer
Fig.25D Waveform Timer
Fig.25E ∫$v_{MN}dt$
Fig.25F Position Signal
Fig.25G Cycle Measuring Timer
Fig.25H Waveform Timer

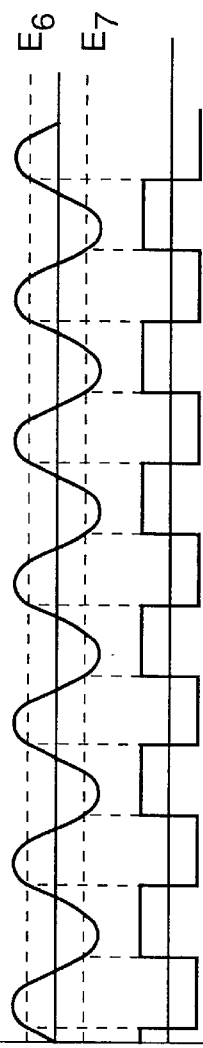
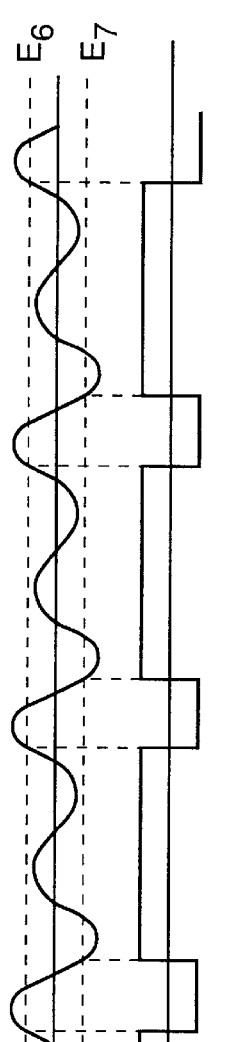
Fig.31A  Fig.31B  Fig.31C  Fig.31D

5,834,911

BRUSHLESS DC MOTOR CAPABLE OF BEING STARTED STABLY

TECHNICAL FIELD

The present invention relates to a brushless DC motor system in which a rotating magnetic field is compulsorily supplied to a rotor in the time of starting to rotate the rotor, and thereafter a voltage pattern of armature coils is changed based on an induction voltage induced at the armature coils.

BACKGROUND ART

As a prior art brushless DC motor system, there is one disclosed in Japanese Patent Publication No. HEI 5-72197. As shown in FIG. 35, the brushless DC motor system includes: a rotor 70 having multipolar permanent magnets; a stator 71 having armature coils 71a, 71b and 71c connected in a three-phase star configuration; a resistor circuit 72 composed of resistors 72a, 72b and 72c connected in a three-phase star configuration in parallel with the armature coils 71a, 71b and 71c, respectively; a rotational-position sensor 73 which detects a rotational-position of the rotor 70 relative to the armature coils 71a, 71b and 71c; a microcomputer 74 which receives a position signal representing the rotational-position of the rotor 70 from the rotational-position sensor 73 and outputs a switching signal to switch a voltage pattern of the armature coils 71a, 71b and 71c; a base drive circuit 75 which receives a switching signal from the microcomputer 74 and outputs a commutation control signal for switchingly controlling the voltage pattern of the armature coils 71a, 71b and 71c; and an inverter section 80 which receives the commutation control signal from the base drive circuit 75 and changes the voltage pattern of the armature coils 71a, 71b and 71c.

The inverter section 80 is comprised of three transistors 80a, 80b and 80c connected to a positive side of a DC power source 76 via a switch 77 and three transistors 80d, 80e and 80f connected to a negative side of the DC power source 76. Collectors of the transistor 80a and the transistor 80d are connected to each other, collectors of the transistor 80b and the transistor 80e are connected to each other, and collectors of the transistor 80c and the transistor 80f are connected to each other. A connection portion of the transistors 80a and 80d is connected to the armature coil 71a of U-phase, a connection portion of the transistors 80b and 80e is connected to the armature coil 71b of V-phase, and a connection portion of the transistors 80c and 80f is connected to the armature coil 71c of W-phase. Then, the commutation control signal from the base drive circuit 75 is inputted to bases of the transistors 80a through 80f of the inverter section 80.

The rotational-position sensor 73 includes: a differential amplifier 81 which receives an input of a voltage $V_M$ at a neutral point of the resistor circuit 72 and a voltage $V_N$ at a neutral point of the armature coils 71a, 71b and 71c, and outputs a voltage difference signal $V_{MN}$ representing a voltage difference between the neutral point of the resistor circuit 72 and the neutral point of the armature coils 71a, 71b and 71c; an integrator 82 which receives the voltage difference signal $V_{MN}$ from the differential amplifier 81 and integrates the voltage difference signal $V_{MN}$; and a zero-cross comparator 83 which receive a signal obtained by integrating the voltage difference signal $V_{MN}$ from the integrator 82, and outputs a position signal. Input terminals of a comparator 84 is connected to both ends of the armature coil 71c, and operates to output a signal representing the polarity of an induced voltage Ew to the microcomputer 74.

In the above-mentioned brushless DC motor system, assuming that motor terminal voltages of the U-phase, V-phase and W-phase from the inverter section 80 are Vu, Vv and Vw and induced voltages of the U-phase, V-phase and W-phase of the armature coils 71a, 71b and 71c are Eu, Ev and Ew, then the voltage $V_M$ at the neutral point of the resistor circuit 72 and the voltage $V_N$ at the neutral point of the armature coils 71a, 71b and 71c are expressed by the equations:

$$V_M=(1/3)(Vu+Vv+Vw)$$

$$V_N=(1/3)\{(Vu-Eu)+(Vv-Ev)+(Vw-Ew)\}$$

Therefore, the voltage difference signal $V_{MN}$ between the neutral point of the resistor circuit 72 and the neutral point of the armature coils 71a, 71b and 71c is expressed by the equation:

$$V_{MN}=V_M-V_N=(1/3)(Eu+Ev+Ew)$$

and thus the voltage difference signal $V_{MN}$ is proportional to a sum of the induced voltages Eu, Ev and Ew of the armature coils 71a, 71b and 71c.

The induced voltages Eu, Ev and Ew of the armature coils 71a, 71b and 71c have trapezoidal waveforms varied in phase at intervals of 180 degrees, and the voltage difference signal $V_{MN}$ has an approximate triangular waveform having a fundamental frequency component which is three times as high as those of the induced voltages Eu, Ev and Ew. A peak point of the triangular wave of the voltage difference signal $V_{MN}$ is used as a voltage pattern changing point. The integrator 82 integrates the voltage difference signal $V_{MN}$ from the differential amplifier 81, and outputs an integral signal $\int V_{MN} dt$ having an approximate sine waveform. Then, the zero-cross comparator 83 detects the zero-crossing point of the integral signal $\int V_{MN} dt$, and outputs a position signal to the microcomputer 74. That is, the peak point of the voltage difference signal $V_{MN}$ varies in amplitude according to the rotation speed, and therefore the voltage difference signal $V_{MN}$ is integrated in detecting the zero-crossing point. The above-mentioned position signal represents the relative position of the rotor 70 relative to the armature coils 71a, 71b and 71c of the stator 71. Then, upon receiving the position signal from the zero-cross comparator 83, the microcomputer 74 outputs a switching signal to the base drive circuit 75. Upon receiving the switching signal from the microcomputer 74, the base drive circuit 75 outputs a commutation control signal to the bases of the transistors 80a through 80f of the inverter section 80. Then, the transistors 80a through 80f of the inverter section 80 are successively turned on to change the voltage pattern of the armature coils 71a, 71b and 71c.

Thus, in the brushless DC motor system, the position signal representing the rotational-position of the rotor 70 is detected from the induced voltages Eu, Ev and Ew of the armature coils 71a, 71b and 71c, and the inverter section 80 changes the voltage pattern of the armature coils 71a, 71b and 71c according to the position signal.

In starting the brushless DC motor, an excitation current is supplied to a specified phase of the armature coils 71a, 71b and 71c for a specified time interval, with which the rotor 70 tries to settle in a stable point by an attraction force exerted between the permanent magnet of the rotor 70 and the stator 71, resulting in generating a damped oscillation about the stable point. When the oscillating rotor 70 has a velocity in a direction in which it is desired to rotate, a position sensing operation for rotating the rotor 70 is effected by changing the voltage pattern of the armature coils 71a, 71b and 71c based on the position signal of the rotational-position sensor 73.

However, when driving an air conditioner or the like, the motor winding receives a maximum voltage of 200 V, and therefore the induced voltage Ew of the armature coil 71c to be inputted to the comparator 84 is required to be reduced through voltage division by means of resistors or the like. For the above-mentioned reasons, the induced voltage Ew has a low level in a low-speed rotation region in the stage of starting, and therefore it is difficult to decide the polarity of the induced voltage Ew by the comparator 84. Furthermore, when the load is a compressor or the like, a load torque exists due to a residual pressure and a friction of a shaft as well as viscous resistances of refrigerant fluid and lubricant oil in the stage of starting. Therefore, it is highly possible that the rotor 70 generates no damped oscillation, and this sometimes hinders the starting of the motor, causing a serious problem in terms of control reliability.

In view of the above, another brushless DC motor system performs a synchronous operation in which an inverter output voltage and an output frequency are increased in a specified pattern in the stage of starting so that the induced voltage increases until the position sensing operation can be effected in a manner as shown in FIG. 36. As shown in FIG. 37, it is required to effect acceleration by sufficiently increasing the inverter output voltage so that a sufficient rotational torque can be obtained to allow a stable acceleration to be achieved even under the residual pressure of a compressor and the fluctuation of a power voltage, and then change the motor operation to the position sensing operation (refer to Japanese Patent Publication No. HEI 1-54960).

However, the above-mentioned technique is effective only by the position sensing means disclosed in the above-mentioned document of Japanese Patent Publication No. HEI 1-54960. According to a position sensing means adopted by the novel technique of the present case, the following problems are there.

FIG. 38 shows a characteristic of an integral signal of the integrator 82 of the rotational-position sensor 73 relative to the inverter output voltage when the frequency of the inverter output is 12 Hz and there is no load in a brushless DC motor system performing a synchronous operation by increasing the inverter output voltage and the output frequency in a specified pattern. FIG. 39 shows a characteristic of the integral signal relative to the inverter output voltage when the frequency of the inverter output is 20 Hz and there is no load. The integral signal of the integrator 82 reduces according as the inverter output voltage increases, and when the inverter output voltage is within a range of $B_1$ and a range of $B_2$, a range in which the level of the integral signal obtained by integrating the voltage difference signal is stable, i.e., a range in which a position sensing operation can be effected based on the voltage difference signal is A. It is to be noted that the voltage of the integral signal in FIGS. 38 and 39 shows a voltage ranging from a peak point to a zero point. When the inverter output voltage is lower than a lower limit of each of the ranges of $B_1$ and $B_2$ in which the position sensing operation can be effected, the motor steps out due to shortage of torque.

FIG. 40 shows waveforms of a motor current and a stable integral signal when the inverter output voltage is 10 V in the case of FIG. 38, while FIG. 41 shows waveforms of a motor current and an unstable integral signal when the inverter output voltage is 20 V in the case of FIG. 38. FIG. 42 shows waveforms of a motor current and a stable integral signal when the inverter output voltage is 15 V in the case of FIG. 39, while FIG. 43 shows waveforms of a motor current and an unstable integral signal when the inverter output voltage is 27 V in the case of FIG. 39. It is to be noted that the axis of abscissas (time base) of each of FIGS. 40, 41, 42 and 43 is charted 20 milliseconds per scale. Thus, when the inverter output voltage is increased so as to increase the rotational torque and achieve a stable acceleration in the stage of starting of the brushless DC motor, the signal of the voltage difference between the neutral point of the armature coils 71a, 71b and 71c and the neutral point of the resistor circuit 72 reduces to become unstable, and this results in a disadvantage that the switching from the synchronous operation to the position sensing operation fails.

Furthermore, when the load varies from a small value to a great value in a manner as shown in FIG. 44, an approximate line representing the characteristic of the integral signal relative to the inverter output voltage shifts approximately parallel in a direction of an arrow R. Therefore, the range of the inverter output voltage when the range in which the level of the integral signal obtained by integrating the voltage difference signal is stable, i.e., the range in which the position sensing operation can be effected based on the voltage difference signal is A shifts from $B_3$ to $B_4$ side at which the inverter output voltage is totally higher than at $B_3$, and a range in which the torque is insufficient becomes $N_2$ in which an upper limit of the inverter output voltage is higher than a range $N_1$.

Further, in order to obtain a specified inverter output voltage when the power voltage fluctuates with a constant load, the commutation control signal is required to be a PWM (Pulse Width Modulation) signal, and a duty ratio thereof must be changed in a manner as shown in FIG. 45. That is, when the power voltage increases above a normal power voltage, it is required to reduce the duty ratio so as to prevent the inverter output voltage from increasing. When the power voltage reduces below the normal power voltage, it is required to increase the duty ratio so as to prevent the inverter output voltage from lowering. However, if there is provided no means for changing the inverter output voltage in response to the power voltage, the inverter output voltage varies depending on the fluctuation of the power voltage, and therefore the characteristic of the integral signal varies.

Since the voltage difference signal varies depending on the load torque and the fluctuation of the power voltage, the inverter output voltage must be set according to the variation or fluctuation, and this results in a problem that the inverter output voltage cannot be set so that the voltage difference signal is put in a stable state.

DISCLOSURE OF THE INVENTION

Accordingly, it is an object of the present invention to provide a brushless DC motor system capable of surely changing a motor operation from the synchronous operation in the stage of starting to the position sensing operation independently of the variation of the load torque and the fluctuation of the power voltage.

In order to achieve the above-mentioned object, the present invention provides a brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising: synchronous operation control means for outputting a voltage and a frequency of an inverter output of the inverter section based on a specified pattern in a stage of starting; position sensing operation control means for controlling the inverter output of the inverter section based on the position signal from the rotational-position sensing means; decision means for deciding whether or not a position sensing operation which uses the position signal from the rotational-position sensing means can be effected when the inverter section is in a state of synchronous operation by the synchronous operation control means; and operation switching means which switches control means of the inverter section from the synchronous operation control means to the position sensing operation control means when the decision means decides that the position sensing operation can be effected.

According to the above-mentioned construction, the voltage and the frequency of the inverter output from the inverter section is outputted based on the specified pattern by the synchronous operation control means in the stage of starting, and after the specified pattern output is completed, the decision means decides, in the state of the synchronous operation, whether or not the position sensing operation based on the position signal from the rotational-position sensing means can be effected. For instance, when the voltage difference signal representing the voltage difference between the neutral point of the armature coils and the neutral point of the resistor circuit is stabilized, the position signal based on the voltage difference signal is also stabilized. Therefore, by deciding whether or not the voltage difference signal is stabilized, it is decided whether or not the position sensing operation based on the position signal can be effected. When the decision means decides that the position sensing operation based on the position signal can be effected, the operation switching means switches the control means from the synchronous operation control means to the position sensing operation control means. Then, the position sensing operation control means controls the inverter output of the inverter section based on the position signal from the rotational-position sensing means.

Therefore, the switching of the motor operation from the synchronous operation in the stage of starting to the position sensing operation can be surely effected, thereby preventing the possible step out attributed to the instability of the voltage difference signal from occurring.

In a brushless DC motor system of an embodiment, the voltage and the frequency of the inverter output of the inverter section is outputted based on the specified pattern by the synchronous operation control means, and when the decision means decides that the position sensing operation cannot be effected after the specified pattern is outputted, the synchronous operation control means reduces a ratio V/F of the voltage V to the frequency F of the inverter output of the inverter section until the decision means decides that the position sensing operation based on the position signal can be effected.

After the specified pattern is outputted by the synchronous operation control means in the stage of starting, the synchronous operation control means reduces the ratio V/F of the voltage V to the frequency F of the inverter output of the inverter section until the position sensing operation based on the position signal from the rotational-position sensing means becomes possible. Therefore, even when the range in which the voltage difference signal is stable varies due to the magnitude of the load or a fluctuation of the power voltage in the stage of starting, the motor operation can be surely switched from the synchronous operation to the position sensing operation.

In a brushless DC motor system of an embodiment, the decision means comprises level decision means for deciding whether or not the voltage difference between the neutral point of the armature coils and the neutral point of the resistor circuit is not smaller than a specified value, and operates, when the level decision means decides that the voltage difference is not smaller than the specified value, to decide that the position sensing operation can be effected.

Therefore, by setting the specified value to a value at which the signal of the voltage difference between the neutral point of the armature coils and the neutral point of the resistor circuit is stable, and making it possible to decide that the voltage difference signal is stable and that the position signal from the rotational-position sensing means based on the voltage difference signal is stable when the voltage difference is not smaller than the specified value, it can be decided that the position sensing operation based on the position signal can be effected.

In a brushless DC motor system of one embodiment, the level decision means comprises rectifying means for rectifying a signal representing the voltage difference between the neutral point of the armature coils and the neutral point of the resistor circuit; smoothing means for smoothing a rectified signal from the rectifying means; and smoothed signal comparing means for comparing a smoothed signal from the smoothing means with a specified reference value. When the smoothed signal comparing means compares the smoothed signal from the smoothing means with the specified reference value and consequently the smoothed signal exceeds the reference value, it is decided that the voltage difference is not smaller than the specified value. It is to be noted that the rectifying means may subject the signal representing the voltage difference to full-wave rectification or half-wave rectification.

Due to the provision of the rectifying means, smoothing means, and the smoothed signal comparing means of the level decision means, when the signal obtained by rectifying and smoothing the signal representing the voltage difference exceeds the reference value, it can be decided that the voltage difference is not smaller than the specified value and consequently that the position signal based on the signal representing the voltage difference is stable.

According to a brushless DC motor system of an embodiment, the level decision means comprises voltage difference signal comparing means for comparing the signal representing the voltage difference between the neutral point of the armature coils and the neutral point of the resistor circuit with specified reference values. When an output signal of the voltage difference signal comparing means obtained by comparing the voltage difference signal with the reference values by the voltage difference signal comparing means has a specified pattern, it is decided that the voltage difference is not smaller than the specified value. For instance, when pulses of the output signal of the voltage difference signal comparing means are in continuity by more than a specified number of pulses at specified intervals, the level decision means decides that the voltage difference is not smaller than the specified value.

Therefore, it can be decided that the voltage difference is not smaller than the specified value and consequently that the position signal based on the signal representing the voltage difference is stable.

According to a brushless DC motor system of an embodiment, when an output signal of a hysteresis comparator obtained by comparing the signal representing the voltage difference between the neutral point of the armature coils and the neutral point of the resistor circuit with specified reference values based on a hysteresis characteristic of the hysteresis comparator has a specified pattern, the level decision means decides that the voltage difference is not smaller than the specified value.

Therefore, by setting the reference value based on the hysteresis characteristic of the hysteresis comparator to a value corresponding to the specified value to be compared with the voltage difference, the level decision means can decide that the voltage difference is not smaller than the specified value when the output signal of the hysteresis comparator has a specified pattern. Furthermore, the level decision means can be simply implemented by the hysteresis comparator using neither a full-wave rectifier circuit nor a plurality of comparators.

In a brushless DC motor system of an embodiment, the decision means comprises position signal mode comparing means for comparing the position signal from the rotational-position sensing means with the inverter output of the inverter section for deciding whether or not the position signal and the inverter output have a specified relation. For instance, the position signal mode comparing means compares the point of change of the voltage pattern of the inverter output with the H- and L-levels of the position signal to decide whether or not the point of change of the voltage pattern coincides with the H- AND L-levels of the position signal a plurality of times. Otherwise, the position signal mode comparing means compares the point of change of the voltage pattern of the inverter output with the point of change of the position signal to decide that the difference between them is in a specified range. When the position signal mode comparing means compares the position signal with the inverter output and finds that the position signal and the inverter output have the specified relation, it is decided that the position sensing operation can be effected.

Therefore, when the position signal mode comparing means decides that the position signal and the inverter output have a specified relation, it can be decided that the position signal from the rotational-position sensing means is stable and consequently that the position sensing operation can be effected.

In a brushless DC motor system of an embodiment, the decision means comprises position signal cycle comparing means for comparing an absolute value of a difference between a value of a cycle of the position signal and a value corresponding to a cycle of a position signal based on a frequency of the inverter output with a specified value for deciding whether or not the absolute value is not greater than the specified value. When the position signal cycle comparing means decides that the absolute value of the difference between the value of the cycle of the position signal and the value corresponding to the cycle of the position signal based on the frequency of the inverter output is not greater than the specified value, it is decided that the position sensing operation can be effected. When the absolute value of the difference between the value of the cycle of the position signal and the value corresponding to the cycle of the position signal based on the frequency of the inverter output is greater than the specified value, the decision means decides that the position sensing operation cannot be effected.

Therefore, with the aid of the position signal cycle comparing means, it can be decided whether or not the position signal based on the voltage difference signal is stable.

In a brushless DC motor system of an embodiment, the rotational-position sensing means comprises voltage difference detecting means for detecting the voltage difference between the neutral point of the armature coils and the neutral point of the resistor circuit to output a voltage difference signal; integration means for integrating the voltage difference signal from the voltage difference detecting means to output an integral signal; and a hysteresis comparator which has a hysteresis characteristic and compares the integral signal from the integration means with specified reference values to output the position signal.

The rotational-position sensing means detects the position signal, and decides by the hysteresis comparator that the voltage difference is not smaller than the specified value and consequently decides that the position signal based on the voltage difference signal is stable. Because the rotational-position sensing means is provided with the comparing means for deciding whether or not the voltage difference is not smaller than the specified value, obviating the need of any additional means for deciding the level of the voltage difference signal, a cost reduction is achieved.

In a brushless DC motor of an embodiment, the decision means comprises at least two of the level decision means, the position signal mode comparing means and the position signal cycle comparing means of the aforementioned embodiments. When at least two of the condition in the level decision means that the voltage difference between the neutral point of the armature coils and the neutral point of the resistor circuit is not smaller than the specified value, the condition in the position signal mode comparing means that the position signal from the rotational-position sensing means and the inverter output of the inverter section have the specified relation, and the condition in the position signal cycle comparing means that the absolute value of the difference between the value of the cycle of the position signal and the value corresponding to the cycle of the position signal based on the frequency of the inverter output is not greater than the specified value are satisfied, the decision means decides that the position sensing operation based on the position signal can be effected.

Therefore, even when a variation of the load or a fluctuation of the power voltage is occurring, it can be decided in response to the variation of the signal representing the voltage difference that the position sensing operation can be effected and the motor operation can be surely switched from the synchronous operation to the position sensing operation.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 4A, 4B, 4C, 4D, 4E, 4F, 4G, 4H, 4I, 4J, 4K, 4L, 4M, 4N, 4O and 4P are charts showing signals at several portions of the above brushless DC motor system;

FIGS. 5A, 5B, 5C and 5D are charts showing the switching to a position sensing operation according to only level decision of the brushless DC motor system of FIG. 1;

FIGS. 6A, 6B and 6C are charts showing switching to the position sensing operation according to only mode comparison of the brushless DC motor system of FIG. 1;

FIGS. 7A, 7B, 7C and 7D are charts showing the switching to the position sensing operation according to the level decision and the mode comparison of the brushless DC motor system of FIG. 1;

FIGS. 24A, 24B, 24C, 24D, 24E and 24F are charts showing signals at several portions of the level detector of the brushless DC motor system of the fourth embodiment;

FIGS. 25A, 25B, 25C, 25D, 25E, 25F, 25G and 25H are charts showing a comparison of a cycle of a position signal with a cycle of a waveform timer in a cycle comparing section of the above brushless DC motor system;

FIGS. 31A, 31B, 31C and 31D are charts showing signals at several portions of the position sensing circuit of the fourth embodiment;

BEST MODE FOR CARRYING OUT THE INVENTION

Embodiments of the brushless DC motor system of the present invention will now be described in detail.
(First Embodiment)

Figure 1:
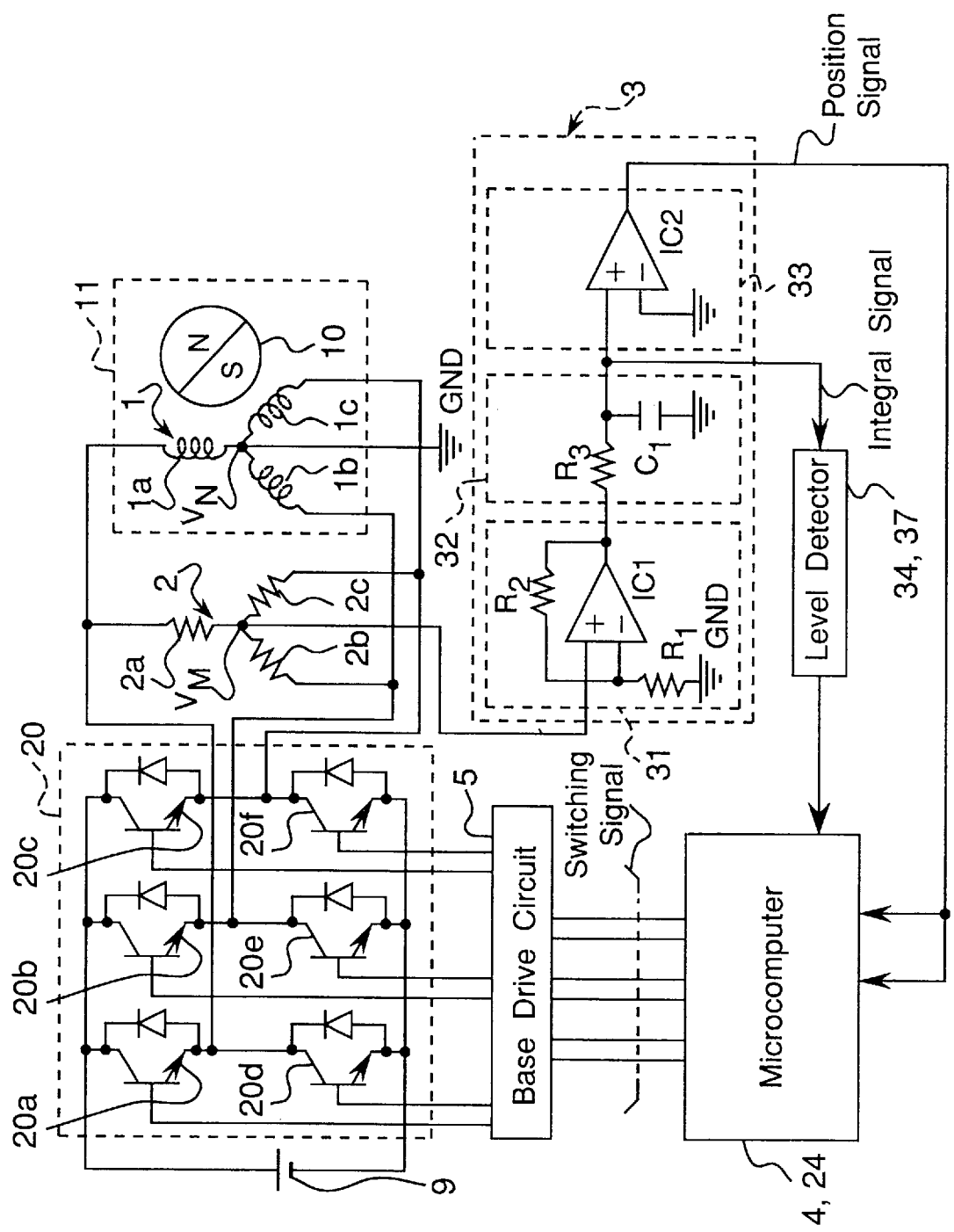
FIG. 1 is a structural diagram of a brushless DC motor system according to a first embodiment of the present invention.

FIG. 1 shows a construction of a brushless DC motor system according to a first embodiment of the present invention including: a stator 1 which has star-connected armature coils 1a, 1b and 1c and rotates a rotor 10 having a plurality of permanent magnets by a rotating magnetic field; a resistor circuit 2 having star-connected resistors 2a, 2b and 2c connected in parallel with the armature coils 1a, 1b and 1c; a rotational-position sensor 3 which serves as rotational-position sensor means for detecting a relative position of a rotor 10 based on a voltage $V_M$ at a neutral point of the resistor circuit 2 and a voltage $V_N$ at a neutral point of the armature coils 1a, 1b and 1c, and outputs a position signal; a microcomputer 4 which receives the position signal from the rotational-position sensor 3 and outputs a switching signal; and a base drive circuit 5 which receives the switching signal from the microcomputer 4 and outputs a commutation control signal. The commutation control signal from the base drive circuit 5 is inputted to an inverter section 20. The stator 1 and the rotor 10 constitute a motor section 11.

The rotational-position sensor 3 includes: a differential amplifier 31 in which the voltage $V_M$ at the neutral point of the resistor circuit 2 is inputted to a non-inverted input terminal of an amplifier IC1, a ground GND is connected to an inverted input terminal of the amplifier IC1 via a resistor $R_1$, and a resistor $R_2$ is connected across an output terminal and the inverted input terminal of the amplifier IC1; an integrator 32 comprised of a resistor $R_3$ of which one end is connected to the output terminal of the differential amplifier 31 and a capacitor $C_1$ connected across the other end of the resistor $R_3$ and the ground GND; and a zero-crossing comparator 33 comprised of an amplifier IC2 where a non-inverted input terminal thereof is connected to the other end of the resistor $R_3$ of the integrator 32, and an inverted input terminal thereof is connected to the ground GND. Further, the neutral point of the armature coils 1a, 1b and 1c is connected to the inverted input terminal of the differential amplifier 31 via the ground GND and the resistor $R_1$. Therefore, the differential amplifier 31 detects a voltage difference signal $V_{MN}$ representing the voltage difference between the voltage $V_M$ at the neutral point of the resistor circuit 2 and the voltage $V_N$ at the neutral point of the armature coils 1a, 1b and 1c. The brushless DC motor system further includes a level detector 34 which receives an integral signal from the integrator 32 of the rotational-position sensor 3 and outputs a level detection signal to the microcomputer 4.

Further, the inverter section 20 is comprised of three transistors 20a, 20b and 20c connected to the positive side of a DC power source 9 and three transistors 20d, 20e and 20f connected to the negative side of the DC power source 9. An emitter of the transistor 20a and a collector of the transistor 20d are connected to each other, an emitter of the transistor 20b and a collector of the transistor 20e are connected to each other, and an emitter of the transistor 20c and a collector of the transistor 20f are connected to each other. Further, the connection point of the transistors 20a and 20d is connected to the armature coil 1a of U-phase, the connection point of the transistors 20b and 20e is connected to the armature coil 1b of V-phase, and the connection point of the transistors 20c and 20f is connected to the armature coil 1c of W-phase. Further, diodes are connected in an inverse-parallel connection form across the collectors and the emitters of the transistors 20a through 20f.

Figure 2:
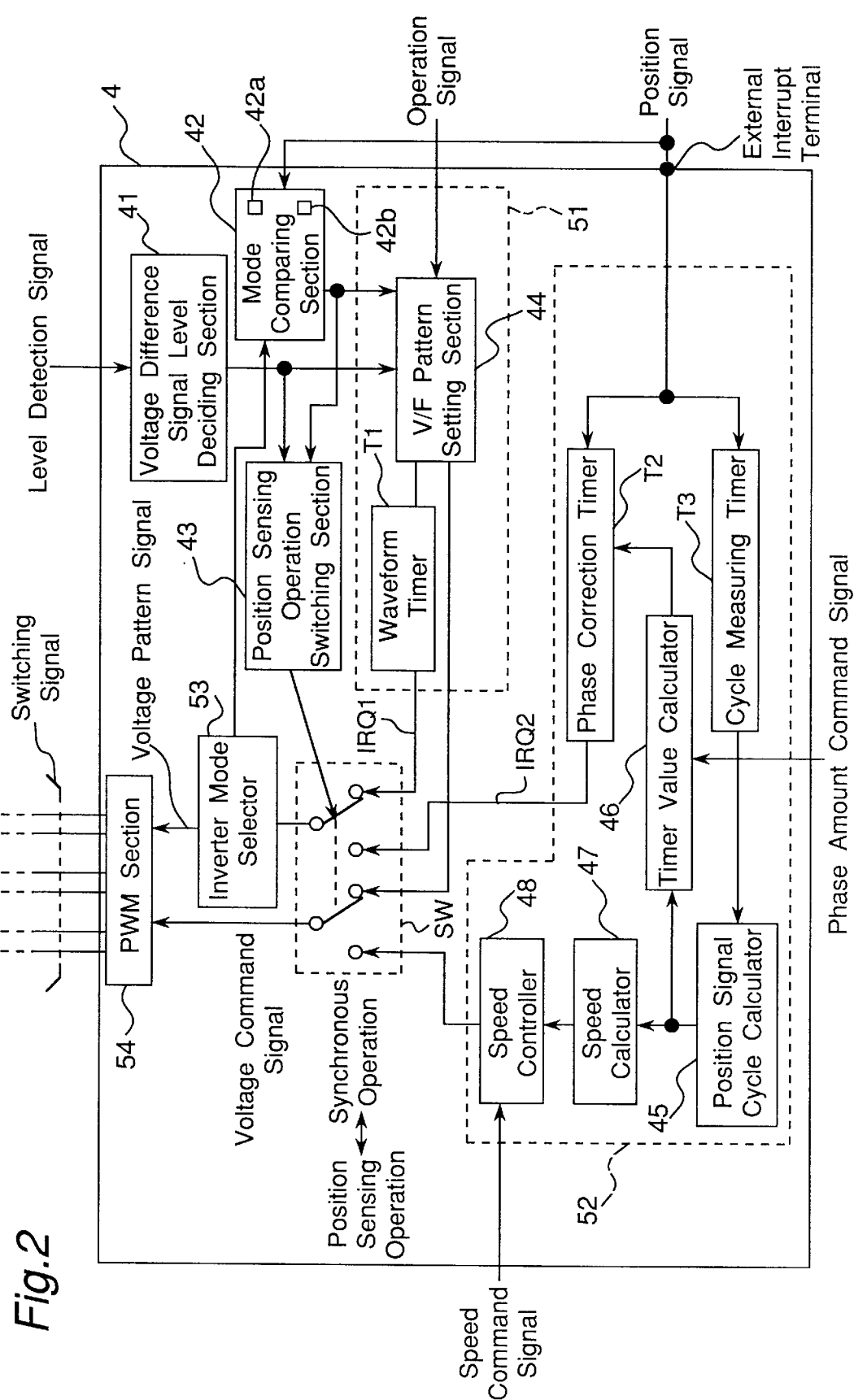
FIG. 2 is a structural diagram of a microcomputer of the brushless DC motor system of FIG. 1.

Further, as shown in FIG. 2, the microcomputer 4 includes: a voltage difference signal level deciding section 41 which receives a level detection signal from the level detector 34 (shown in FIG. 1) and decides whether or not the level of the voltage difference signal $V_{MN}$ is not smaller than a specified value; a mode comparing section 42 which receives a position signal from the rotational-position sensor 3 (shown in FIG. 1) and serves as position signal mode comparing means for comparing the position signal with an inverter mode described hereinafter; a position sensing operation switching section 43 which serves as operation switching means for outputting a position sensing operation switching signal based on a decision result from the voltage difference signal level deciding section 41 and a comparison result from the mode comparing section 42; a V/F pattern setting section 44 which outputs a voltage command signal and a frequency command signal for starting upon receiving an input of an external operation signal based on the decision result from the voltage difference signal level deciding section 41 and the comparison result from the mode comparing section 42; and a waveform timer T1 which receives the frequency command signal from the V/F pattern setting section 44 and outputs an interrupt signal IRQ1. The V/F pattern setting section 44 and the waveform timer T1 constitute a synchronous operation control section 51 which serves as synchronous operation control means. Further, the voltage difference signal level deciding section 41 and the level detector 34 constitute level decision means. The mode comparing section 42 includes a number counting section 42a and a count number deciding section 42b.

The microcomputer 4 further includes: a phase correction timer T2 to which the position signal from the rotational-position sensor 3 (shown in FIG. 1) is inputted via an external interrupt terminal, and starts in response to the position signal; a cycle measuring timer T3 which receives the position signal and measures timer values concerning a cycle of the voltage pattern of the armature coils 1a, 1b and 1c; a position signal cycle calculator 45 which receives the measured timer values from the cycle measuring timer T3 and calculates the cycle of the voltage pattern of the armature coils 1a, 1b and 1c from the timer values, and outputs a cycle signal representing the cycle; a timer value calculator 46 which receives the cycle signal from the position signal cycle calculator 45 and an external phase amount command signal, calculates a timer value corresponding to a phase amount from the cycle, and outputs a timer value setting signal to the phase correction timer T2; a speed calculator 47 which receives the cycle signal from the position signal cycle calculator 45, calculates a rotation speed, and outputs a current-time speed signal; and a speed controller 48 which receives the current-time speed signal from the speed calculator 47 and an external speed command signal, and outputs a voltage command signal. The phase correction timer T2, the cycle measuring timer T3, the position signal cycle calculator 45, the timer value calculator 46, the speed calculator 47 and the speed controller 48 constitute a position sensing operation control section 52 which serves as position sensing operation control means.

The microcomputer 4 further includes: an inverter mode selector 53 which receives the interrupt signal IRQ1 from the waveform timer T1 via an operation switching switch SW, and outputs a voltage pattern; and a PWM section 54 which receives the voltage pattern from the inverter mode selector 53, receives the voltage command signal from the V/F pattern setting section 44 via the operation switching switch SW, and outputs a switching signal.

Figure 3:
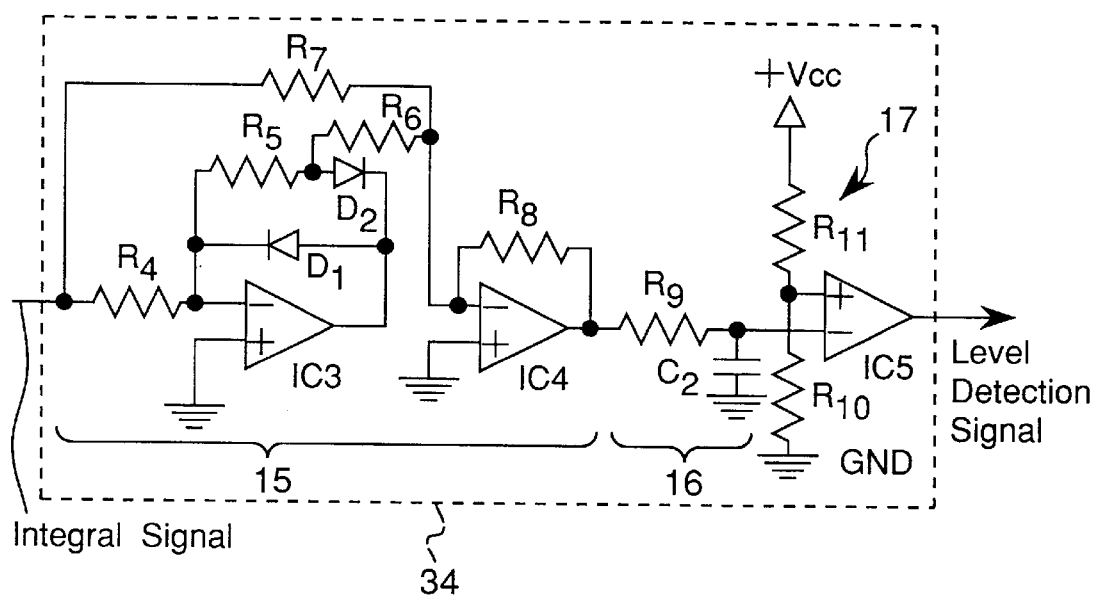
FIG. 3 is a circuit diagram of a level detector of the brushless DC motor system of FIG. 1.

FIG. 3 shows a circuit diagram of the level detector 34, in which an integral signal from the integrator 32 of the rotational-position sensor 3 is inputted to an inverted input terminal of an amplifier IC3 via a resistor $R_4$, and the ground GND is connected to a non-inverted input terminal of the amplifier IC3. Further, a diode $D_1$ is connected across an output terminal and the inverted input terminal of the amplifier IC3 with an anode thereof positioned side the output terminal. A resistor $R_5$ and a diode $D_2$ are connected in series from the non-inverted input terminal side across the output terminal and the inverted input terminal of the amplifier IC3. The cathode side of the diode $D_2$ is connected to the output terminal of the amplifier IC3. The connection point of the resistor $R_5$ and the diode $D_2$ connected in series is connected to a non-inverted input terminal of an amplifier IC4 via a resistor $R_6$. Further, a resistor $R_7$ is connected across an end of the resistor $R_4$ opposite from the amplifier IC3 and the inverted input terminal of the amplifier IC4. The ground GND is connected to a non-inverted input terminal of the amplifier IC4, while a resistor $R_8$ is connected across the inverted input terminal and the output terminal of the amplifier IC4. The output terminal of the amplifier IC4 is connected to an inverted input terminal of a comparator IC5 via a resistor $R_9$, while a capacitor $C_2$ is connected across an end of the resistor $R_9$ on the comparator IC5 side and the ground GND. The ground GND is connected to a non-inverted input terminal of the comparator IC5 via a resistor $R_{10}$, while a power source $+V_{cc}$ is connected to the non-inverted input terminal of the comparator IC5 via a resistor $R_{11}$.

The resistors $R_4$ through $R_8$, the diode $D_1$ and $D_2$, and the amplifiers IC3 and IC4 constitute a full-wave rectifier circuit 15 which serves as rectifying means. The resistor $R_9$ and the capacitor $C_2$ constitute a smoothing circuit 16 which serves as smoothing means. The resistors $R_{10}$ and $R_{11}$, and the comparator IC5 constitute a comparator circuit 17 which serves as smoothed signal comparing means.

In the above-mentioned brushless DC motor system, when the operation switching switch SW is selected to the position sensing operation side and the motor is driven in accordance with the position signal, as shown in FIGS. 4A, 4B and 4C, induced voltages Eu, Ev and Ew of the U-phase, V-phase and W-phase of the armature coils 1a, 1b and 1c have trapezoidal waveforms which have phase differences at intervals of 120 degrees. Then, the differential amplifier 31 of the rotational-position sensor 3 outputs a voltage difference signal $V_{MN}$ representing the voltage difference between the voltage $V_M$ at the neutral point of the resistor circuit 2 inputted to the non-inverted input terminal of the amplifier IC1 and the voltage $V_N$ at the neutral point of the armature coils 1a, 1b and 1c inputted to the inverted input terminal of the amplifier IC1 via the resistor $R_1$. Then, upon receiving the voltage difference signal $V_{MN}$ from the differential amplifier 31, the integrator 32 integrates the voltage difference signal $V_{MN}$ to output an integral signal $\int V_{MN} dt$ (shown in FIG. 4D). The integral signal $\int V_{MN} dt$ has an approximate sine waveform having a frequency three times as great as the rotational frequency. Then, the zero-crossing comparator 33 compares the integral signal $\int V_{MN} dt$ inputted to the non-inverted input terminal and a reference voltage at the ground GND connected to the inverted input terminal, and outputs a position signal (shown in FIG. 4E).

Meanwhile, the intergral signal $\int V_{MN} dt$ is inputted to the inverted input terminal of the amplifier IC3 of the level detector 34 via the resistor $R_4$, subjected to full-wave rectification in the full-wave rectifier circuit 15 of the level detector 34, and thereafter outputs a signal representing a full-wave-rectified waveform (shown in FIG. 4G) from the output terminal of the amplifier IC4. Then, the signal representing the full-wave-rectified waveform is smoothed in the smoothing circuit 16 composed of the resistor $R_9$ and the capacitor $C_2$, and a smoothed signal representing the smoothed waveform (shown in FIG. 4H) is inputted to the inverted input terminal of the comparator IC5. Then, the smoothed signal is compared with a reference voltage $E_0$ set by the resistors $R_{10}$ and $R_{11}$. When the smoothed signal has a voltage higher than the reference voltage $E_0$, an output of the comparator IC5, i.e., a level detection signal (shown in FIG. 4I) comes to have L-level.

Then, the position signal from the zero-crossing comparator 33 is inputted to the cycle measuring timer T3, and the cycle measuring timer T3 measures an interval from a leading edge to a trailing edge of the position signal and an interval from a trailing edge to a leading edge of the position signal, and outputs each measured timer value. Upon receiving a signal representing the timer value from the cycle measuring timer T3, the position signal cycle calculator 45 obtains the cycle of the position signal. That is, the interval from the trailing edge to the leading edge and the interval from the leading edge to the trailing edge respectively correspond to 60 degrees, and therefore, by multiplying the timer value of each measured interval by six, a timer value corresponding to one cycle of the voltage pattern is obtained.

Then, upon receiving a cycle signal representing the cycle from the position signal cycle calculator 45 and the external phase amount command signal, the timer value calculator 46 outputs a timer value set signal. Upon receiving the timer value set signal from the timer value calculator 46, the phase correction timer T2 measures a time interval from the position signal to a time when the voltage pattern is switched. That is, when the counting is completed, the phase correction timer T2 outputs an interrupt signal IRQ2 to the inverter mode selector 53, and the inverter mode selector 53 outputs a phase-corrected voltage pattern signal (shown in FIGS. 4J through 4O) to the PWM section 54. Then, the PWM section 54 outputs a switching signal to the base drive circuit 5 shown in FIG. 1. When the base drive circuit 5 outputs a commutation control signal to the inverter section 20, the transistors 20a through 20f of the inverter section 20 are each turned on and off. It is to be noted that the position signal numbers 0 through 5 shown in FIG. 4F are assigned to each cycle of the position signal for the sake of simplicity of explanation. In regard to an inverter mode as shown in FIG. 4P, numbers 0 through 5 are assigned so that they correspond to the voltage pattern signals shown in FIGS. 4J through 4O In the time of starting of the brushless DC motor, the operation switching switch SW is switched to the synchronous operation side, when the voltage and the frequency of the inverter output are increased in a specified pattern by the synchronous operation control section 51. When the integral signal from the integrator 32 of the rotational-position sensor 3 is greater than a specified value, and the position signal of the rotational-position sensor 3 and the inverter mode of the inverter mode selector 53 have a specified relation by the operations of the level detector 34, the voltage difference signal level deciding section 41 and the mode comparing section 42, the position sensing operation switching section 43 switches the operation switching switch SW from the synchronous operation side to the position sensing operation side.

The switching from the synchronous operation executed by the synchronous operation control section 51 of the microcomputer 4 to the position sensing operation will be described with reference to FIGS. 5A through 5D, 6A through 6C and 7A through 7D. FIGS. 5A through 5D show signals at several portions when the motor operation is switched from the synchronous operation to the position sensing operation by the voltage difference signal level deciding section 41 based on the level detection signal from the level detector 34. FIGS. 6A through 6C show signals at several portions when the motor operation is switched from the synchronous operation to the position sensing operation by the mode comparing section 42 based on the position signal from the rotational-position sensor 3 and the inverter mode of the inverter mode selector 53. FIGS. 7A through 7D show signals at several portions when the motor operation is switched from the synchronous operation to the position sensing operation by the voltage difference signal level deciding section 41 and the mode comparing section 42 based on the level detection signal from the level detector 34 and the position signal from the rotational-position sensor 3.

In FIGS. 5A through 5D, the level detection signal (shown in FIG. 5B) changes from H-level to L-level in the place of the position signal number (shown in FIG. 5A) 5 to switch the motor operation to the position sensing operation in a place where the position signal number changes from 5 to 0. That is, the operation switching switch SW is switched to the position sensing operation by the position sensing operation switching section 43, and thereafter the phase correction timer T2 is started at every point where the position signal number changes (shown in FIG. 5C). Then, the interrupt signal IRQ2 is outputted every time the counting of the phase correction timer T2 is completed, and the inverter mode (shown in FIG. 5D) of the inverter mode selector 53 is advanced by one step.

In FIGS. 6A through 6C, assuming that the position signal has H-level in the place of the signal number (shown in FIG. 6A) 2 at the point where the inverter mode (shown in FIG. 6C) selected by the inverter mode selector 53 changes from [2] to [3], the position signal in the place of the position signal number 3 comes to have L-level at the point where the inverter mode next changes from [3] to [4]. Thus, when a condition that the position signal has H-level when the inverter mode is at an odd number and a condition that the position signal has L-level when the inverter mode is at an even number continue four times, it is decided that the switching condition is satisfied. Then the operation switching switch SW is switched to the position sensing operation side by the position sensing operation switching section 43 at the point where the position signal number changes from 5 to 0, and the phase correction timer T2 is started at every point where the position signal number changes (shown in FIG. 6B). That is, the motor operation is switched from the synchronous operation to the position sensing operation upon deciding that the position signal and the inverter mode have a specified relation, and the position sensing operation can be achieved based on a stable position signal. Then, the interrupt signal IRQ2 is outputted every time the counting of the phase correction timer T2 is completed, and the inverter mode (shown in FIG. 6C) of the inverter mode selector 53 is advanced by one step.

In FIGS. 7A through 7D, it is decided that the level detection signal (shown in FIG. 7B) changes from H-level to L-level at the time point of the position signal number (shown in FIG. 7A) 1 in the voltage difference signal level deciding section 41. Then, in the mode comparing section 42, assuming that the position signal has H-level in the place of the signal number (shown in FIG. 7A) 2 at the point where the inverter mode (shown in FIG. 7D) selected by the inverter mode selector 53 changes from [2] to [3], the position signal in the place of the position signal number 3 comes to have L-level at the point where the inverter mode next changes from [3] to [4]. Thus, when a condition that the position signal has H-level when the inverter mode is at an odd number and a condition that the position signal has L-level when the inverter mode is at an even number continue four times, it is decided that the switching condition is satisfied. Then the position sensing operation switching section 43 switches the operation switching switch SW to the position sensing operation side at the point where the position signal number changes from 5 to 0, and thereafter the phase correction timer T2 is started at every point where the position signal number changes (shown in FIG. 7C). Then, the interrupt signal IRQ2 is outputted every time the counting of the phase correction timer T2 is completed, and the inverter mode (shown in FIG. 7D) of the inverter mode selector 53 is advanced by one step. In FIGS. 6A through 6C and FIGS. 7A through 7D, it is decided that the switching condition is satisfied when the condition of the H-level or L-level of the position signal continues four times at the point where the inverter mode changes from the odd number to the even number or vice versa. However, the number of continuity is of course not limited to the above-mentioned number.

Operation of the microcomputer 4 in the stage of starting of the brushless DC motor shown in FIGS. 7A through 7D will be described below according to flowcharts of FIGS. 8, 9 and 10. It is to be noted that the operation switching switch SW is selected to the synchronous operation side prior to starting, where the interrupt signal IRQ1 of the waveform timer T1 is inputted to the inverter mode selector 53, and the voltage command signal of the V/F pattern setting section 44 is inputted to the PWM section 54.

First, when the operation signal is inputted externally to the V/F pattern setting section 44 of the microcomputer 4, the V/F pattern setting section 44 outputs the frequency command signal to start the waveform timer T1. When the counting of the waveform timer T1 is completed, the interrupt signal IRQ1 is outputted from the waveform timer T1, and an interrupt handling 1 is executed at intervals of occurrence of the interrupt signal IRQ1 of the waveform timer T1.

Figure 8:
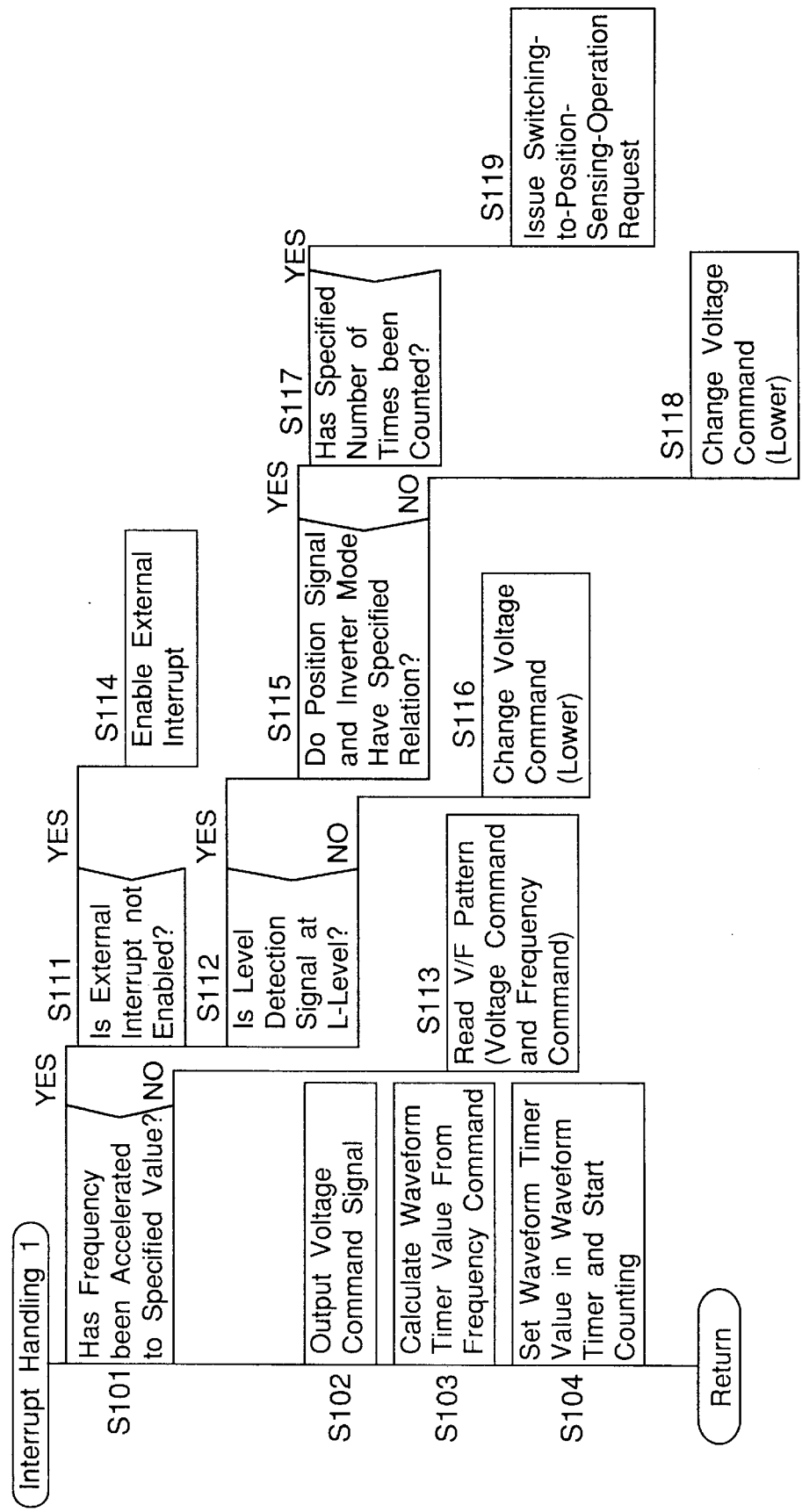
FIG. 8 is a flowchart showing an interrupt handling of a synchronous operation of the microcomputer of the first embodiment.

Then, in FIG. 8, it is decided whether or not the frequency of the inverter output has been accelerated to a specified value at step S101. When it is decided that the frequency has been accelerated to the specified value, the program flow proceeds to step S111. When it is decided that the frequency has not been accelerated to the specified value, the program flow proceeds to step S113. Then, at step S113, V/F pattern data (for the voltage command signal and the frequency command signal) preparatorily stored in a table are read, and the program flow proceeds to step S102. At step S111, it is decided whether or not an external interrupt is enabled. When it is decided that the external interrupt is not enabled, the program flow proceeds to step S114 to enable the external interrupt at step S114, and the program flow proceeds to step S112. When the external interrupt is enabled at step S111, the program flow proceeds to step S112. When the external interrupt is enabled at step S114, an interrupt handling 2 as described hereinafter is executed every time the position signal rises or falls.

Then, at step S112, it is decided whether or not the level detection signal from the level detector 34 is at L-level. That is, it is decided whether or not the position signal of the rotational-position sensor 3 is stable. it is decided that the level detection signal is at L-level at step S112, the program flow proceeds to step S115. When the level detection signal is not at L-level, the program flow proceeds to step S116. Then, the voltage command is changed at step S116 to lower the inverter output voltage, and the program flow proceeds to step S102.

Then, at step S115, it is decided whether or not the position signal and the inverter mode have a specified relation. That is, as shown in FIGS. 7A–7D, it is decided whether or not the position signal is at H-level at the point where the inverter mode changes to an odd number (e.g., from 2 to 3, or from 4 to 5), or the position signal is at L-level at the point where the inverter mode changes to an even number (e.g., from 3 to 4, or from 5 to 0). When the position signal and the inverter mode have the specified relation at step S115, the program flow proceeds to step S117. When the position signal and the inverter mode do not have the specified relation at step S115, the program flow proceeds to step S118. Then, the voltage command is changed at step S118 to lower the inverter output voltage, and the program flow proceeds to step S102.

Then, at step S117, the number of continuously repeated events in which the inverter mode corresponds to the H- and L-levels of the position signal is counted in the number counting section 42a of the mode comparing section 42 to decide whether or not a specified number of times has been counted in the count number deciding section 42b of the mode comparing section 42. That is, as shown in FIGS. 7A–7D, it is decided whether or not the events satisfying of the condition that the position signal is at H-level at the point where the inverter mode changes to an odd number (e.g., from 2 to 3, or from 4 to 5) and the position signal is at L-level at the point where the inverter mode changes to an even number (e.g., from 3 to 4, or from 5 to 0) have been counted continuously specified number of times (four time in FIGS. 7A through 7D). When it is decided that the specified number of times has been counted at step S117, the program flow proceeds to step S119 to issue a switching-to-position-sensing-operation request, and the program flow proceeds to step S102. When it is decided that the specified number of times has not been counted at step S117, the program flow proceeds to step S102.

Then, a voltage command signal is outputted based on the voltage command at step S102. Then, the program flow proceeds to step S103 to calculate a timer value of the waveform timer T1 according to a frequency command set in the V/F pattern setting section 44, i.e., the frequency data stored preparatorily in the table. Then, the program flow proceeds to step S104 to set in the waveform timer T1 the timer value obtained at step S103 and start the waveform timer T1, and the interrupt handling 1 ends.

Figure 9:
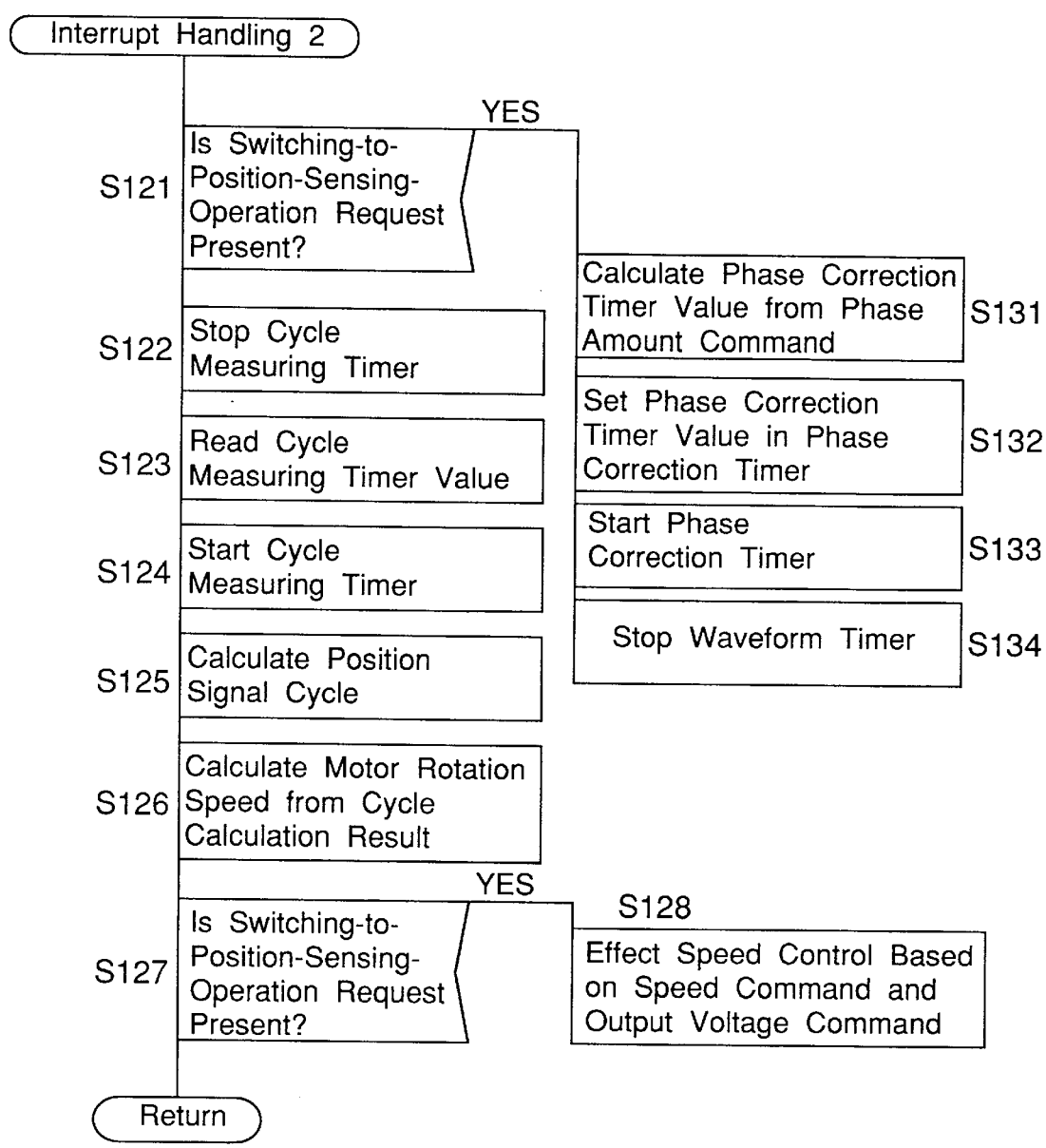
FIG. 9 is a flowchart showing an interrupt handling of a position sensing operation of the microcomputer of the first embodiment.

Then, the operation switching switch SW is switched to the position sensing operation side in response to the switching-to-position-sensing-operation request issued at step S119 of the interrupt handling 1, and the interrupt handling 2 shown in FIG. 9 is executed every time the position signal inputted to an external interrupt terminal of the microcomputer 4 rises or falls.

First, in FIG. 9, it is decided whether or not the switching-to-position-sensing-operation request is present at step S121. When the switching-to-position sensing-operation request is present, the program flow proceeds to step S131. When the switching-to-position sensing-operation request is not present, the program flow proceeds to step S122. Then, at step S131, the phase correction timer value for the phase correction timer T2 is calculated based on the external phase amount command signal in the timer value calculator 46. Then, the program flow proceeds to step S132 to set in the phase correction timer T2 the timer value obtained at step S131. Then, the phase correction timer T2 is started at step S133, and the program flow proceeds to step S134 to stop the waveform timer T1 of the synchronous operation control section 51.

Then, the cycle measuring timer T3 is stopped at step S122, and the program flow proceeds to step S123 to read the timer value of the cycle measuring timer T3. Then, the program flow proceeds to step S124 to start the cycle measuring timer T3. Then, at step S125, the position signal cycle calculator 45 calculates the cycle of the position signal from the timer value of the cycle measuring timer T3. Then, at step S126, the speed calculator 47 calculates a rotation speed of the motor based on the cycle of the position signal obtained at step S125.

Then, the program flow proceeds to step S127 to decide whether or not the switching-to-position-sensing-operation request is present. When the switching-to position-sensing-operation request is present, the program flow proceeds to step S128 to effect speed control based on the external speed command signal and output a voltage command signal, and the interrupt handling 2 ends. When the switching-to-position-sensing-operation request is not present at step S127, the interrupt handling 2 ends.

Figure 10:
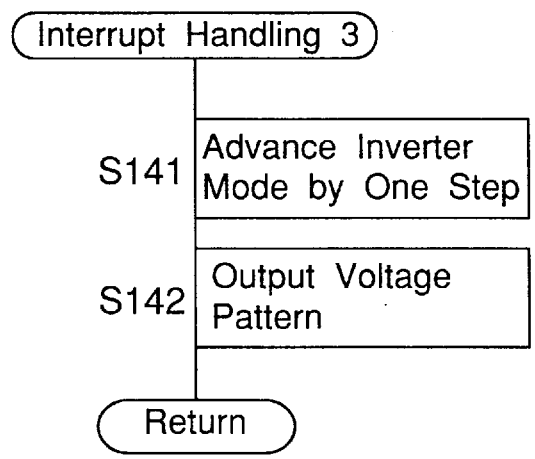
FIG. 10 is a flowchart showing an interrupt handling through interruption by a phase correction timer of the above microcomputer.

When the counting of the phase correction timer T2 started in the interrupt handling 2 is completed, the phase correction timer T2 outputs the interrupt signal IRQ2 to execute an interrupt handling 3 as shown in FIG. 10 every time the interrupt signal IRQ2 is generated.

That is, when the counting of the phase correction timer T2 is completed to output the interrupt signal IRQ2, the interrupt handling 3 starts. The inverter mode selector 53 advances the inverter mode by one step at step S141, and outputs a voltage pattern at step S142 to end the interrupt handling 3.

Figure 11:
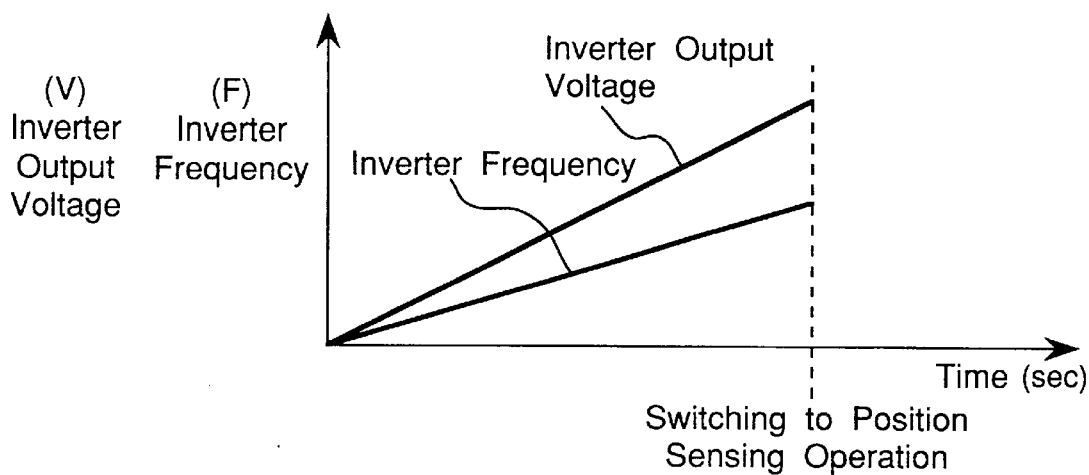
FIG. 11 is a graph showing variations of an inverter output voltage and an inverter frequency in a stage of starting of the brushless DC motor system of FIG. 1.

Thus, as shown in FIG. 11, in the synchronous operation in the stage of starting, the inverter output voltage and the inverter frequency are gradually increased according to a specified approximate linear pattern based on the voltage and the frequency data stored preparatorily in the table to accelerate the rotor 10. After the rotor 10 is accelerated to a specified number of revolutions per minute, it is decided whether or not the voltage difference signal is stable by the level detector 34, the voltage difference signal level deciding section 41, and the mode comparing section 42. When the voltage difference signal is stable, the position sensing operation switching section 43 switches the motor operation from the synchronous operation to the position sensing operation.

Figure 12:
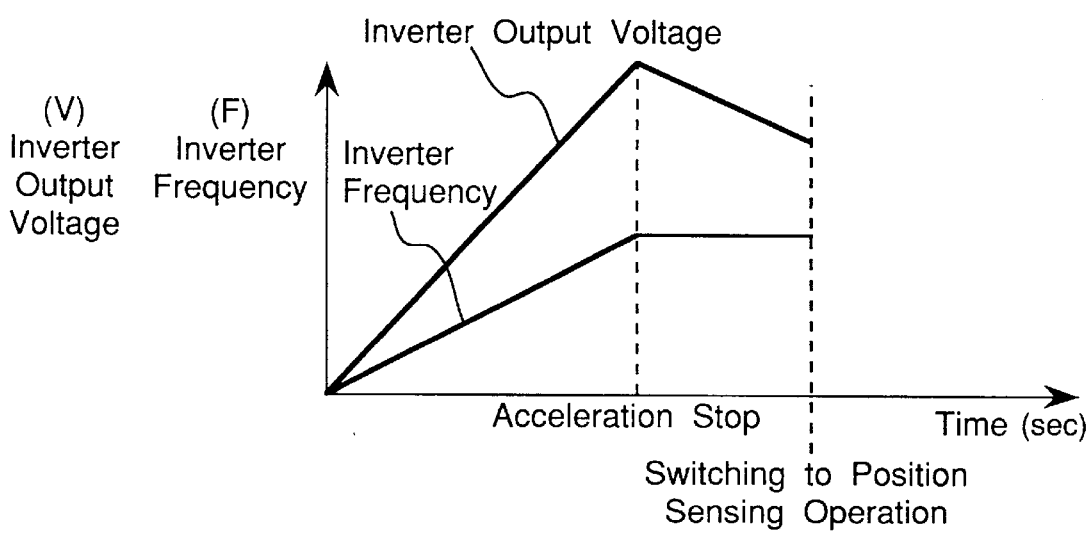
FIG. 12 is a graph showing variations of the inverter output voltage and the inverter frequency in the stage of starting of the brushless DC motor system of FIG. 1 when the inverter output voltage is lowered after stop of acceleration.

Further, as shown in FIG. 12, after the rotor 10 is accelerated to the specified number of revolutions per minute in the synchronous operation in the stage of starting, it is decided whether or not the voltage difference signal is stable by the level detector 34, the voltage difference signal level deciding section 41, and the mode comparing section 42. When the voltage difference signal is unstable, the V/F pattern setting section 44 gradually lowers the inverter output voltage until the voltage difference signal is stabilized. When the voltage difference signal is stabilized, the position sensing operation switching section 43 switches the motor operation from the synchronous operation to the position sensing operation. Although the inverter output after the acceleration is stopped has a constant frequency in FIG. 12, the frequency may be increased or decreased.

Consequently, the synchronous operation control section 51 lowers the inverter output voltage until the position sensing operation according to the position signal from the rotational-position sensor 3 is enabled after the rotor 10 is accelerated by the synchronous operation control section 51 in the stage of starting. Therefore, the motor operation can be surely switched from the synchronous operation to the position sensing operation even if the range in which the voltage difference signal is stabilized varies depending on the magnitude of the load and the fluctuation of the power voltage in the stage of starting.

Further, the V/F pattern setting section 44 lowers the inverter output voltage until the voltage difference signal level deciding section 41 decides that the voltage difference between the neutral point of the armature coils 1a, 1b and 1c and the neutral point of the resistor circuit 2 is not smaller than a specified value and the mode comparing section 42 decides that the position signal and the inverter output have a specified relation. When the position signal from the rotational-position sensor 3 is stabilized, the position sensing operation switching section 43 decides that the position sensing operation can be effected, and surely switches the motor operation from the synchronous operation to the position sensing operation. Therefore, the motor operation can be surely switched from the synchronous operation to the position sensing operation even if the characteristic of the voltage difference signal varies depending on a variation of the load and the fluctuation of the power voltage.

Furthermore, when an average value of the integral signal from the integrator 32 of the rotational-position sensor 3 exceeds the reference value $E_0$ corresponding to the aforementioned specified value by the operations of the full-wave rectifier circuit 15, smoothing circuit 16, and comparator circuit 17 of the level detector 34, the voltage difference signal level deciding section 41 can decide that the voltage difference is not smaller than the specified value, and that the position signal based on the voltage difference signal is stabilized.

(Second Embodiment)

Figure 13:
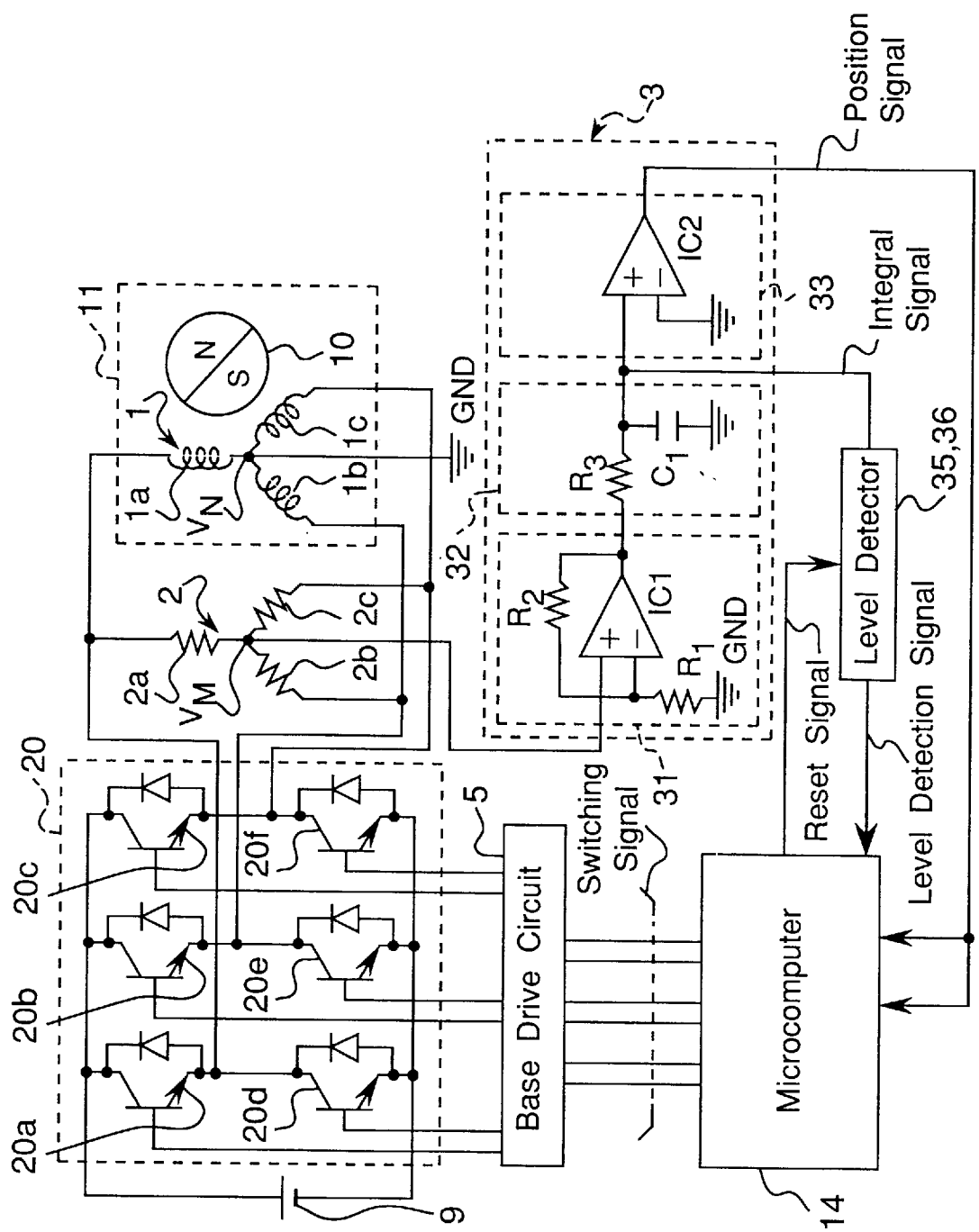
FIG. 13 is a structural diagram of a brushless DC motor system according to a second embodiment of the present invention.

FIG. 13 shows a construction of a brushless DC motor system according to a second embodiment of the present invention. The present embodiment has the same construction as that of the first embodiment, and therefore no description is provided therefor except for a level detector 35 and a microcomputer 14.

Figure 14:
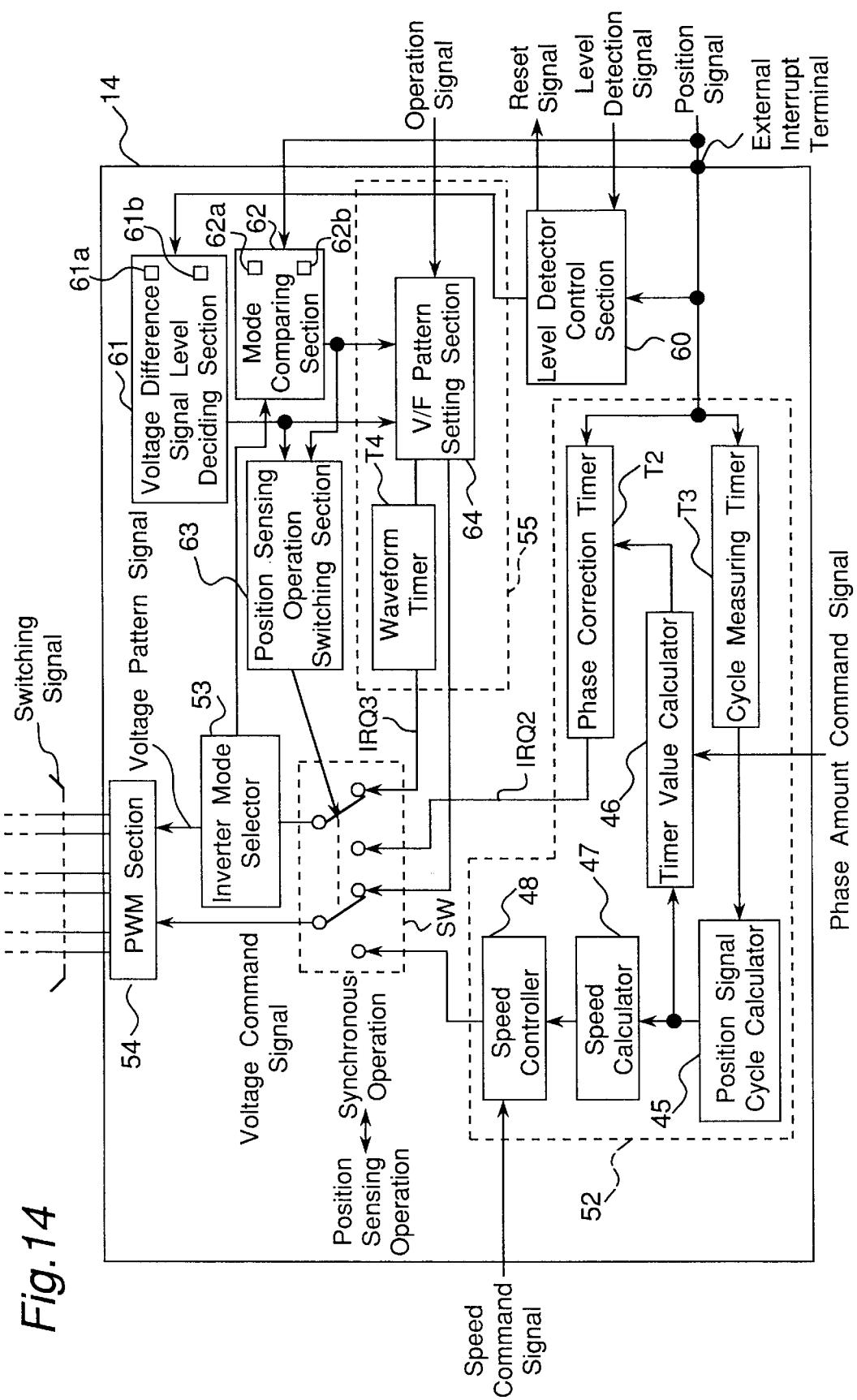
FIG. 14 is a structural diagram of a microcomputer of the brushless DC motor system of the embodiment.

Further, FIG. 14 shows a construction of the microcomputer 14 including: a level detector control section 60 which receives a position signal from a rotational-position sensor 3 (shown in FIG. 13) and a level detection signal from the level detector 35 (shown in FIG. 13), and outputs a reset signal; a voltage difference signal level deciding section 61 which receives a signal representing a level decision flag from the level detector control section 60, and decides whether or not the level of the voltage difference signal $V_{MN}$ is not smaller than a specified value; a mode comparing section 62 which receives the position signal and serves as position signal mode comparing means for comparing the position signal with an inverter mode; a position sensing operation switching section 63 which serves as an operation switching means for outputting a position sensing operation switching signal based on a decision result from the voltage difference signal level deciding section 61 and a comparison result from the mode comparing section 62; a V/F pattern setting section 64 which outputs a voltage command signal and a frequency command signal for starting upon receiving an input of an external operation signal based on the decision result from the voltage difference signal level deciding section 61 and the comparison result from the mode comparing section 62; and a waveform timer T4 which receives the frequency command signal from the V/F pattern setting section 64 and outputs an interrupt signal IRQ3. The V/F pattern setting section 64 and the waveform timer T4 constitute a synchronous operation control section 55 which serves as synchronous operation control means. Further, the level detector control section 60, the voltage difference signal level deciding section 61 and the level detector 35 constitute level decision means. The voltage difference signal level deciding section 61 includes a number counting section 61a which serves as number counting means and a count number deciding section 61b which serves as count value decision means. The mode comparing section 62 includes a number counting section 62a and a count number deciding section 62b. It is to be noted that the microcomputer 14 has the same construction as that of the microcomputer 4 of the first embodiment except for the synchronous operation control section 55, the level detector control section 60, the voltage difference signal level deciding section 61, the mode comparing section 62, and the position sensing operation switching section 63. Therefore, the same components are denoted by the same reference numerals, and no description is provided therefor.

Figure 15:
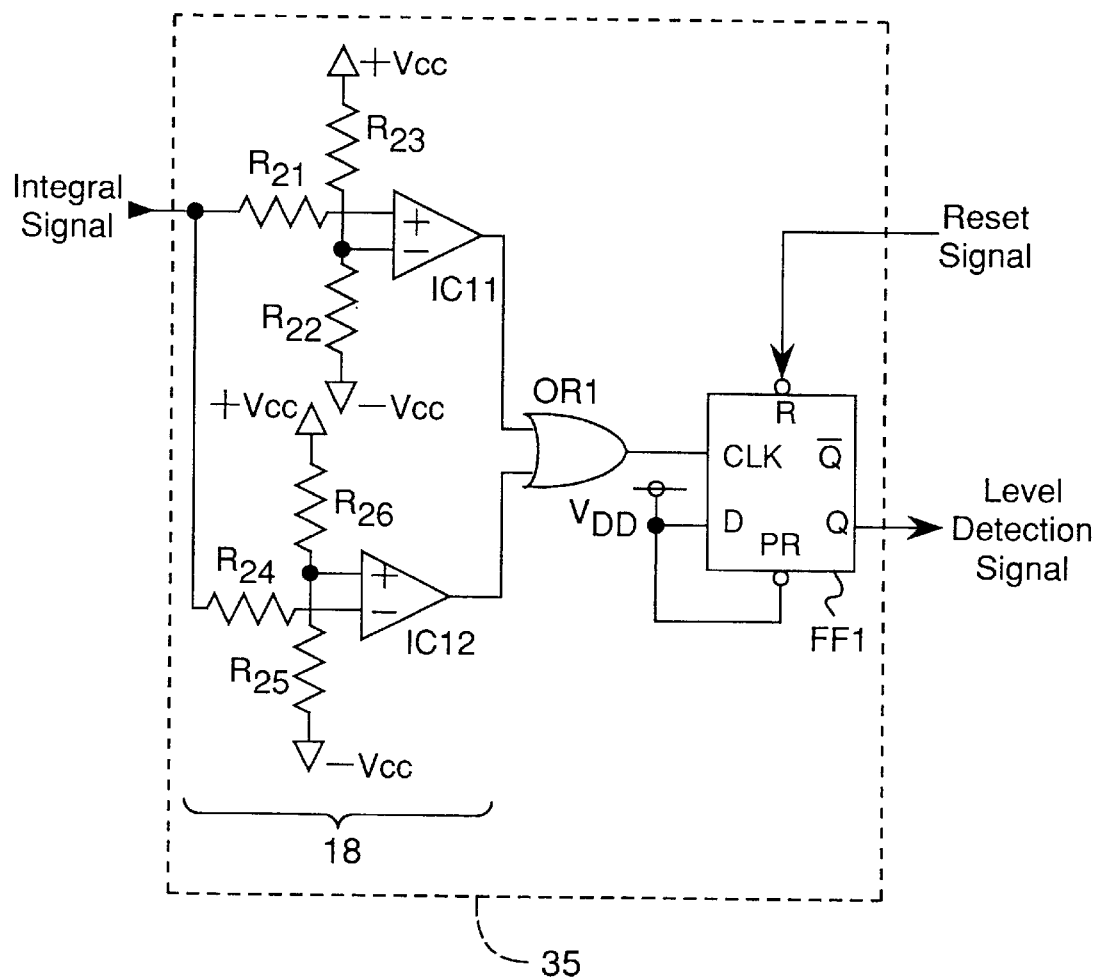
FIG. 15 is a circuit diagram of a level deciding unit of the brushless DC motor system of the second embodiment.

FIG. 15 shows a circuit diagram of the level detector 35, in which the integral signal $\int V_{MN} dt$ from the integrator 32 of the rotational-position sensor 3 is inputted to a non-inverted input terminal of a comparator IC11 via a resistor $R_{21}$, a power source $-V_{cc}$ is connected to an inverted input terminal of the comparator IC11 via a resistor $R_{22}$, and a power source $+V_{cc}$ is connected to the inverted input terminal of the comparator IC11 via a resistor $R_{23}$. Meanwhile, the integral signal $\int V_{MN} dt$ from the integrator 32 of the rotational-position sensor 3 is inputted to an inverted input terminal of a comparator IC12 via a resistor $R_{24}$, the power source $-V_{cc}$ is connected to a non-inverted input terminal of the comparator IC12 via a resistor $R_{25}$, and the power source $+V_{cc}$ is connected to the non-inverted input terminal of the comparator IC12 via a resistor $R_{26}$. Then, output terminals of the comparator IC11 and IC12 are respect connected to input terminals of an OR-circuit OR1 and an output terminal of the OR-circuit OR1 is connected to a clock input terminal CLK of a D-flip-flop FF1. A power source $V_{DD}$ is connected to an input terminal D and an input terminal PR of the D-flip-flop FF1, and a level detection signal is outputted from an output terminal Q of the D-flip-flop FF1. Further, a reset signal from the microcomputer 14 shown in FIG. 13 is inputted to an input terminal R of the D-flip-flop FF1. The resistors $R_{21}$ through $R_{26}$ and the comparator IC11 and IC12 constitute a comparator circuit 18 which serves as exemplified voltage difference signal comparing means.

When the brushless DC motor is driven in accordance with position sensing, as shown in FIGS. 16A through 16D, the integral signal $\int V_{MN} dt$ (shown in FIG. 16A) from the integrator 32 of the rotational-position sensor 3 is inputted to the non-inverted input terminal of the comparator IC11 via the resistor $R_{21}$, and inputted to the inverted input terminal of the comparator IC12 of the level detector 35 via the resistor $R_{24}$. Then, the comparator IC11 compares the integral signal $\int V_{MN} dt$ with a reference value $E_1$ set by the resistors $R_{22}$ and $R_{23}$. When the integral signal $\int V_{MN}dt$ is greater than the reference value $E_1$, the output comes to have H-level. When the integral signal $\int V_{MN}dt$ is smaller than the reference value $E_1$, the output comes to have L-level. Meanwhile, the comparator IC12 compares the integral signal $\int V_{MN}dt$ with a reference value $E_2$ set by the resistors $R_{25}$ and $R_{26}$. When the integral signal $\int V_{MN}dt$ is smaller than the reference value $E_2$, the output comes to have H-level. When the integral signal $\int V_{MN}dt$ is greater than the reference value $E_2$, the output comes to have L-level. When either of the outputs of the comparator IC11 and IC12 comes to have H-level, the output (shown in FIG. 16C) of the OR-circuit OR1 comes to have H-level. When the output of the OR-circuit OR1 comes to have H-level, the H-level is inputted to the clock input terminal CLK of the D-flip-flop FF1, and the D-flip-flop FF1 is set in accordance with the rise from the L-level to H-level, and a level detection signal (shown in FIG. 16D) from the output terminal Q rises from L-level to H-level.

Figure 16:
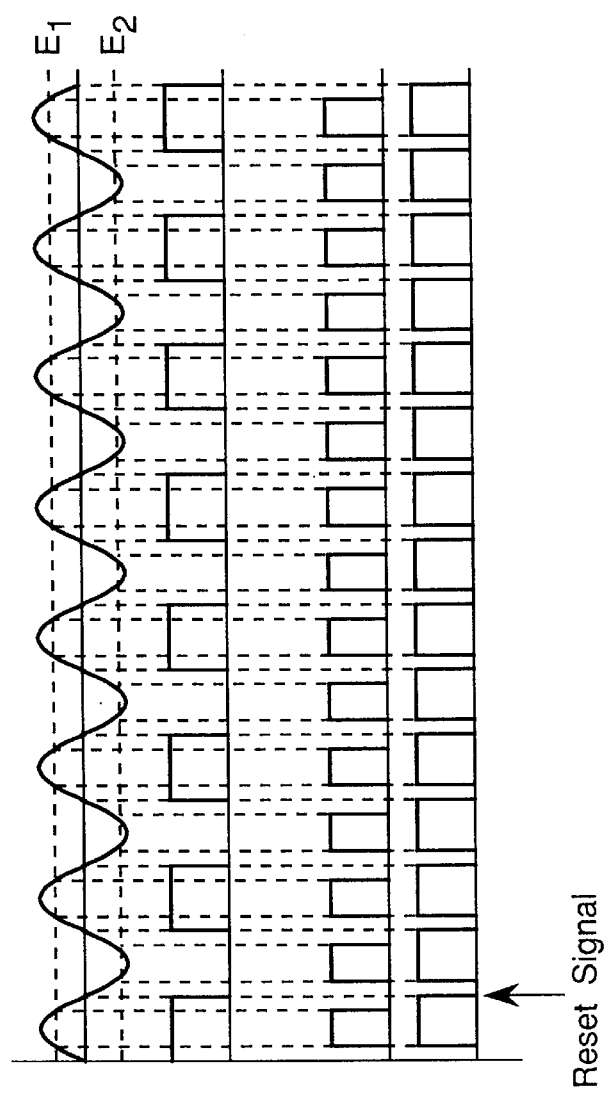
FIGS. 16A, 16B, 16C and 16D are charts showing signals at several portions when the level deciding unit of FIG. 15 is used.

Then, upon receiving the level detection signal at H-level from the level detector 35, the level detector control section 60 of the microcomputer 14 outputs a reset signal (L-level) in accordance with the rise or fall of the next position signal (shown in FIG. 16B). Then, upon receiving the reset signal from the level detector control section 60, the D-flip-flop FF1 is reset, and the level detection signal (shown in FIG. 16D) outputted from the output terminal Q of the D-flip-flop FF1 comes to have L-level.

Thus, the level detector 35 compares the integral signal $\int V_{MN}dt$ from the integrator 32 of the rotational-position sensor 3 with the specified reference values $E_1$ and $E_2$, and outputs the level detection signal.

Operation of the microcomputer 14 in the stage of starting will be described below according to flowcharts of FIGS. 17, 18, and 19. It is to be noted that the operation switching switch SW is selected to the synchronous operation side prior to starting, where the interrupt signal IRQ3 of the waveform timer T4 is inputted to the inverter mode selector 53, and the voltage command signal of the V/F pattern setting section 64 is inputted to the PWM section 54.

First, when an operation signal is inputted externally to the microcomputer 14, the V/F pattern setting section 64 outputs a frequency command signal to start the waveform timer T4. When the counting of the waveform timer T4 is completed, the interrupt signal IRQ3 is outputted from the waveform timer T4, and an interrupt handling 11 is executed at intervals of occurrence of the interrupt signal IRQ3.

Figure 17:
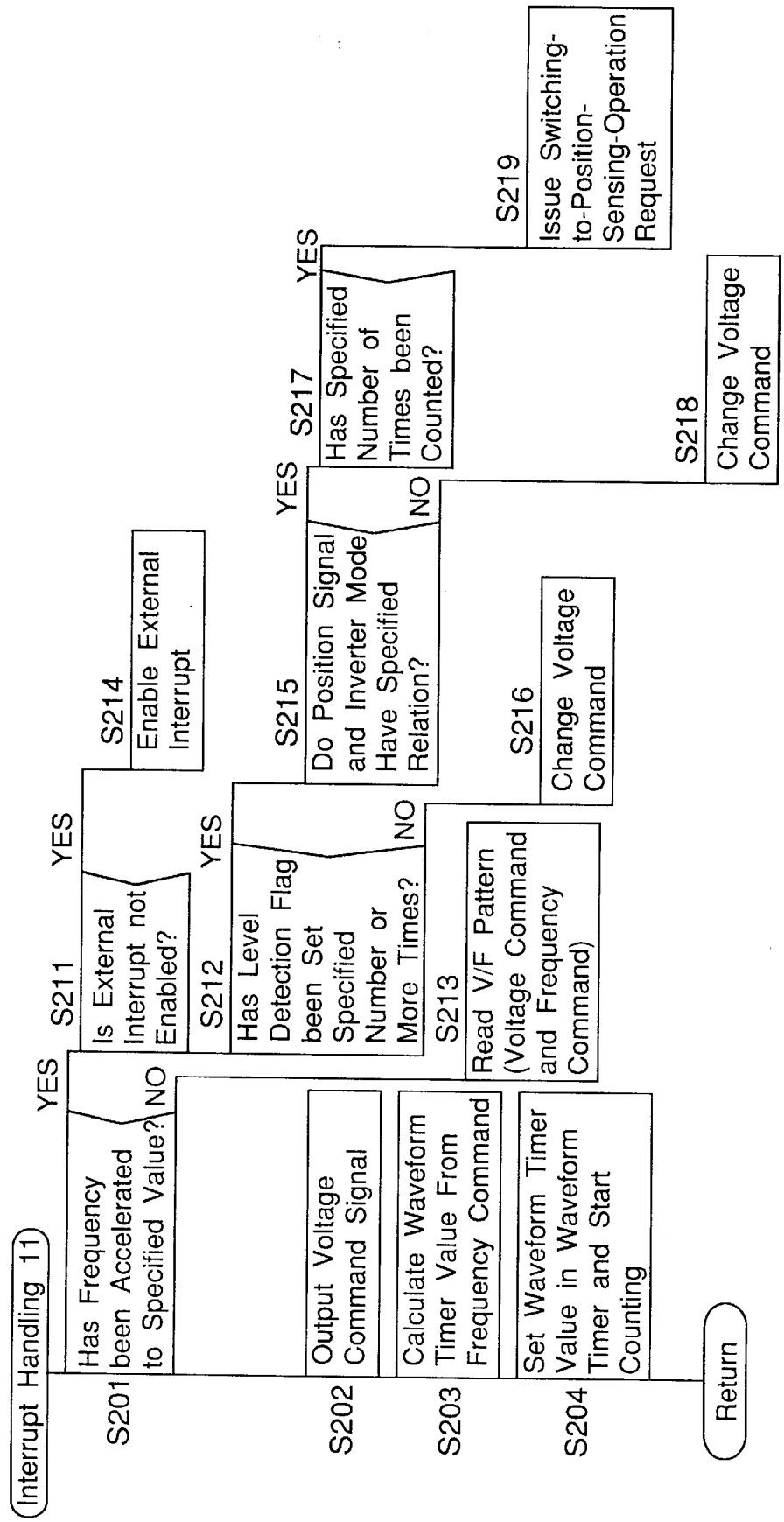
FIG. 17 is a flowchart showing an interrupt handling of a synchronous operation of the microcomputer of the second embodiment.

In FIG. 17, it is decided whether or not the frequency has been increased to a specified value at step S201. When it is decided that the frequency has been increased to the specified value, the program flow proceeds to step S211. When it is decided that the frequency has not been increased to the specified value, the program flow proceeds to step S213. Then, at step S213, V/F pattern data (for the voltage command signal and the frequency command signal) preparatorily stored in a table are read, and the program flow proceeds to step S202. Then, at step S211, it is decided whether or not an external interrupt is enabled. When it is decided that the external interrupt is not enabled, the program flow proceeds to step S214 to enable the external interrupt. When the external interrupt is enabled at step S211, the program flow proceeds to step S212. When the external interrupt is enabled at step S214, an interrupt handling 2 as described hereinafter is executed every time the position signal rises or falls.

Then, at step S212, it is decided whether or not the level decision flag has been set a specified number or more times. That is, the number counting section 61a of the voltage difference signal level deciding section 61 counts the number of times of continuously setting the level decision flag in the level detector control section 60, and the count number deciding section 61b decides whether or not the specified number of times has been counted. When the number of times of setting of the level decision flag is not smaller than a specified number of times at step S212, the program flow proceeds to step S215. When the number of times of setting of the level decision flag is smaller than the specified number of times, the program flow proceeds to step S216. Then, the voltage command is changed to lower the inverter output voltage at step S216, and the program flow proceeds to step S202.

Then, at step S215, it is decided whether or not the position signal and the inverter mode have a specified relation. That is, as shown in FIGS. 7A through 7D of the first embodiment, it is decided whether or not the position signal is at H-level at the point where the inverter mode changes to an odd number, and the position signal is at L-level at the point where the inverter mode changes to an even number. When the position signal and the inverter mode have the specified relation at step S215, the program flow proceeds to step S217. When the position signal and the inverter mode do not have the specified relation, the program flow proceeds to step S218.

Then, at step S217, the number of continuous iteration events in which the inverter mode corresponds the H- and L-levels of the position signal is counted by the number counting section 62a of the mode comparing section 62, and the count number deciding section 62b of the mode comparing section 62 decides whether or not a specified number of times has been counted. That is, as shown in FIGS. 7A through 7D of the first embodiment, it is decided whether or not the events of satisfaction of the condition that the position signal is at H-level at the point where the inverter mode changes to an odd number (e.g., from 2 to 3, or from 4 to 5) and the position signal is at L-level at the point where the inverter mode changes to an even number (e.g., from 3 to 4, or from 5 to 0) has been counted continuously specified number of times (four time in FIGS. 7A through 7D). When it is decided that the specified number of times has been counted at step S217, the program flow proceeds to step S219 to issue a switching-to-position-sensing-operation request, and the program flow proceeds to step S202. When it is decided that the specified number of times has not been counted at step S217, the program flow proceeds to step S202.

Then, a voltage command signal is outputted based on the voltage command at step S202. Then, the program flow proceeds to step S203 to calculate a timer value of the waveform timer T4 according to a frequency command set in the V/F pattern setting section 64, i.e., the frequency data stored preparatorily in the table. Then, the program flow proceeds to step S204 to set in the waveform timer T4 the timer value obtained at step S203 and start the waveform timer T4, and the interrupt handling 11 ends.

Figure 18:
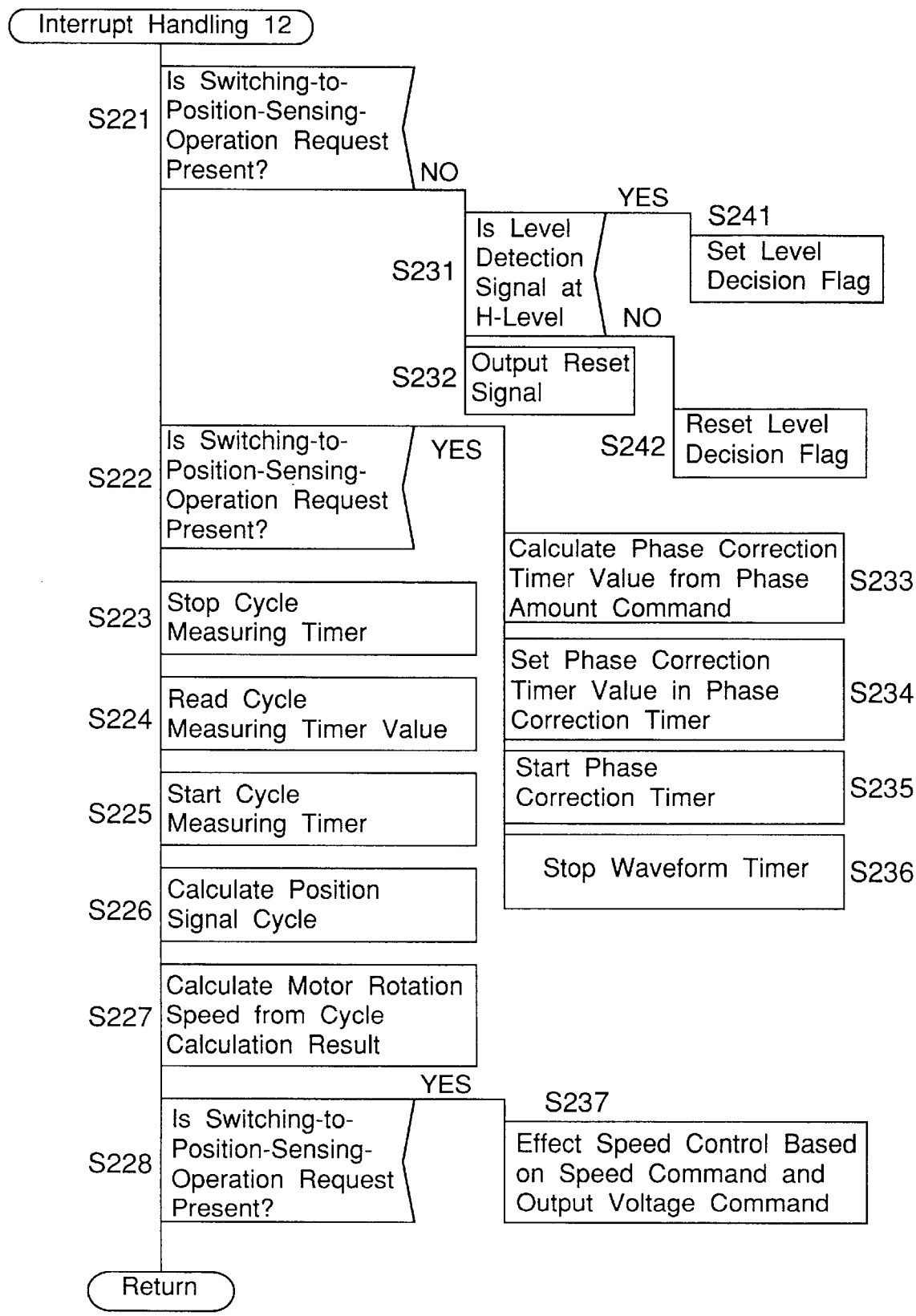
FIG. 18 is a flowchart showing an interrupt handling of a position sensing operation of the microcomputer of the second embodiment.

Then, the operation switching switch SW is switched to the position sensing operation side in response to the switching-to-position-sensing-operation request issued at step S219 of the interrupt handling 11, and the interrupt handling 12 shown in FIG. 18 is executed every time the position signal inputted to the external interrupt terminal of the microcomputer 14 rises or falls.

First, in FIG. 18, it is decided whether or not the switching-to-position-sensing-operation request is present at step S221. When the switching-to-position-sensingoperation request is not present, the program flow proceeds to step S231, and then the level detector control section 60 decides the level of the level detection signal from the level detector 35. When the level detection signal is at H-level at step S231, the program flow proceeds to step S241 to set the level decision flag, and then proceeds to step S232. When the level detection signal is not at H-level at step S231, the program flow proceeds to step S242 to reset the level decision flag, and then proceeds to step S232. The number counting section 61a of the voltage difference signal level deciding section 61 counts the number of times of continuous setting of the level decision flag in the level detector control section 60. The level decision flag is reset in the initial state.

Then, at step S232, the level detector control section 60 outputs a reset signal. When an L-level reset signal is inputted to the input terminal R of the D-flip-flop FF1, the D-flip-flop FF1 is reset to make the level detection signal from the output terminal Q have L-level.

Then, it is decided whether or not the switching-to-position-sensing-operation request is present at step S222. When it is decided that the switching-to-position-sensing-operation request is present, the program flow proceeds to step S233. When it is decided that the switching-to-position-sensing-operation request is not present, the program flow proceeds to step S223. Then, at step S233, the phase correction timer value for the phase correction timer T2 is calculated based on the external phase amount command in the timer value calculator 46. Then, the program flow proceeds to step S234 to set in the phase correction timer T2 the phase correction timer value obtained at step S233. Then, the phase correction timer T2 is started at step S235, and the program flow proceeds to step S236 to stop the waveform timer T4, and then proceeds to step S223.

Then, the cycle measuring timer T3 is stopped at step S223, and the program flow proceeds to step S224 to read the timer value of the cycle measuring timer T3. Then, the program flow proceeds to step S225 to start the cycle measuring timer T3. Then, at step S226, the position signal cycle calculator 45 calculates the cycle of the position signal from the timer value of the cycle measuring timer T3. Then, at step S227, the speed calculator 47 calculates a rotation speed of the motor based on the cycle of the position signal obtained at step S226.

Then, the program flow proceeds to step S228 to decide whether or not the switching-to-position-sensing-operation request is present. When it is decided that the switching-to-position-sensing-operation request is present, the program flow proceeds to step S237 to effect speed control based on the speed command signal and output a voltage command signal, and the interrupt handling 12 ends. When it is decided that the switching-to-position-sensing-operation request is not present at step S228, the interrupt handling 12 ends.

Figure 19:
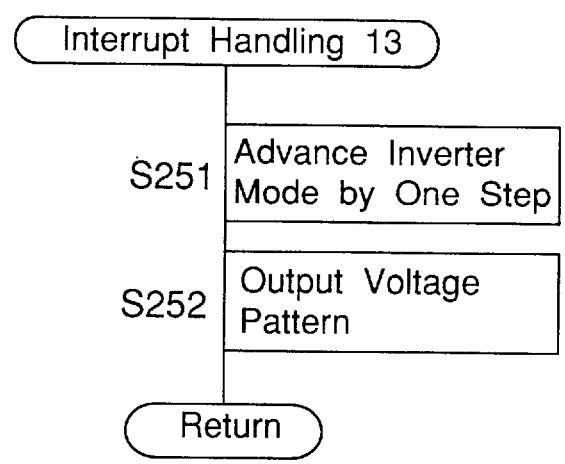
FIG. 19 is a flowchart showing an interrupt handling through interruption by a phase correction timer of the above microcomputer.

When the counting of the phase correction timer T2 started in the interrupt handling 12 is completed, the phase correction timer T2 outputs the interrupt signal IRQ2 to execute an interrupt handling 13 as shown in FIG. 19 every time the interrupt signal IRQ2 is generated.

That is, when the counting of the phase correction timer T2 is completed to output the interrupt signal IRQ2, the interrupt handling 13 starts. The inverter mode selector 53 advances the inverter mode by one step at step S251, and outputs a voltage pattern at step S252 to end the interrupt handling 13.

Thus, in the synchronous operation in the stage of starting, the level detector control section 60 and the voltage difference signal level deciding section 61 decide whether or not the above-mentioned voltage difference is not smaller than a specified value based on the level detection signal of the level detector 35, so that they can decide whether or not the position signal based on the voltage difference is stable. Therefore, the present brushless DC motor system is able to decide whether or not the position sensing operation based on the position signal can be effected in the stage of starting, and is able to surely switch the motor operation from the synchronous operation to the position sensing operation in the stage of starting. Furthermore, the decision is made every half wave of the integral signal from the integrator 32 of the rotational-position sensor 3, and therefore a response time for switching the motor operation from the synchronous operation to the position sensing operation can be made fast.

(Third Embodiment)

Figure 20:
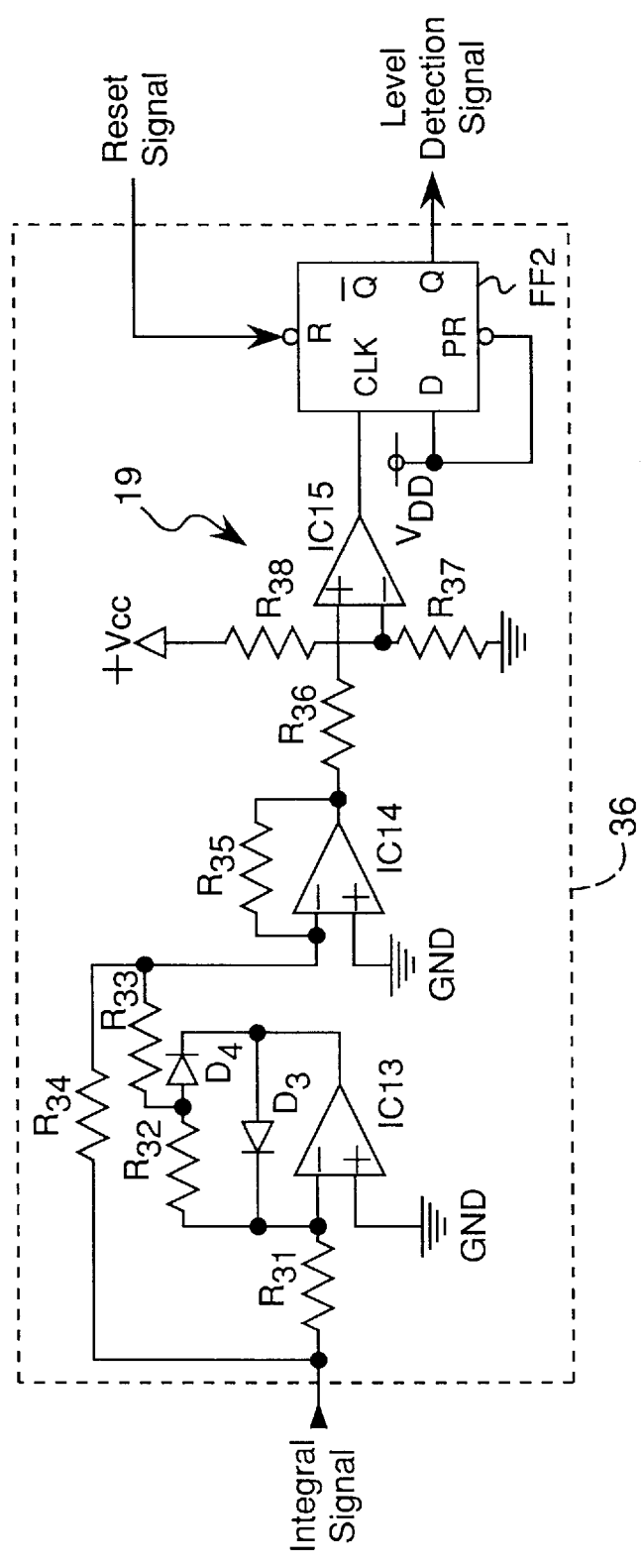
FIG. 20 is a circuit diagram of a level detector of a brushless DC motor system according to a third embodiment of the present invention.

FIG. 20 shows a circuit diagram of a level detector of a brushless DC motor system according to a third embodiment of the present invention. The present embodiment has the same construction as that of the brushless DC motor system of the second embodiment except for the level detector, and therefore no description is provided therefor.

As shown in FIG. 20, the integral signal $\int V_{MN} dt$ from the integrator 32 of the rotational-position sensor 3 is inputted to an inverted input terminal of an amplifier IC13 via a resistor $R_{31}$, and the ground GND is connected to a non-inverted input terminal of the amplifier IC13. Across an output terminal and the inverted input terminal of the amplifier IC13 are connected a diode $D_3$ with its anode put on the output terminal side, and a series circuit composed of a resistor $R_{32}$ and a diode $D_4$ connected in series from the inverted input terminal side. The cathode side of the diode $D_4$ is connected to the output terminal of the amplifier IC13. The connection point of the resistor $R_{32}$ and the diode $D_4$ connected in series is connected to an inverted input terminal of an amplifier IC14 via a resistor $R_{33}$. Further, a resistor $R_{34}$ is connected across an end of the resistor $R_{31}$ opposite from the amplifier IC13 and the inverted input terminal of the amplifier IC14. The ground GND is connected to a non-inverted input terminal of the amplifier IC14, while a resistor $R_{35}$ is connected across the inverted input terminal and the output terminal of the amplifier IC14. The output terminal of the amplifier IC14 is connected to a non-inverted input terminal of a comparator IC15 via a resistor $R_{36}$. The ground GND is connected to an inverted input terminal of the comparator IC15 via a resistor $R_{37}$, while a power source $+V_{cc}$ is connected to the inverted input terminal of the comparator IC15 via a resistor $R_{38}$. Then, an output terminal of the comparator IC15 is connected to a clock input terminal CLK of a D-flip-flop FF2. A power source $V_{DD}$ is connected to an input terminal D and an input terminal PR of the D-flip-flop FF2, and a level detection signal is outputted from an output terminal Q of the D-flip-flop FF2. Further, the reset signal from the level detector control section 60 of the microcomputer 14 shown in FIG. 13 is connected to an input terminal R of the D-flip-flop FF2. The resistors $R_{37}$ and $R_{38}$ and the comparator IC15 constitute a comparator circuit 19 which serves as exemplified voltage difference signal comparing means.

When the brushless DC motor is driven in accordance with the position signal, as shown in FIGS. 21A through 21E, the integral signal $\int V_{MN} dt$ (shown in FIG. 21A) from the integrator 32 of the rotational-position sensor 3 is inputted to the inverted input terminal of the amplifier IC13 of the level detector 36 via the resistor $R_{31}$. Then, the integral signal $\int V_{MN} dt$ is subjected to full-wave rectification by a full-wave rectifier composed of the resistors $R_{31}$ through $R_{35}$, the diodes $D_3$ and $D_4$ and the amplifier IC13 and IC14 to have a full-wave-rectified waveform (shown in FIG. 21C). Thereafter, the comparator IC15 compares the full-wave-rectified waveform with a reference value $E_3$ set by the resistors $R_{37}$ and $R_{38}$. When the full-wave-rectified waveform is greater than the reference value $E_3$, the output of the comparator IC15 comes to have H-level. When the full-wave-rectified waveform is smaller than the reference value $E_3$, the output of the comparator IC15 comes to have L-level. When the output signal (shown in FIG. 21D) of the comparator IC15 comes to have H-level, the H-level is inputted to the clock input terminal CLK of the D-flip-flop FF2, and the D-flip-flop FF2 is set in accordance with the rise from the L-level to H-level, and the level detection signal of H-level (shown in FIG. 21E) from the output terminal Q is outputted.

Figure 21:
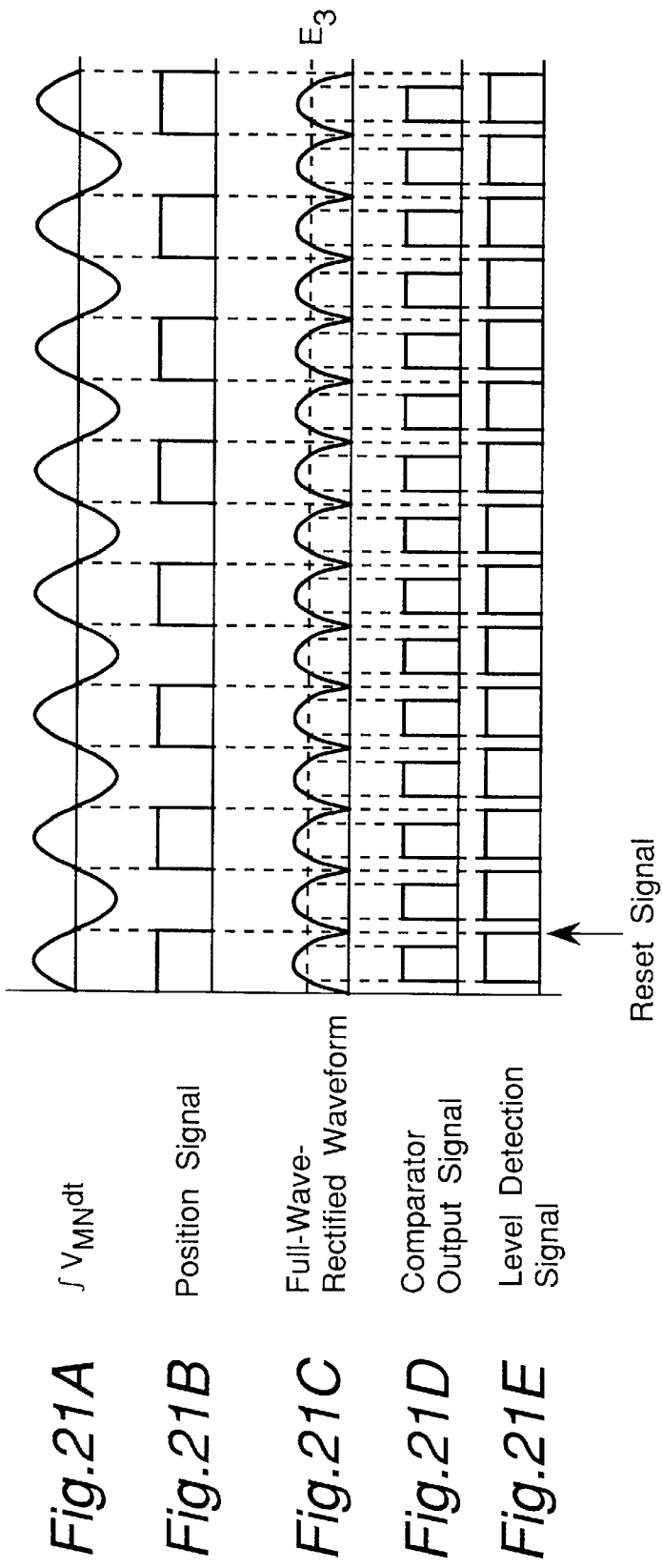
FIGS. 21A, 21B, 21C, 21D and 21E are charts showing signals at several portions when the level deciding unit of FIG. 20 is used.

Then, upon receiving the level detection signal at H-level from the level detector 36, the level detector control section 60 of the microcomputer 14 shown in FIG. 14 outputs a reset signal (L-level) in accordance with the rise or fall of the next position signal (shown in FIG. 21B). Then, upon receiving the reset signal from the level detector control section 60, the D-flip-flop FF2 is reset, and a level detection signal (shown in FIG. 21E) outputted from the output terminal Q comes to have L-level. Thus, the level detector 36 compares the integral signal $\int V_{MN} dt$ from the integrator 32 of the rotational-position sensor 3 with the specified reference value $E_3$ every half-wave, and outputs the level detection signal.

Thus, in the synchronous operation in the stage of starting, the level detector control section 60 and the voltage difference signal level deciding section 61 decide whether or not the above-mentioned voltage difference is not smaller than a specified value based on the level detection signal of the level detector 36, so that they can decide whether or not the position signal based on the voltage difference signal is stable. Therefore, the present brushless DC motor system is able to decide whether or not the position sensing operation based on the position signal from the integrator 32 of the rotational-position sensor 3 can be effected in the stage of starting, and is able to surely switch the motor operation from the synchronous operation to the position sensing operation. Furthermore, the decision is made every half wave of the integral signal, and therefore a response time for switching the motor operation from the synchronous operation to the position sensing operation can be made fast.

(Fourth Embodiment)

Figure 22:
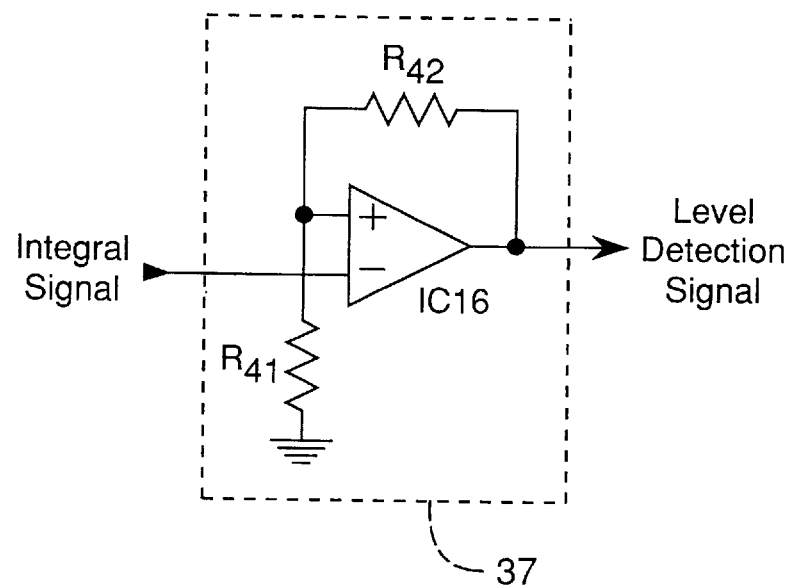
FIG. 22 is a circuit diagram of a level detector of a brushless DC motor system according to a fourth embodiment of the present invention.

FIG. 22 shows a circuit diagram of a level detector of a brushless DC motor system according to a fourth embodiment of the present invention. The present embodiment has the same construction as that of the brushless DC motor system of the first embodiment except for the level detector and a microcomputer described hereinafter, and therefore no description is provided therefor.

As shown in FIG. 22, the integral signal $\int V_{MN} dt$ from the integrator 32 of the rotational-position sensor 3 is inputted to an inverted input terminal of an amplifier IC16, and a non-inverted input terminal of the amplifier IC16 is connected to the ground GND via a resistor $R_{41}$. An output terminal and the non-inverted input terminal of the amplifier IC16 are connected to each other via a resistor $R_{42}$. The resistors $R_{41}$ and $R_{42}$ and the amplifier IC16 constitute a level detector 37 which serves as a hysteresis comparator having a hysteresis characteristic.

Figure 23:
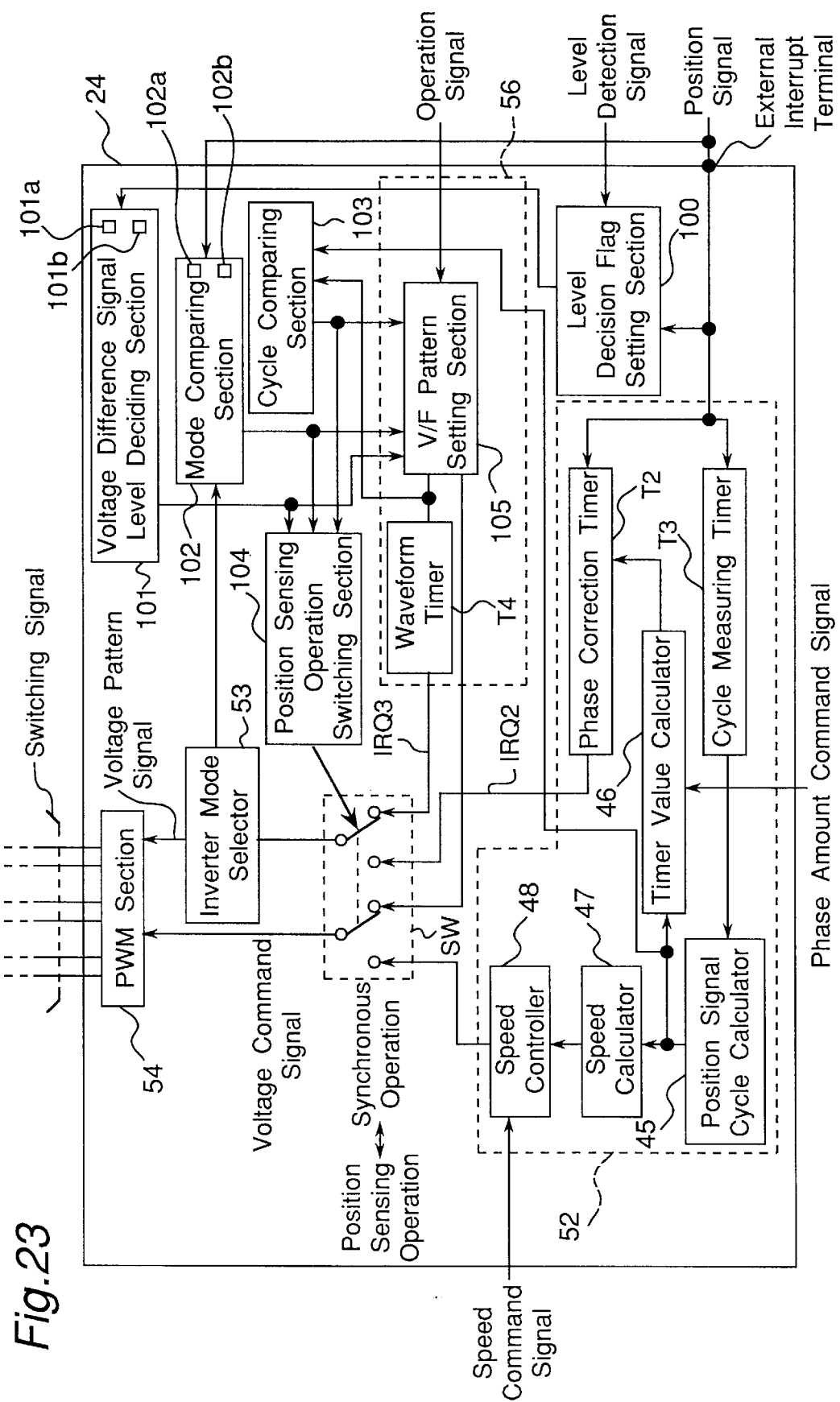
FIG. 23 is a structural diagram of a microcomputer of the brushless DC motor system of the fourth embodiment.

FIG. 23 shows a construction of a microcomputer 24 including: a level decision flag setting section 100 which receives the position signal from the rotational-position sensor 3 and the level detection signal from the level detector 37 (shown in FIG. 22); a voltage difference signal level deciding section 101 which receives a signal representing a level decision flag from the level decision flag setting section 100, and decides whether or not the level of the voltage difference signal $V_{MN}$ is not smaller than a specified value; a mode comparing section 102 which receives the position signal and serves as position signal mode comparing means for comparing the position signal with the inverter mode; a cycle comparing section 103 which serves as position signal cycle comparing means, receives a cycle signal representing the cycle of the position signal from the position signal cycle calculator 45, and compares a value of the cycle of the position signal with a value corresponding to a cycle of a position signal based on the frequency of the inverter output; a position sensing operation switching section 104 which serves as operation switching means for outputting a position sensing operation switching signal based on a decision result from the voltage difference signal level deciding section 101, a comparison result from the mode comparing section 102 and a comparison result from the cycle comparing section 103; a V/F pattern setting section 105 for outputting a voltage command signal and a frequency command signal for starting based on the decision result from the voltage difference signal level deciding section 101, the comparison result from the mode comparing section 102 and the comparison result from the cycle comparing section 103 upon receiving an input of an external operation signal; and a waveform timer T4 which receives the frequency command signal from the V/F pattern setting section 105, and outputs an interrupt signal IRQ3. The V/F pattern setting section 105 and the waveform timer T4 constitute a synchronous operation control section 56 which serves as synchronous operation control means. Further, the level detector 37, the level decision flag setting section 100 and the voltage difference signal level deciding section 101 constitute level decision means. Further, the voltage difference signal level deciding section 101 includes a number counting section 101a and a count number deciding section 101b, while the mode comparing section 102 includes a number counting section 102a and a count number deciding section 102b.

The frequency command signal from the V/F pattern setting section 105 is inputted to the cycle comparing section 103. The frequency command signal is a signal representing a timer value to be set in the waveform timer T4, and is set as a value corresponding to the cycle of the position signal based on the frequency of the inverter output. That is, because the timer value to be set in the waveform timer T4 is a value corresponding to a frequency six times as high as the frequency of the inverter output, a value corresponding to the cycle of the position signal can be obtained based on the timer value. Although the value corresponding to the cycle of the position signal is obtained from the timer value to be set in the waveform timer T4, it can be obtained based on the frequency of the inverter output of the V/F pattern setting section 105.

When the brushless DC motor is driven in accordance with the position signal and the integral signal $\int V_{MN} dt$ (shown in FIG. 24A) from the integrator 32 of the rotational-position sensor 3 is stable, as shown in FIGS. 24A through 24F, the output terminal of the amplifier IC16 comes to have L-level when the integral signal $\int V_{MN} dt$ inputted to the inverted input terminal of the amplifier IC16 of the level detector 37 exceeds a reference value $E_4$. and the output terminal of the amplifier IC16 comes to have H-level when the integral signal becomes smaller than a reference value $E_5$. That is, the level detection signal (shown in FIG. 24C) of the level detector 37 becomes a signal having a varied phase and same cycle with respect to the position signal (shown in FIG. 24B). In contrast to the above, when the integral signal $\int V_{MN} dt$ is unstable as shown in FIG. 24D where the integral signal $\int V_{MN} dt$ does neither exceed the reference value $E_4$ nor become smaller than the reference value $E_5$, the level detection signal (shown in FIG. 24F) has a lower frequency and a varied duty ratio with respect to the position signal (shown in FIG. 24E). That is, the unstable state of the integral signal appears as variations of the frequency and the duty ratio of the level detection signal, and with this variation, the stability or instability of the position signal can be detected based on the integral signal.

Further, as shown in FIGS. 25A–25H, when the integral signal $\int V_{MN} dt$ (shown in FIG. 25A) from the integrator 32 of the rotational-position sensor 3 is stable, and an absolute value of a difference between the timer value of the cycle measuring timer T3 (shown in FIG. 25C) and the timer value of the waveform timer T4 (shown in FIG. 25D) becomes smaller than a specified value, the position sensing operation can be effected based on the position signal (shown in FIG. 25B). In contrast to the above, when the integral signal $\int V_{MN} dt$ is unstable as shown in FIG. 25E, and the absolute value of the difference between the timer value of the cycle measuring timer T3 (shown in FIG. 25G) and the timer value of the waveform timer T4 (shown in FIG. 25H) exceeds the specified value, the position sensing operation cannot be effected based on the position signal (shown in FIG. 25F). The timer value of the cycle measuring timer T3 is expressed by a cycle signal representing the cycle of the position signal from the position signal cycle calculator 45, and the timer value of the waveform timer T4 is expressed by the frequency command signal from the V/F pattern setting section 105. Then, based on the cycle signal and the frequency command signal, the cycle comparing section 103 decides whether or not the absolute value of the difference between the timer value of the cycle measuring timer T3 and the timer value of the waveform timer T4 is not greater than a specified value.

Operation of the microcomputer 24 in the stage of starting will be described below according to flowcharts of FIGS. 26, 27 and 28. It is to be noted that the operation switching switch SW is selected to the synchronous operation side prior to starting, where the interrupt signal IRQ3 of the waveform timer T4 is inputted to the inverter mode selector 53, and the voltage command signal of the V/F pattern setting section 105 is inputted to the PWM section 54.

First, when an operation signal is inputted externally to the microcomputer 24, the V/F pattern setting section 105 outputs the frequency command signal to start the waveform timer T4. When the counting of the waveform timer T4 is completed, the interrupt signal IRQ3 is outputted from the waveform timer T4, and an interrupt handling 21 is executed at intervals of occurrence of the interrupt signal IRQ3.

Figure 26:
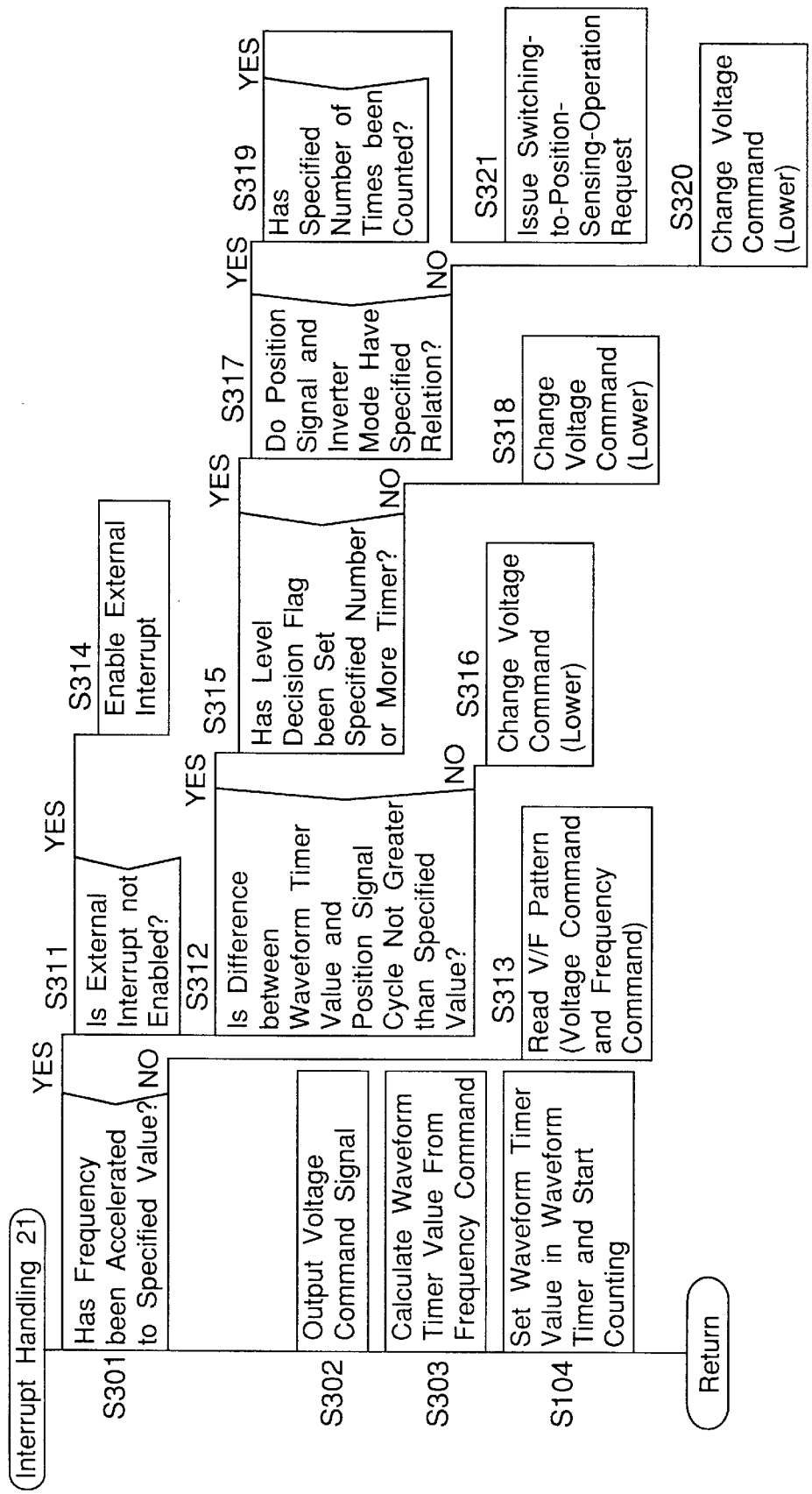
FIG. 26 is a flowchart showing an interrupt handling of a synchronous operation of the microcomputer of the fourth embodiment.

In FIG. 26, it is decided whether or not the frequency has been increased to a specified value at step S301. When it is decided that the frequency has been increased to the specified value, the program flow proceeds to step S311. When it is decided that the frequency has not been increased to the specified value, the program flow proceeds to step S313. Then, at step S313, V/F pattern data (for the voltage command signal and the frequency command signal) preparatorily stored in a table are read, and the program flow proceeds to step S302.

Then, at step S311, it is decided whether or not an external interrupt is enabled. When it is decided that the external interrupt is not enabled, the program flow proceeds to step S314 to enable the external interrupt, and the program flow proceeds to step S312. When the external interrupt is enabled at step S311, the program flow proceeds to step S312. When the external interrupt is enabled at step S314, an interrupt handling 22 as described hereinafter is executed every time the position signal rises or falls.

Then, at step S312, it is decided whether or not the absolute value of the difference between the waveform timer value set in the waveform timer T4 and the cycle of the position signal is not greater than a specified value. That is, it is decided in the cycle comparing section 103 whether or not the absolute value of the difference between the waveform timer value that is the frequency command signal from the V/F pattern setting section 105 and corresponds to the cycle of the position signal based on the frequency of the inverter output and the value of the cycle of the position signal based on the cycle signal from the position signal cycle calculator 45 is not greater than the specified value. When it is decided that the difference between the waveform timer value and the cycle of the position signal is not greater than the specified value, the program flow proceeds to step S315. When it is decided that the difference between the waveform timer value and the cycle of the position signal exceeds the specified value, the program flow proceeds to step S316 to change the voltage command and lower the inverter output voltage, and the program flow proceeds to step S302.

Then, at step S315, it is decided whether or not the level decision flag has been set a specified number or more times. That is, the number counting section 101a of the voltage difference signal level deciding section 101 counts the number of times of continuous setting of the level decision flag in the level decision flag setting section 100, and the count number deciding section 101b decides whether or not the specified number of times has been counted. When the number of times of setting of the level decision flag is not smaller than a specified number of times, it is decided that the level detection signal has a specified pattern, and the program flow proceeds to step S317. When the number of times of setting of the level decision flag is smaller than the specified number of times, the program flow proceeds to step S318. Then, the voltage command is changed to lower the inverter output voltage at step S318, and the program flow proceeds to step S302.

Then, at step S317, it is decided whether or not the position signal and the inverter mode have a specified relation. That is, as shown in FIGS. 7A through 7D of the first embodiment, it is decided whether or not the position signal is at H-level at the point where the inverter mode changes to an odd number, and the position signal is at L-level at the point where the inverter mode changes to an even number. When the position signal and the inverter mode have the specified relation at step S317, the program flow proceeds to step S319. When the position signal and the inverter mode do not have the specified relation, the program flow proceeds to step S320. Then, the voltage command is changed to lower the inverter output voltage at step S320, and the program flow proceeds to step S302.

Then, at step S319, the number of continuously repeated events in which the inverter mode corresponds to the H- and L-levels of the position signal is counted in the number counting section 102a of the mode comparing section 102, and the count number deciding section 102b of the mode comparing section 102 decides whether or not a specified number of times has been counted. That is, as shown in FIGS. 7A through 7D of the first embodiment, it is decided whether or not the events satisfying the condition that the position signal is at H-level at the point where the inverter mode changes to an odd number (e.g., from 2 to 3, or from 4 to 5) and the position signal is at L-level at the point where the inverter mode changes to an even number (e.g., from 3 to 4, or from 5 to 0) has been counted continuously specified number of times. When it is decided that the specified number of times has been counted at step S319, the program flow proceeds to step S321 to issue a switching-to-position-sensing-operation request, and the program flow proceeds to step S302. When it is decided that the specified number of times has not been counted at step S319, the program flow proceeds to step S302.

Then, a voltage command signal is outputted based on the voltage command at step S302. Then, the program flow proceeds to step S303 to calculate a timer value of the waveform timer T4 according to a frequency command set in the V/F pattern setting section 104, i.e., the frequency data stored preparatorily in the table. Then, the program flow proceeds to step S304 to set in the waveform timer T4 the timer value obtained at step S303 and start the waveform timer T4, the interrupt handling 21 ends.

Figure 27:
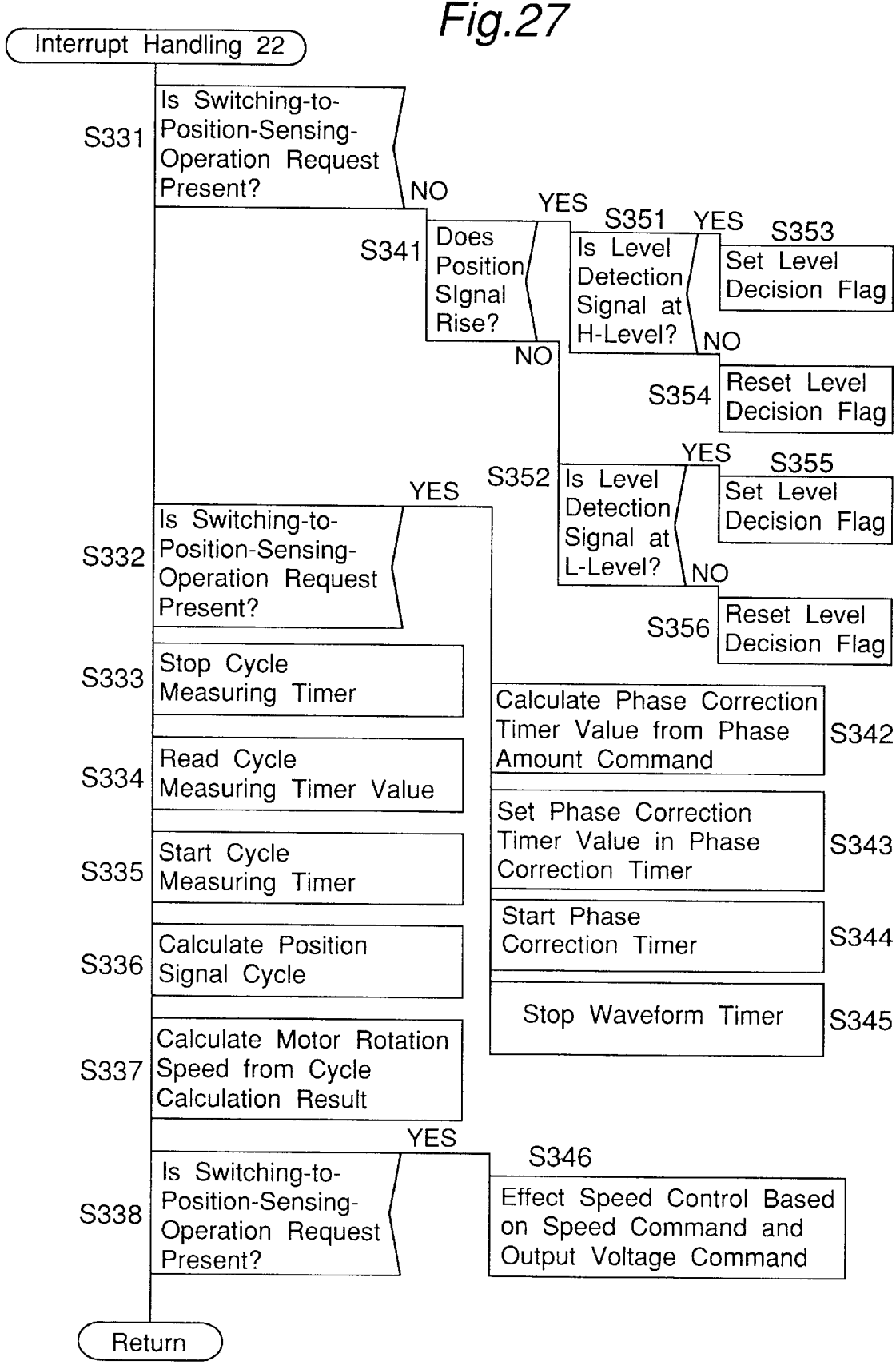
FIG. 27 is a flowchart showing an interrupt handling of a position sensing operation of the microcomputer of the fourth embodiment.

Then, the operation switching switch SW is switched to the position sensing operation side in response to the switching-to-position-sensing-operation request issued at step S321 of the interrupt handling 21, and the interrupt handling 22 shown in FIG. 27 is executed every time the position signal inputted to an external interrupt terminal of the microcomputer 24 rises or falls.

First, in FIG. 27, it is decided whether or not the switching-to-position-sensing-operation request is present at step S331. When the switching-to-position-sensing-operation request is not present, the program flow proceeds to step S341, and then the level decision flag setting section 100 decides whether or not the position signal from the rotational-position sensor 3 rises. When it is decided that the position signal rises at step S341, the program flow proceeds to step S351. When it is decided that the position signal does not rise, the program flow proceeds to step S352. Then, at step S351, the level decision flag setting section 100 decides whether or not the level detection signal from the level detector 37 is at H-level. When it is decided that the level detection signal is at H-level, the program flow proceeds to step S353 to set the level decision flag. When it is decided that the level detection signal is not at H-level at step S351, the program flow proceeds to step S354 to reset the level decision flag.

When the program flow proceeds to step S352, the level decision flag setting section 100 decides whether or not the level detection signal from the level detector 37 is at L-level. When it is decided that the level detection signal is at L-level, the program flow proceeds to step S355 to set the level decision flag. When it is decided that the level detection signal is not at L-level at step S352, the program flow proceeds to step S356 to reset the level decision flag. The number counting section 101a of the voltage difference signal level deciding section 101 counts the number of times of continuously setting the level decision flag in the level decision flag setting section 100. The level decision flag is reset in the initial state.

Then, it is decided whether or not the switching-to-position-sensing-operation request is present at step S332. When it is decided that the switching-to-position-sensing-operation request is present, the program flow proceeds to step S342. When it is decided that the switching-to-position-sensing-operation request is not present, the program flow proceeds to step S333. Then, at step S342, the phase correction timer value for the phase correction timer T2 is calculated based on the external phase amount command in the timer value calculator 46. Then, the program flow proceeds to step S343 to set in the phase correction timer T2 the phase correction timer value obtained at step S342. Then, the phase correction timer T2 is started at step S344, and the program flow proceeds to step S345 to stop the waveform timer T4, and then proceeds to step S333.

Then, the cycle measuring timer T3 is stopped at step S333, and the program flow proceeds to step S334 to read the timer value of the cycle measuring timer T3. Then, the program flow proceeds to step S335 to start the cycle measuring timer T3. Then, at step S336, the position signal cycle calculator 45 calculates the cycle of the position signal from the timer value of the cycle measuring timer T3. Then, at step S337, the speed calculator 47 calculates a rotation speed of the motor based on the cycle of the position signal obtained at step S336.

Then, the program flow proceeds to step S338 to decide whether or not the switching-to-position-sensing-operation request is present. When it is decided that the switching-to-position-sensing-operation request is present, the program flow proceeds to step S346 to effect speed control based on the speed command signal and output a voltage command signal, and the interrupt handling 22 ends. When it is decided that the switching-to-position-sensing-operation request is not present at step S338, the interrupt handling 22 ends.

Figure 28:
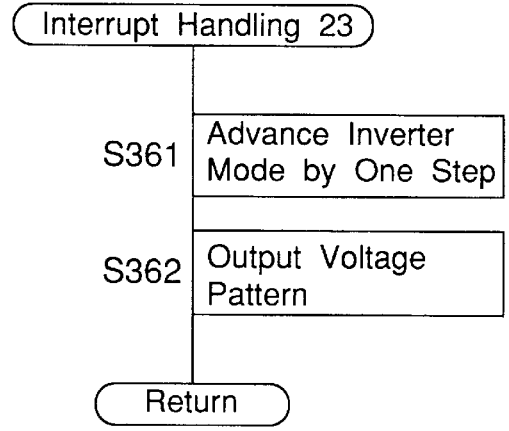
FIG. 28 is a flowchart showing an interrupt handling through interruption by a phase correction timer of the microcomputer of the fourth embodiment.

When the counting of the phase correction timer T2 started in the interrupt handling 22 is completed, the phase correction timer T2 outputs the interrupt signal IRQ2 to execute an interrupt handling 23 as shown in FIG. 28 every time the interrupt signal IRQ2 is generated.

That is, when the counting of the phase correction timer T2 is completed to output the interrupt signal IRQ2, the interrupt handling 23 starts. The inverter mode selector 53 advances the inverter mode by one step at step S361, and outputs a voltage pattern at step S362 to end the interrupt handling 23.

Thus, by the operations of the voltage difference signal level deciding section 101, the mode comparing section 102, and the cycle comparing section 103, it can be decided whether or not the position sensing operation based on the position signal from the rotational-position sensor 3 can be effected even when the characteristic of the voltage difference signal varies due to the variation of the load and the fluctuation of the power voltage in the stage of starting, thereby surely switching the motor operation from the synchronous operation to the position sensing operation.

Furthermore, when the level detection signal obtained by comparing in the level detector 37 the integral signal $\int V_{MN} dt$ from the integrator 32 of the rotational-position sensor 3 with the reference values $E_4$ and $E_5$ based on the hysteresis characteristic has a specified pattern, it can be decided that the voltage difference is not smaller than the specified value. Therefore, the level decision means can be simply constituted by the level detector 37 using neither a full-wave rectifier nor a plurality of comparator.

(Fifth Embodiment)

Figure 29:
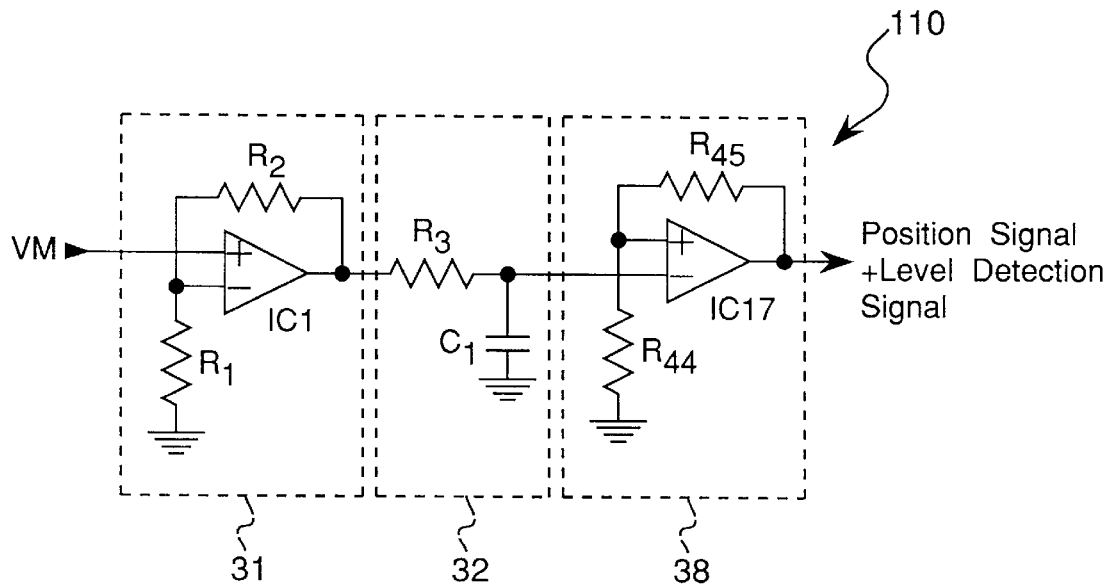
FIG. 29 is a circuit diagram of a position sensing circuit of a brushless DC motor system according to a fifth embodiment of the present invention.

FIG. 29 shows a circuit diagram of a rotational-position sensor of a brushless DC motor system according to a fifth embodiment of the present invention. The present embodiment has the same construction as that of the brushless DC motor system of the first embodiment having no level detector, except for the rotational-position sensor and a microcomputer described hereinafter, and therefore no description is provided therefor.

As shown in FIG. 29, a rotational-position sensor 110 includes a differential amplifier 31 and an integrator 32 which serve as voltage difference detecting means and integration means, respectively, of the rotational-position sensor 3 of the first embodiment shown in FIG. 1, and a hysteresis comparator 38. The hysteresis comparator 38 is comprised of an amplifier IC17 having its inverted input terminal connected to the integral signal $\int V_{MN}dt$ from the integrator 32, a resistor $R_{44}$ which connects a non-inverted input terminal of the amplifier IC17 to the ground GND, and a resistor $R_{45}$ which connects together an output terminal and the non-inverted input terminal of the amplifier IC17. The hysteresis comparator 38 has a hysteresis characteristic.

Figure 30:
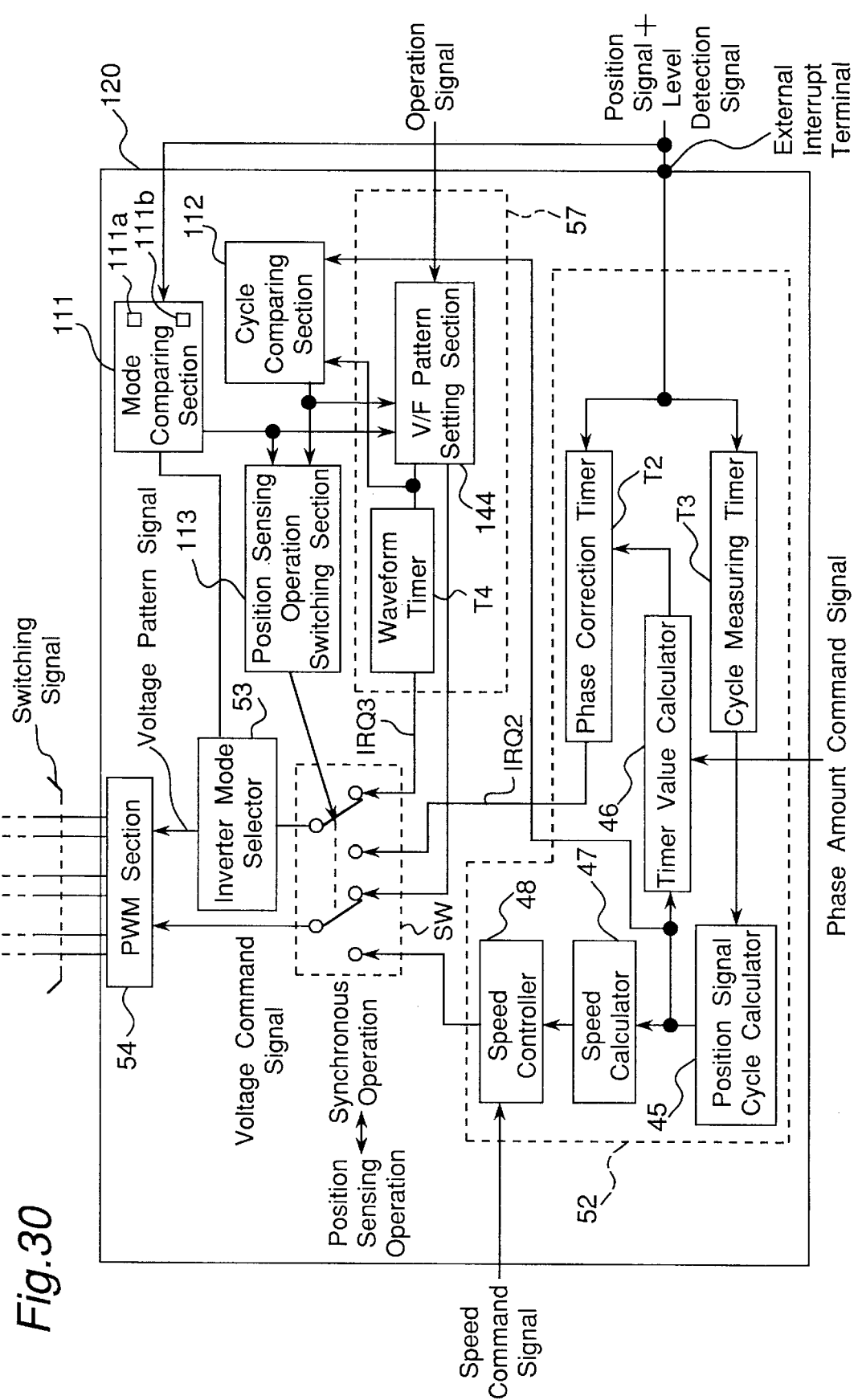
FIG. 30 is a structural diagram of a microcomputer of the brushless DC motor system of the fifth embodiment.

FIG. 30 shows a construction of a microcomputer 120 including: a mode comparing section 111 which is connected to the "position signal+level detection signal", and serves as position signal mode comparing means for comparing the "position signal+level detection signal" with the inverter mode; a cycle comparing section 112 which receives the cycle signal representing the cycle of the position signal from the position signal cycle calculator 45 and serves as position signal cycle comparing means for comparing a value of the cycle of the position signal with a value corresponding to the cycle of the position signal based on the frequency of the inverter output; a position sensing operation switching section 113 which outputs a position sensing operation switching signal based on a comparison result from the mode comparing section 111 and a comparison result from the cycle comparing section 112; a V/F pattern setting section 114 which outputs a voltage command signal and the frequency command signal for starting upon receiving an input of an external operation signal based on the comparison result from the mode comparing section 111 and the comparison result from the cycle comparing section 112; and a waveform timer T4 which receives the frequency command signal from the V/F pattern setting section 114 and outputs an interrupt signal IRQ3. The V/F pattern setting section 114 and the waveform timer T4 constitute a synchronous operation control section 57 as synchronous operation control means. The mode comparing section 111 includes a counting section 111a and a count deciding section 111b.

It is to be noted that the frequency command signal from the V/F pattern setting section 114 is input to the cycle comparing section 112. The frequency command signal is a signal representing a timer value to be set in the waveform timer T4, and a value corresponding to the cycle of the position signal based on the frequency of the inverter output is obtained from the frequency command signal.

The brushless DC motor is driven in accordance with the position signal. In this case that the integral signal $\int V_{MN}dt$ (shown in FIG. 31A) from the integrator 32 of the rotational-position sensor 110 is stable, the output terminal of the amplifier IC17 comes to have L-level when the integral signal inputted to the inverted input terminal of the amplifier IC17 of the hysteresis comparator 38 exceeds a reference value $E_6$. When the integral signal becomes smaller than a reference value $E_7$, the output terminal of the amplifier IC17 comes to have H-level. Then, the rotational-position sensor 110 outputs the "position signal+level detection signal" (shown in FIG. 31B) based on the reference values $E_6$ and $E_7$. In contrast to the above, when the integral signal $\int V_{MN}dt$ is unstable as shown in FIG. 31C where it does neither exceed the reference value $E_6$ nor become smaller than the reference value $E_7$, the "position signal+level detection signal" (shown in FIG. 31D) has a lower frequency and a varied duty ratio relative to the "position signal+level detection signal" in FIG. 31B. That is, the unstable state of the integral signal appears as variations of the frequency and the duty ratio of the "position signal+level detection signal", and with this variation, the stability and instability of the position signal based on the integral signal can be detected.

Operation of the microcomputer 120 in the stage of starting will be described below according to flowcharts of FIGS. 32, 33 and 34. It is to be noted that, prior to starting, the operation switching switch SW is set to the synchronous operation side, wherein the interrupt signal IRQ3 of the waveform timer T4 is inputted to the inverter mode selector 53, and the voltage command signal of the V/F pattern setting section 114 is inputted to the PWM section 54.

First, when an operation signal is inputted externally to the microcomputer 120, the V/F pattern setting section 114 outputs the frequency command signal to start the waveform timer T4. When the counting of the waveform timer T4 is completed, the interrupt signal IRQ3 is outputted from the waveform timer T4, and an interrupt handling 31 is executed at intervals of occurrence of the interrupt signal IRQ3.

Figure 32:
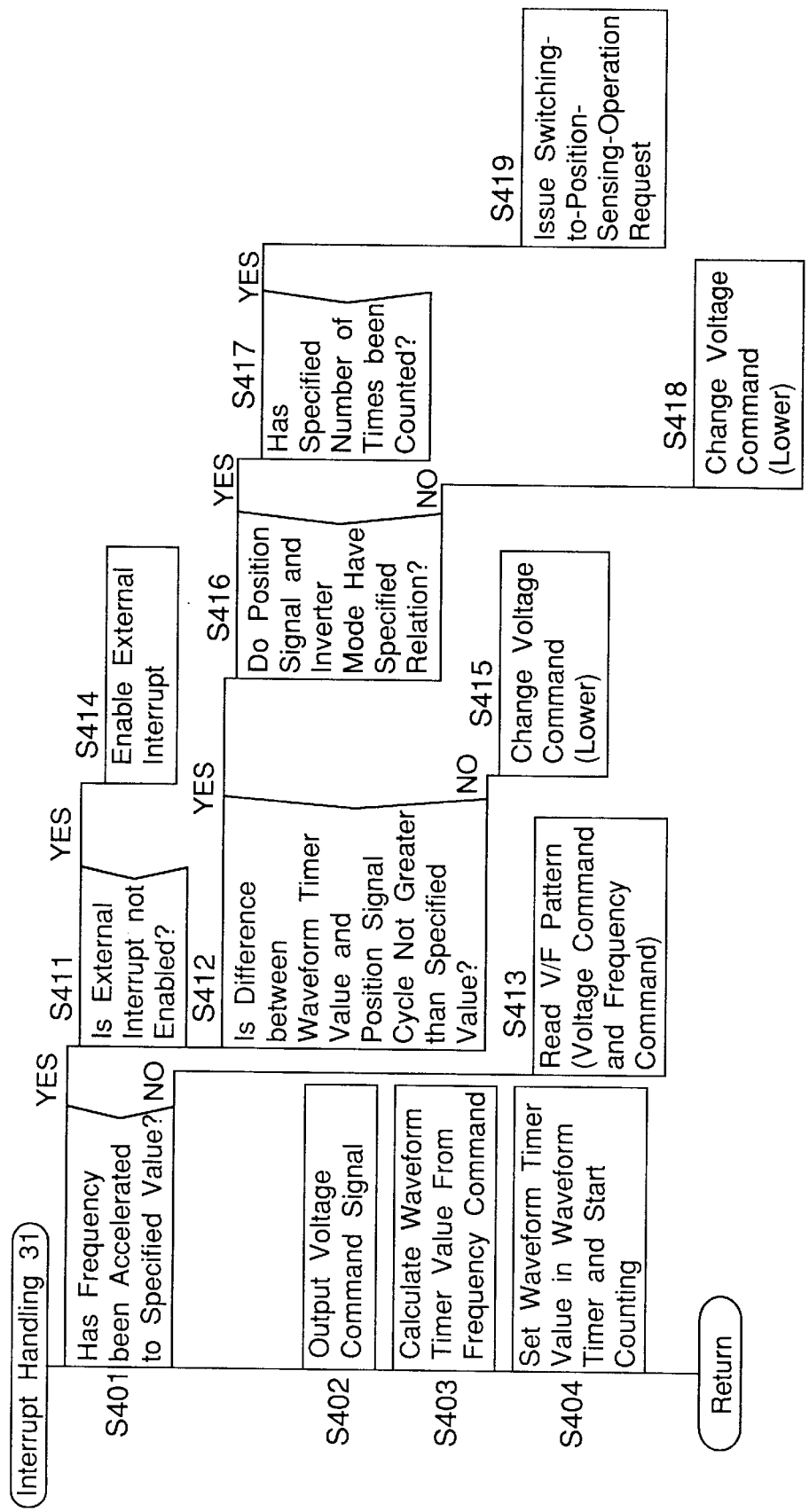
FIG. 32 is a flowchart showing an interrupt handling of a synchronous operation of the microcomputer of the fourth embodiment.

Referring to FIG. 32, it is decided whether or not the frequency has been increased to a specified value due to the acceleration at step S401. When it is decided that the frequency has been increased to the specified value, the program flow proceeds to step S411. When it is decided that the frequency has not been accelerated to the specified value, the program flow proceeds to step S413. Then, at step S413, V/F pattern data (for the voltage command signal and the frequency command signal) previously stored in a table are read, and the program flow proceeds to step S402. Then, at step S411, it is decided whether or not an external interrupt is enabled. When it is decided that the external interrupt is not enabled, the program flow proceeds to step S414 to enable the external interrupt, and the program flow proceeds to step S412. When the external interrupt is enabled at step S411, the program flow proceeds to step S412. When the external interrupt is enabled at step S414, an interrupt handling 32 as described later is executed every time the position signal rises or falls.

Then, at step S412, it is decided whether or not the difference between the waveform timer value and the cycle of the position signal is not greater than a specified value. That is, it is decided in the cycle comparing section 112 whether or not the absolute value of the difference between the timer value that is the frequency command signal from the V/F pattern setting section 114 and corresponds to the cycle of the position signal based on the frequency of the inverter output and the value of the cycle of the position signal based on the cycle signal from the position signal cycle calculator 45 is not greater than the specified value. When it is decided that the difference between the waveform timer value and the cycle of the position signal is not greater than the specified value, the program flow proceeds to step S416. When it is decided that the difference between the waveform timer value and the cycle of the position signal is greater than the specified value, the program flow proceeds to step S415 to change the voltage command and lower the inverter output voltage, and the program flow proceeds to step S402.

Then, at step S416, it is decided whether or not the position signal and the inverter mode have a specified relation. That is, as shown in FIGS. 7A through 7D of the first embodiment, it is decided whether or not the position signal is at H-level at the point where the inverter mode changes to an odd number, and the position signal is at L-level at the point where the inverter mode changes to an even number. When the position signal and the inverter mode have the specified relation at step S416, the program flow proceeds to step S417. When the position signal and the inverter mode do not have the specified relation, the program flow proceeds to step S418 to change the voltage command and lower the inverter output voltage, and the program flow proceeds to step S402.

Then, at step S417, the counting section 111a of the mode comparing section 111 counts the number of continuously repeated events in which the inverter mode corresponds to the H- and L-levels of the position signal and then the count deciding section 111b of the mode comparing section 111 decides whether or not a specified number of times has been counted. That is, as shown in FIGS. 7A through 7D of the first embodiment, it is decided whether or not events satisfying the condition that the position signal is at H-level at the point where the inverter mode changes to an odd number (e.g., from 2 to 3, or from 4 to 5) and the position signal is at L-level at the point where the inverter mode changes to an even number (e.g., from 3 to 4, or from 5 to 0) have been counted continuously specified number of times. When it is decided that the specified number of times has been counted at step S417, the program flow proceeds to step S419 to issue a switching-to-position-sensing-operation request, and the program flow proceeds to step S402. When it is decided that the specified number of times has not been counted at step S417, the program flow proceeds to step S402.

Then, a voltage command signal is outputted based on the voltage command at step S402. Then, the program flow proceeds to step S403 to calculate a timer value of the waveform timer T4 according to a frequency command set in the V/F pattern setting section 114, i.e., the frequency data stored preparatorily in the table. Then, the program flow proceeds to step S404 to set in the waveform timer T4 the timer value obtained at step S403 and start the waveform timer T4, and the interrupt handling 31 ends.

Figure 33:
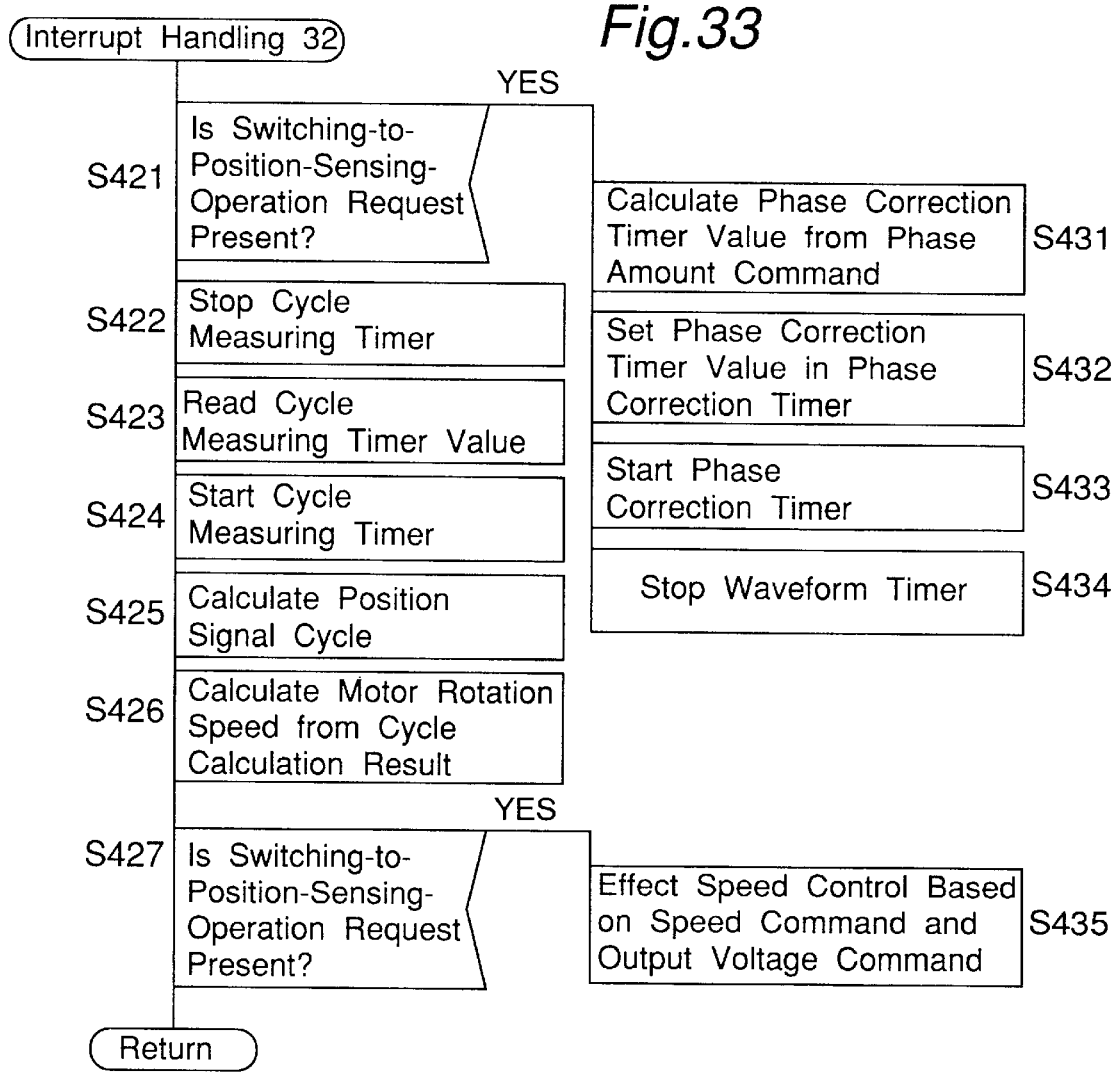
FIG. 33 is a flowchart showing an interrupt handling of a position sensing operation of the microcomputer of the fourth embodiment.

Then, the operation switching switch SW is switched to the position sensing operation side in response to the switching-to-position-sensing-operation request issued at step S419 of the interrupt handling 31, and the interrupt handling 32 shown in FIG. 33 is executed every time the position signal inputted to an external interrupt terminal of the microcomputer 120 rises and falls.

First, in FIG. 33, it is decided whether or not the switching-to-position-sensing-operation request is present at step S421. When it is decided that the switching-to-position-sensing-operation request is present, the program flow proceeds to step S431. When it is decided that the switching-to-position-sensing-operation request is not present, the program flow proceeds to step S422. Then, at step S431, the phase correction timer value for the phase correction timer T2 is calculated based on the external phase amount command in the timer value calculator 46. Then, the program flow proceeds to step S432 to set in the phase correction timer T2 the phase correction timer value obtained at step S431. Then, the phase correction timer T2 is started at step S433, and the program flow proceeds to step S434 to stop the waveform timer T4, and then proceeds to step S422.

Then, the cycle measuring timer T3 is stopped at step S422, and the program flow proceeds to step S423 to read the timer value of the cycle measuring timer T3. Then, the program flow proceeds to step S424 to start the cycle measuring timer T3. Then, at step S425, the position signal cycle calculator 45 calculates the cycle of the position signal from the timer value of the cycle measuring timer T3. Then, at step S426, the speed calculator 47 calculates a rotation speed of the motor based on the cycle of the position signal obtained at step S425.

Then, the program flow proceeds to step S427 to decide whether or not the switching-to-position-sensing-operation request is present. When it is decided that the switching-to-position-sensing-operation request is present, the program flow proceeds to step S435 to effect speed control based on the speed command signal and output a voltage command signal, and the interrupt handling 32 ends. When it is decided that the switching-to-position-sensing-operation request is not present at step S427, the interrupt handling 32 ends.

Figure 34:
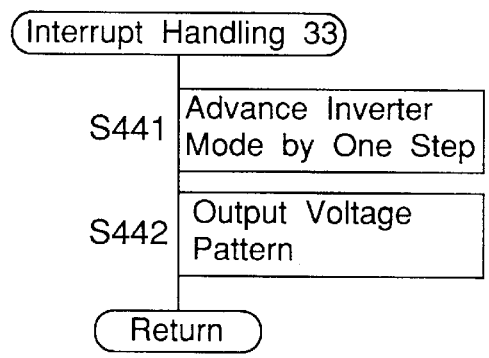
FIG. 34 is a flowchart showing an interrupt handling through interruption by a phase correction timer of the microcomputer of the fourth embodiment.
Figure 35:
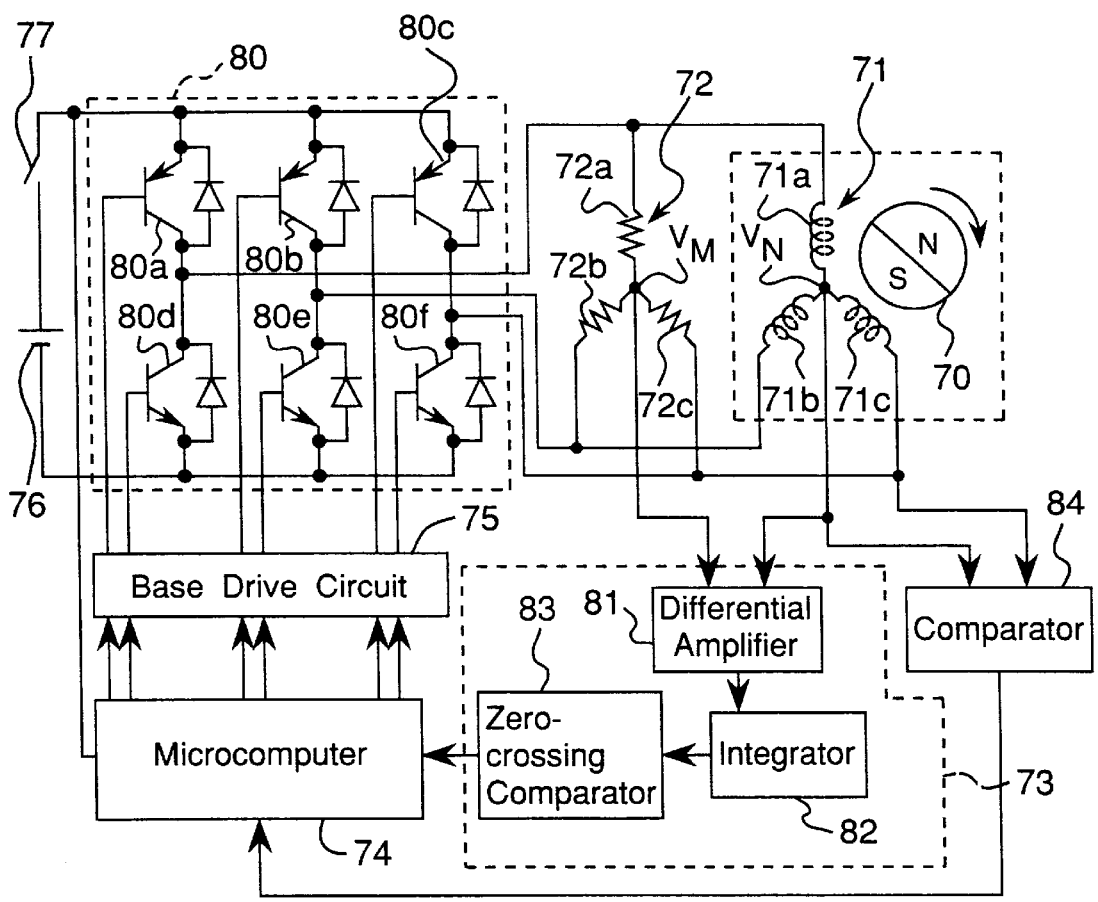
FIG. 35 is a structural diagram of a prior art brushless DC motor system.
Figure 36:
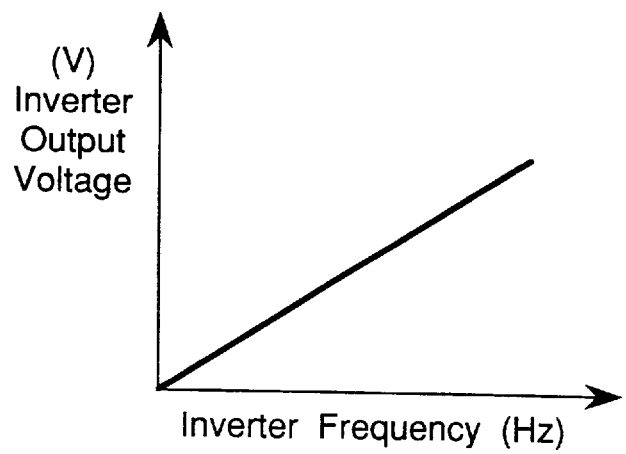
FIG. 36 is a graph showing a relation between an inverter frequency and an inverter output voltage in the stage of starting of the prior art brushless DC motor system of FIG. 35.
Figure 37:
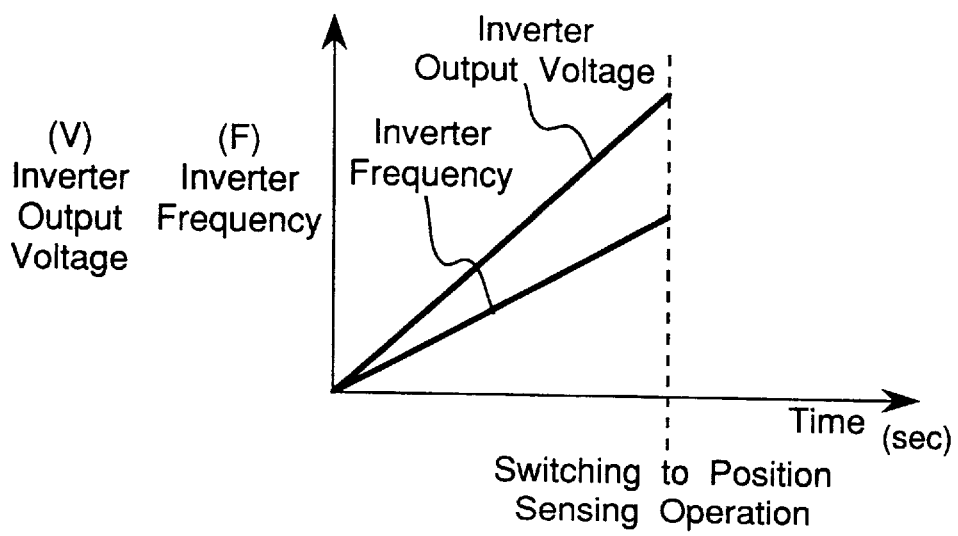
FIG. 37 is a graph showing variations of the inverter output voltage and the inverter frequency in the stage of starting of the brushless DC motor system of FIG. 35.
Figure 38:
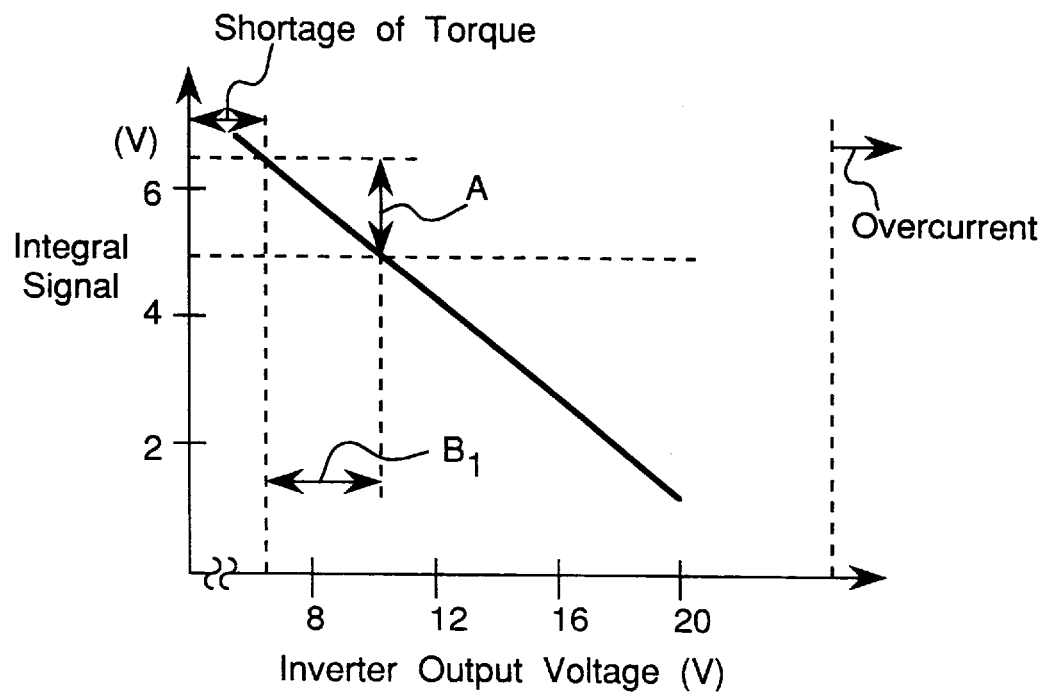
FIG. 38 is a graph showing a characteristic of an integral signal relative to the inverter output voltage when the inverter frequency is 12 Hz and there is no load in the prior art brushless DC motor system of FIG. 35.
Figure 39:
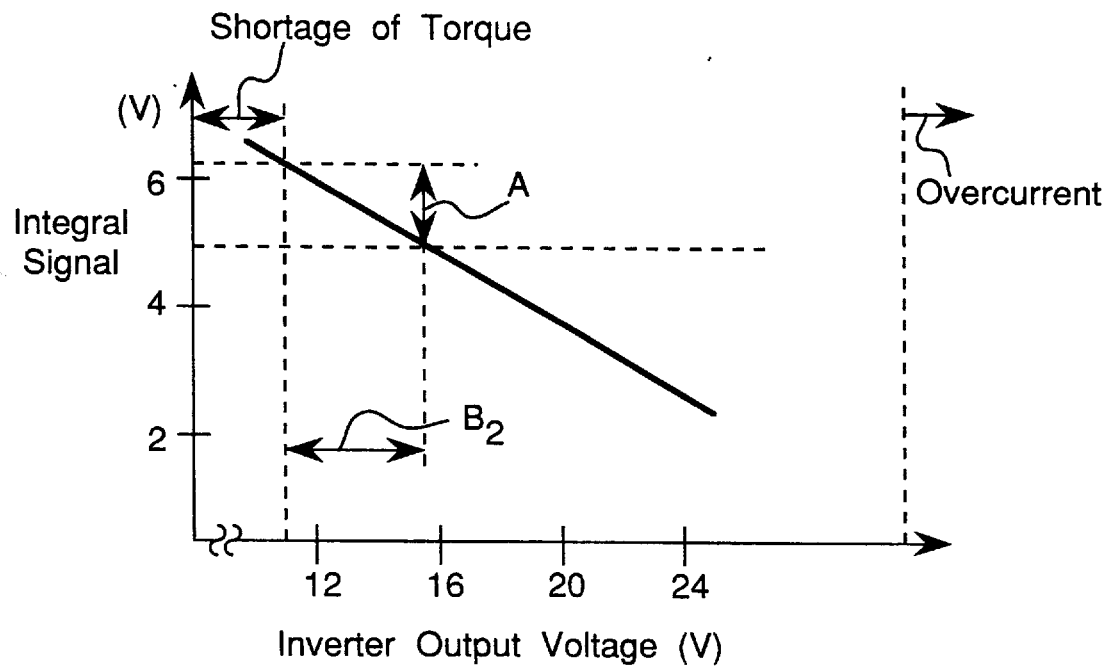
FIG. 39 is a graph showing a characteristic of an integral signal relative to the inverter output voltage when the inverter frequency is 20 Hz and there is no load in the prior brushless DC motor system of FIG. 35.
Figure 40:
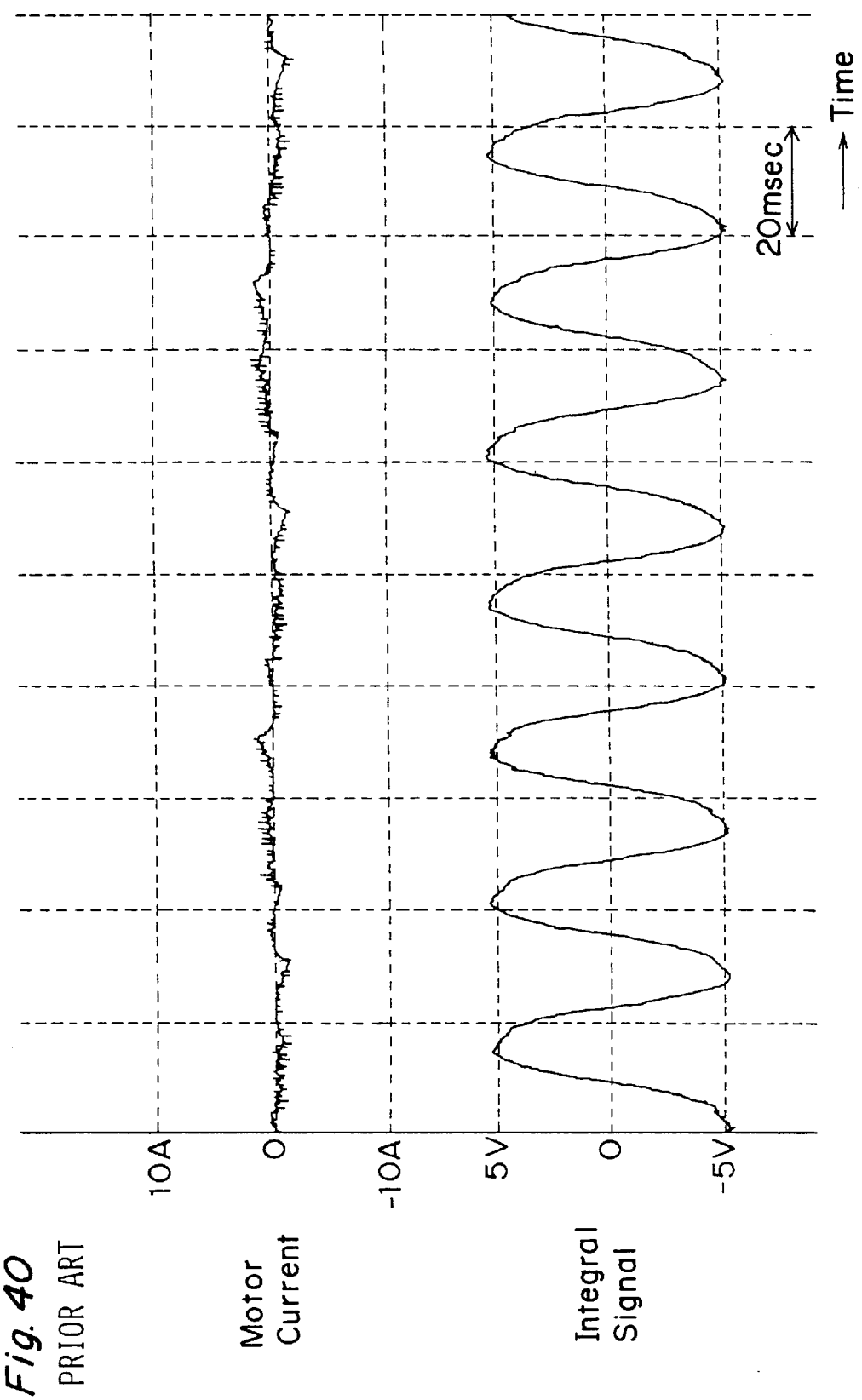
FIG. 40 is a chart showing waveforms of a motor current and the integral signal when the inverter frequency is 12 Hz and the inverter output voltage is 10 V in the prior art brushless DC motor system of FIG. 35.
Figure 41:
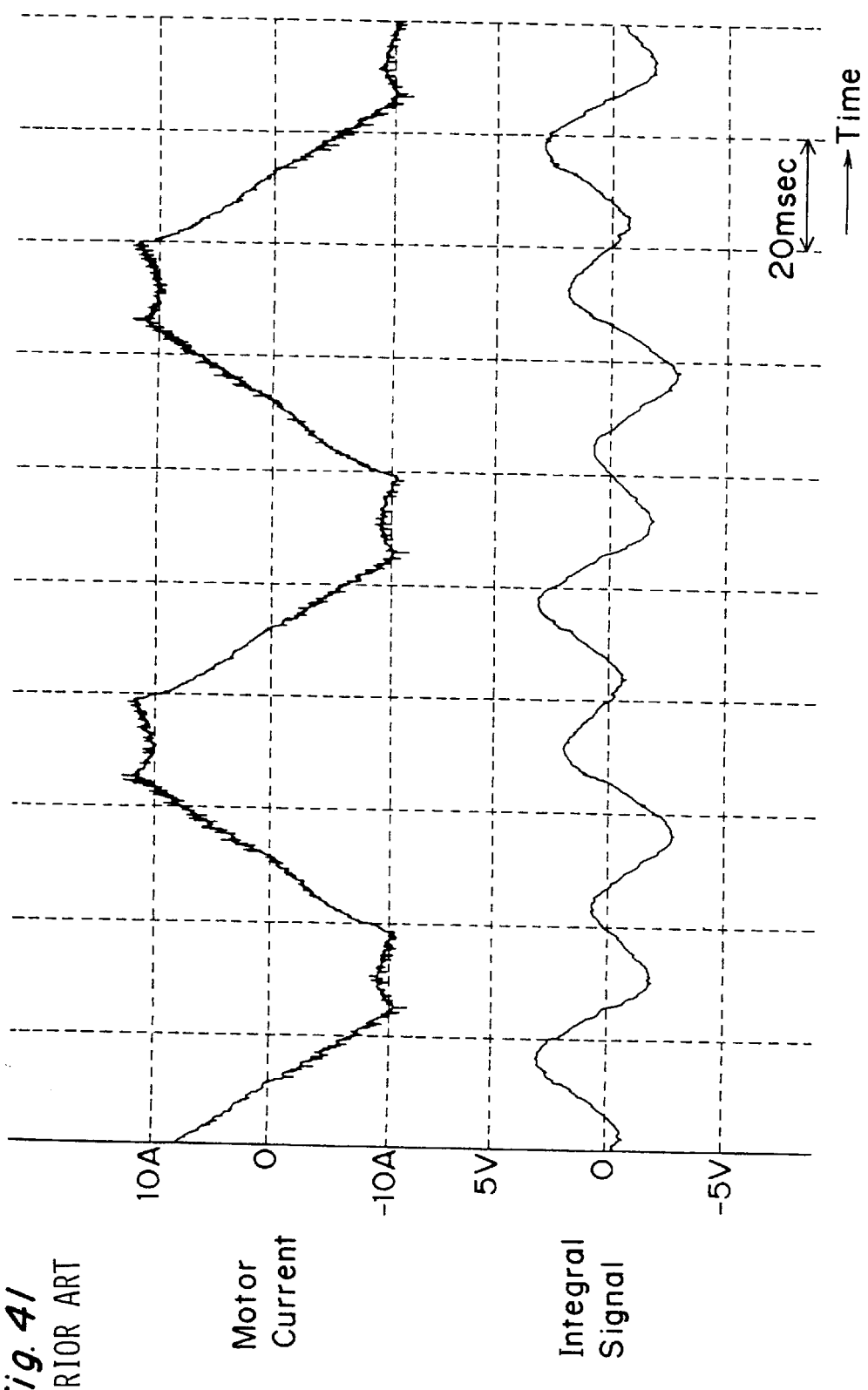
FIG. 41 is a chart showing waveforms of the motor current and the integral signal when the inverter frequency is 12 Hz and the inverter output voltage is 20 V in the priorary brushless DC motor system of FIG. 35.
Figure 42:
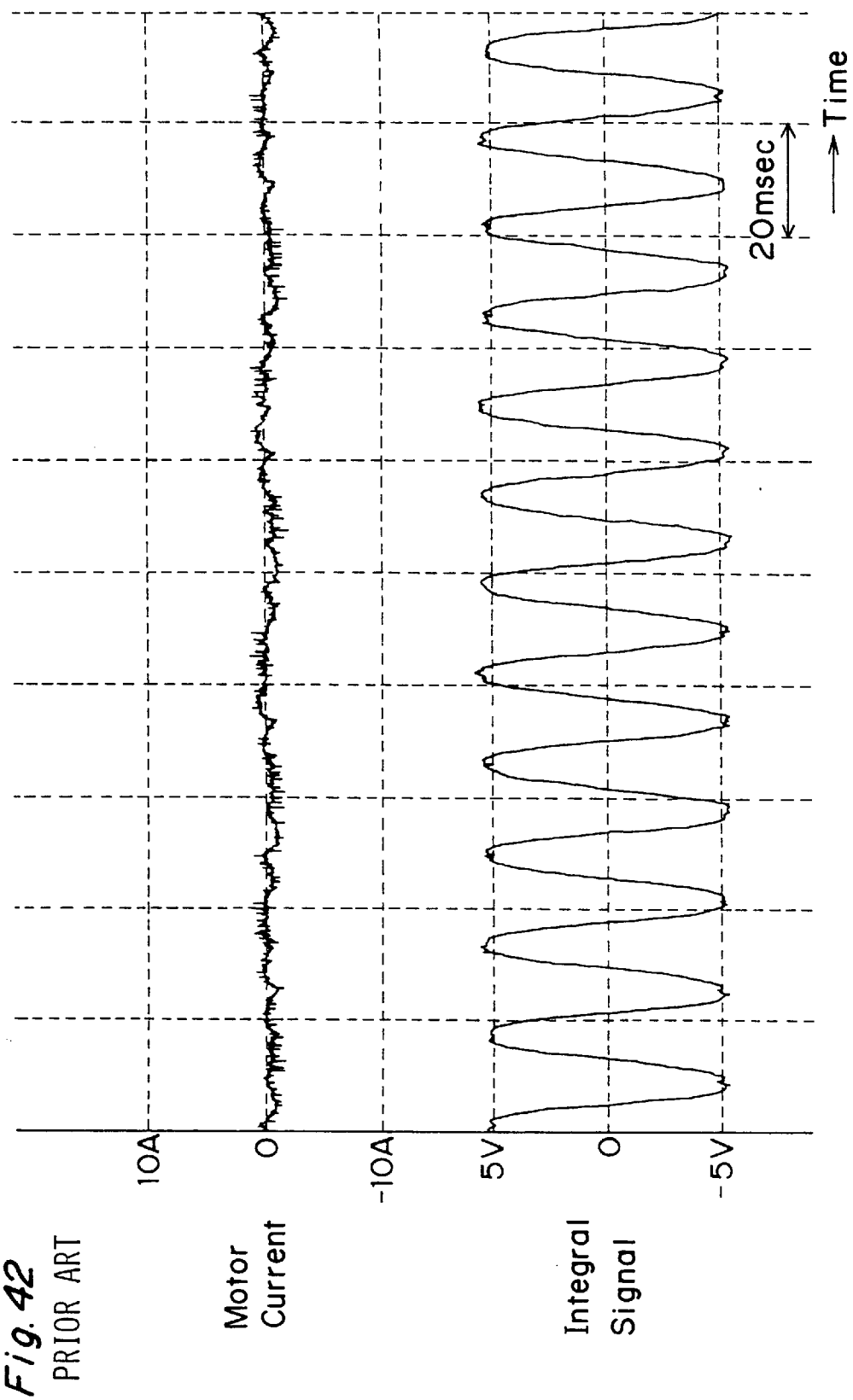
FIG. 42 is a chart showing waveforms of the motor current and the integral signal when the inverter frequency is 20 Hz and the inverter output voltage is 15 V in the prior art brushless DC motor system of FIG. 35.
Figure 43:
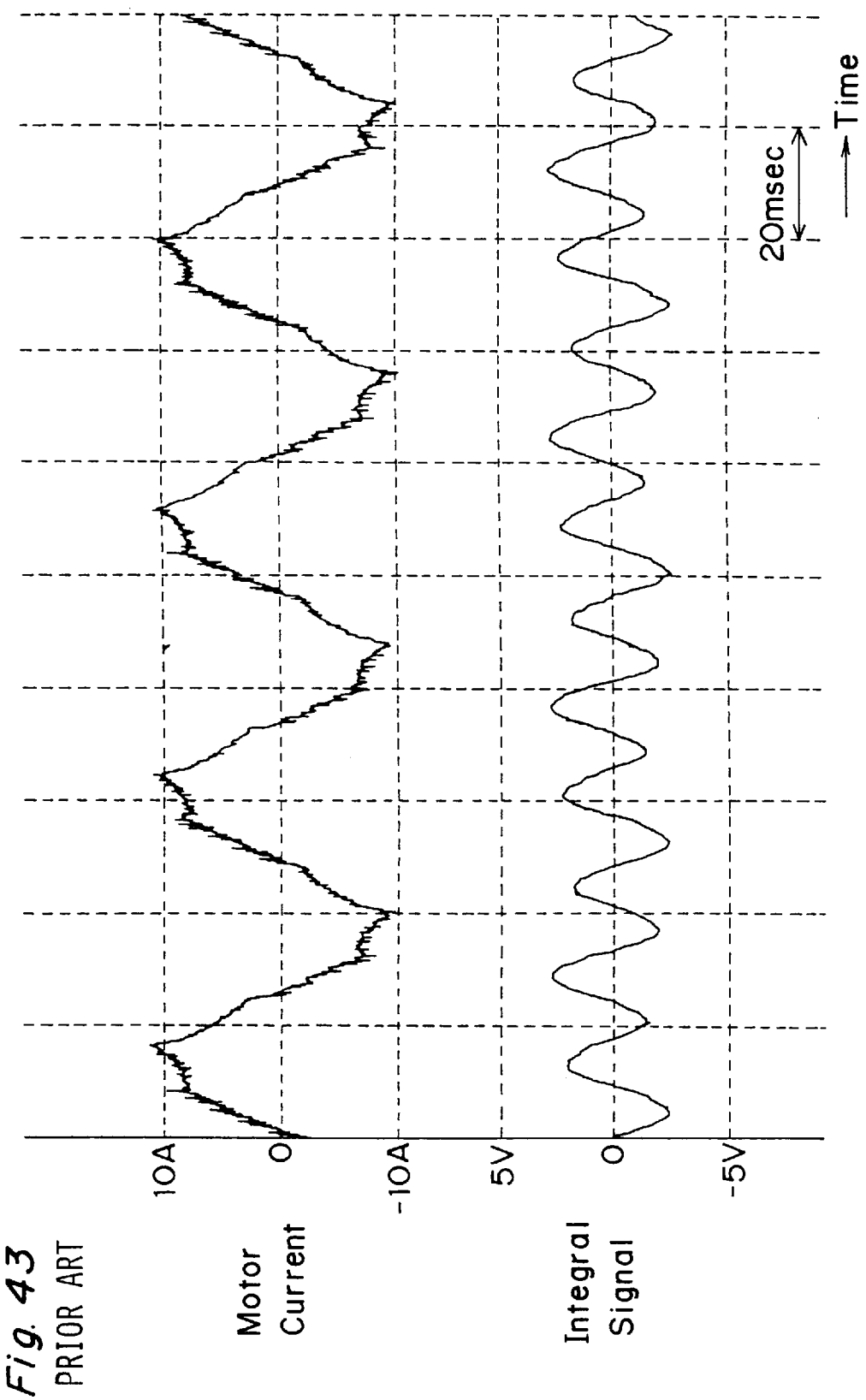
FIG. 43 is a chart showing waveforms of the motor current and the integral signal when the inverter frequency is 20 Hz and the inverter output voltage is 27 V in the prior art brushless DC motor system of FIG. 35.
Figure 44:
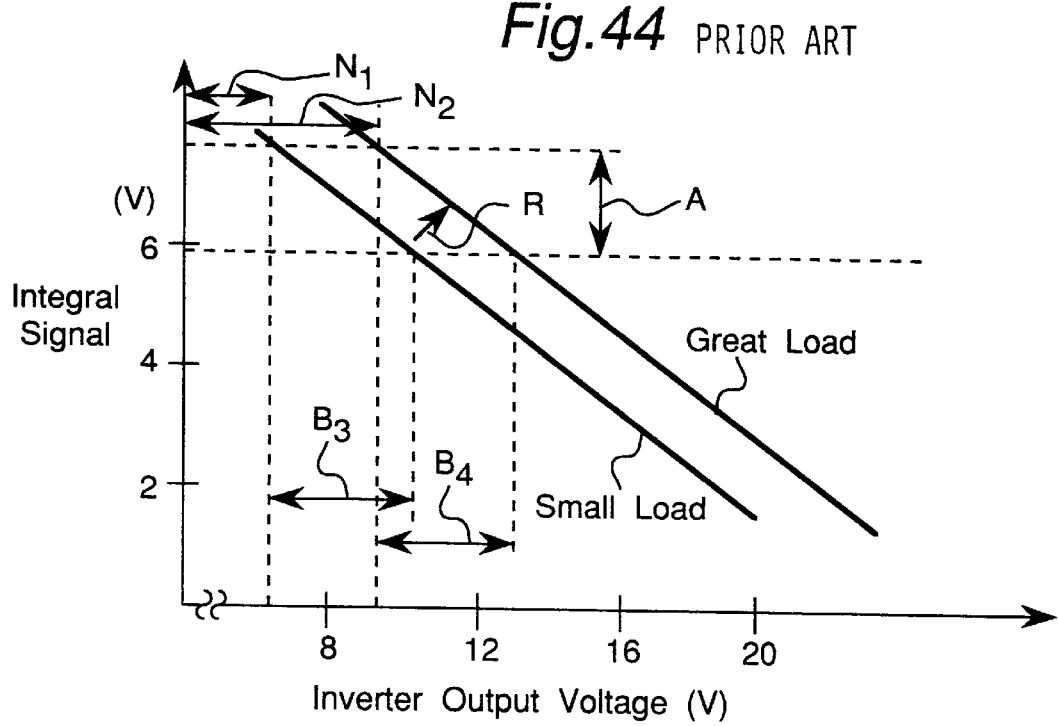
FIG. 44 is a graph showing a voltage characteristic of the integral signal relative to the inverter output voltage depending on the magnitude of load in the prior art brushless DC motor system of FIG. 35.
Figure 45:
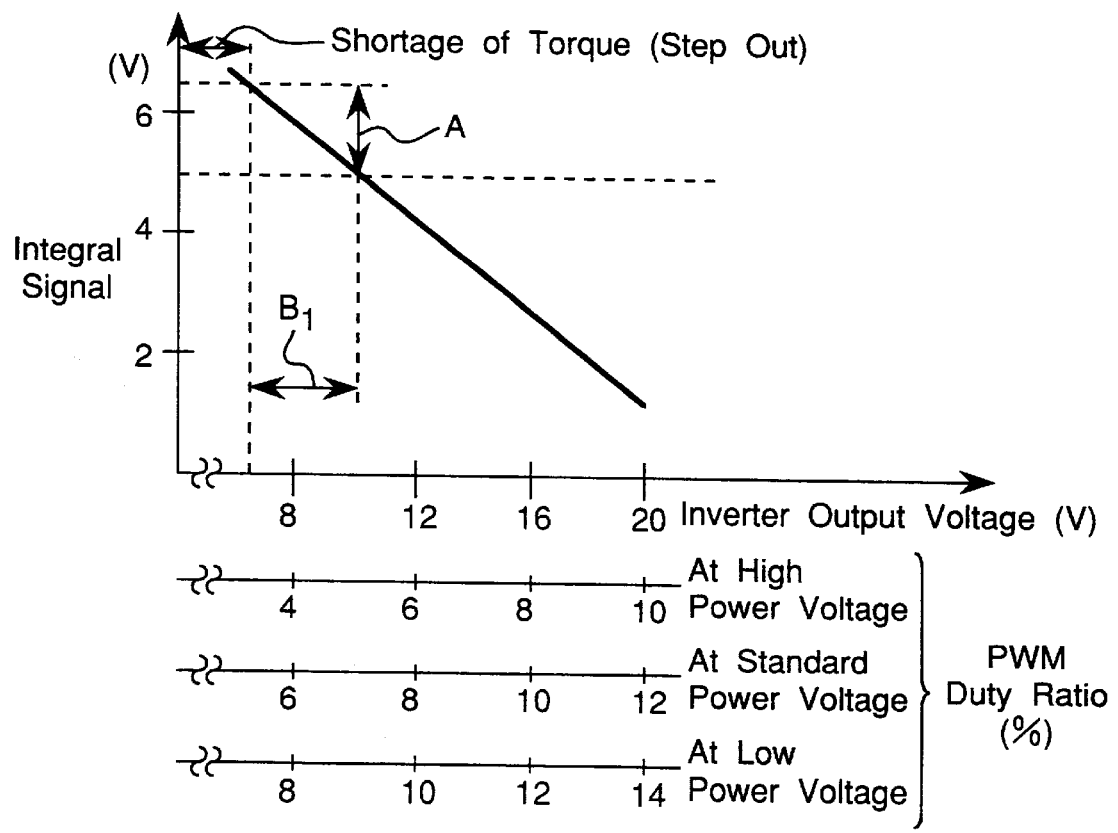
FIG. 45 is a graph showing the voltage characteristic of the integral signal relative to the inverter output voltage and a duty ratio of PWM of a switching signal when a power voltage fluctuates with respect to the inverter output voltage in the prior art brushless DC motor system of FIG. 35.

When the counting of the phase correction timer T2 started in the interrupt handling 32 is completed, the phase correction timer T2 outputs the interrupt signal IRQ2 and an interrupt handling 33 shown in FIG. 34 is executed every time the interrupt signal IRQ2 is generated.

That is, when the phase correction timer T2 completes the counting and outputs the interrupt signal IRQ2, the interrupt handling 33 starts. The inverter mode selector 53 advances the inverter mode by one step at step S441, and outputs a voltage pattern at step S442 to end the interrupt handling 33.

As described above, the hysteresis comparator 38 of the rotational-position sensor 110 detects the position signal, and compares the integral signal $\int V_{MN} dt$ from the integrator 32 with the reference values $E_6$ and $E_7$ based on the hysteresis characteristic of the hysteresis comparator 38 so as to output the "position signal+level detection signal". When the absolute value of the difference between the value of the cycle of the "position signal+level detection signal" (value based on the cycle signal from the position signal cycle calculator 45) and the value corresponding to the cycle of the position signal based on the frequency of the inverter output (value to be set in the waveform timer T4) is not greater than a specified value, it is decided that the voltage difference signal $V_{MN}$ is not smaller than a specified value and thus it is decided that the position signal based on the voltage difference signal $V_{MN}$ is stable. Furthermore, since the rotational-position sensor 110 is provided with the hysteresis comparator 38 having the function of the level detector of the aforementioned first, second, third and fourth embodiments, there is no need to provide another level detector, allowing a cost reduction to be achieved.

The voltage pattern switching system of the armature coils 1a, 1b and 1c is implemented by the 180° energizing system in the first, second, third, fourth and fifth embodiments. However, the voltage pattern switching is not limited to the 180° system, and it may be a energizing system of 120° to 180°.

Furthermore, in the above embodiments, by using the cycle measuring timer T3 and the position signal cycle calculator 45 as the means for measuring the cycle of the position signal, and the time (60 degrees in phase angle) from a leading edge to a trailing edge or from a trailing edge to a leading edge of the position signal is counted so as to measure the cycle of the voltage pattern from the timer value. However, the present invention is not limited to this, and it is acceptable to measure a time (120 degrees in phase angle) from a leading edge to the next leading edge or from a trailing edge to the next trailing edge of the position signal so as to measure the cycle of the voltage pattern.

Furthermore, in the above embodiments the microcomputers 4, 14, 24 and 120 are used, however, an equivalent construction may be implemented by a logic circuit or the like instead of each of the microcomputers.

Furthermore, in the above embodiments, the synchronous operation for increasing the voltage and frequency of the inverter output of the inverter section 20 in the stage of starting is effected according to a linear pattern as shown in FIGS. 11 and 12. Alternatively, the voltage and frequency of the inverter output may be increased according to a curve pattern. Furthermore, the voltage and the frequency of the inverter output may be constant. Furthermore, either of the voltage and the frequency of the inverter output may be increased, and the other may be constant.

Furthermore, in the above embodiments, each of the V/F pattern setting sections 44, 64, 105 and 114 uses the V/F pattern data preparatorily stored in the table. However, the V/F pattern data may be calculated each time according to an operation expression.

Furthermore, in the above embodiments, the inverter voltage is lowered until it is decided that the voltage difference signal is stabilized. However, it is acceptable to increase the frequency so that a ratio V/F of the voltage V to the frequency F of the inverter output is reduced, i.e., with the inverter voltage constant. Furthermore, it is also acceptable to lower the voltage and increase the frequency.

Furthermore, upon receiving the integral signal from the integrator 32 of the rotational-position sensor 3, each of the level detectors 34, 35 and 36 outputs a level detection signal. However, the level decision means may decide whether or not the voltage difference between the neutral point of the armature coils and the neutral point of the resistor circuit is not smaller than a specified value.

Furthermore, in the first embodiment, it is compared whether or not coincidence of the point of change of the inverter mode and the H- and L-levels of the position signal continuously occurs, in the mode comparing section 42 which serves as position signal mode comparing means for comparing the position signal of the rotational-position sensor 3 with the inverter mode of the inverter mode selector 53. However, the position signal comparing means is not limited to this, and it is acceptable to compare whether or not the difference between the point of change of the inverter mode and the point of change of the position signal is within a specified range.

Furthermore, the full-wave rectifier circuit 15 is used as a rectifying means in the first embodiment. However, the rectifying means is not limited to this, and it is acceptable to use a half-wave rectifier circuit.

Furthermore, the full-wave rectifier circuit 15 serving as rectifying means, the smoothing circuit 16 serving as smoothing means and the comparator circuit 17 serving as smoothed signal comparing means are used in the first embodiment. The present invention is not limited to this, and it is acceptable to constitute the rectifying means, the smoothing means and the smoothed signal comparing means by a digital circuit, subject the aforementioned integral signal to an analog-to-digital conversion process, and thereafter obtain the level detection signal through a digital calculation.

Furthermore, in the second and third embodiments, it is decided whether or not the integral signal $\int V_{MN} dt$ exceeds the reference values $E_1$, $E_2$ or the reference value $E_3$ every half wave of the integral signal $\int V_{MN} dt$. However, it is acceptable to subject the integral signal to half-wave rectification and decide whether or not only the half wave of the half-wave rectified integral signal is exceeding the reference value $E_3$. Otherwise, it is acceptable to provide either one of the reference values $E_1$ and $E_2$ and decide whether or not the integral signal $\int V_{MN} dt$ is exceeding the reference value $E_1$ or $E_2$.

Furthermore, in the second and third embodiments, the level decision flag is set in the level detector control section 60 based on the level detection signal from each of the comparator circuits 18 and 19 which serve as the voltage difference signal comparing means, and the counting section 61*a* of the voltage difference signal level deciding section 61 counts the number of continuously repeated events in which the level decision flag is set.

However, the present invention is not limited to this, and the level decision means may decide that the voltage difference is not smaller than a specified value when the pulse width or the frequency of the output signal of the voltage difference signal comparing means has a specified pattern.

Furthermore, the integrator 32 is implemented by an integrator comprised of a capacitor and a resistor. However, it is acceptable to use an integrator constituting a first order lag circuit using an operational amplifier and amplify the integral signal. In this case, the integral signal is sufficiently amplified, and therefore an amount of tolerance to noise is increased advantageously.

Furthermore, in the rotational-position sensor 3, the differential amplifier 31 is arranged in the first stage and the integrator 32 is arranged in the second stage. However, the above-mentioned construction is not limitative, and it is acceptable to arrange the integrator 32 in the first stage and arrange differential amplifier 31 in the second stage. When an operational amplifier is used for the integrator 32 in the first stage, the differential amplifier 31 will not be necessary.

Furthermore, the differential amplifier 31 is implemented by a non-inverted amplifier circuit for the sake of simplification of the circuit, and the voltage at the neutral point of the resistor circuit 2 connected in a three-phase star configuration is inputted to the non-invented input terminal of the IC1, using the neutral point of the armature coils 1*a*, 1*b* and 1*c* made to serve as the ground GND. However, it is acceptable to input the voltage $V_N$ at the neutral point of the armature coils 1*a*, 1*b* and 1*c* and the voltage $V_M$ at the neutral point of the resistor circuit 2 connected in a three-phase star configuration to a differential input subtracting circuit, using the emitter side of the transistors 20*d*, 20*e* and 20*f* of the inverter section 20 made to serve as the ground GND.

INDUSTRIAL APPLICABILITY

The brushless DC motors according to the present invention are suited for use in household electrical appliances such as inverter air conditioners and other air conditioners, electric washers, and vacuum cleaners.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein said decision means includes level decision means for deciding whether the voltage difference between the neutral point of the armature coils and the neutral point of the resistor circuit is greater than or equal to a specified value, and if so decides that the position sensing operating mode can be effected;

wherein said level decision means includes; rectifying means for rectifying a signal representing the voltage difference between the neutral point of the armature coils, smoothing means for smoothing a rectified signal from said rectifying means, and smoothed signal comparing means for comparing a smoothed signal from said smoothing means with a specified reference value ($E_0$), and wherein, when the smoothed signal exceeds the reference value, ($E_0$), said level decision means indicates that the position sensing operation mode can be effected.

2. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein said decision means includes level decision means for deciding whether the voltage difference between the neutral point of the armature coils and the neutral point of the resistor circuit is greater than or equal to a specified value, and if so decides that the position sensing operating mode can be effected;

wherein said level decision means includes voltage difference signal comparing means for comparing the signal representing the voltage difference between the neutral point of the armature coils and the neutral point of the resistor circuit with specified reference values, and decides, when an output signal of said voltage difference signal comparing means obtained by comparing the voltage difference signal with the reference values has a specified pattern, that the voltage difference is greater than or equal to the specified value.

3. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein said decision means includes level decision means for deciding whether the voltage difference between the neutral point of the armature coils and the neutral point of the resistor circuit is greater than or equal to a specified value, and if so decides that the position sensing operating mode can be effected;

wherein said level decision means decides when an output signal of a hysteresis comparator obtained by comparing the signal representing the voltage difference between the neutral point of the armature coils and the neutral point of the resistor circuit with specified reference values based on a hysteresis characteristic of the hysteresis comparator has a specified pattern, that the voltage difference is greater than or equal to the specified value.

4. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein said decision means includes position signal mode comparing means for comparing the position signal from the rotational-position sensing means with the inverter output of the inverter section to decide whether the position signal and the inverter output have a specified relation, and decides when said position signal mode comparing means compares the position signal with the inverter output and consequently the position signal and the inverter output have the specified relation, that the position sensing operating mode can be effected.

5. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein said decision means includes position signal cycle comparing means for comparing an absolute value of a difference between a value of a position signal cycle and a value corresponding to a position signal cycle based on a frequency of the inverter output with a specified value for deciding whether the absolute value is less than or equal to the specified value, and decides, when the position signal cycle comparing means decides that the absolute value of the difference between the value of the position signal cycle and the value corresponding to the position signal cycle based on the frequency of the inverter output is less than or equal to the specified value, that the position sensing operating mode can be effected.

6. The brushless DC motor system according to claim 5, wherein the rotational-position sensing means includes;

voltage difference detecting means for detecting the voltage difference between the neutral point of the armature coils and the neutral point of the resistor circuit to output a voltage difference signal, integration means for integrating the voltage difference signal from said voltage difference detecting means to output an integral signal, and a hysteresis comparator which has a hysteresis characteristic and compares the integral signal from said integration means with specified reference values to output the position signal.

7. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein said decision means includes at least two of;

level decision means for deciding whether the voltage difference between the neutral point of the armature coils and the neutral point of the resistor circuit is greater than or equal to a specified value, and indicating when the voltage difference is greater than or equal to the specified value, that the position sensing operating mode can be effected, position signal mode comparing means for comparing the position signal from the rotational-position sensing means with the inverter output of the inverter section to decide whether the position signal and the inverter output have a specified relation, and indicating, when the position signal and the inverter output have the specified relation, that the position sensing operating mode can be effected, and position signal cycle comparing means for comparing an absolute value of a difference between a value of a position signal cycle and a value corresponding to a position signal cycle based on a frequency of the inverter output with a specified value, and indicating, when the absolute value of the difference between the value of the cycle of the position signal and the value corresponding to the cycle of the position signal based on the frequency of the inverter output is less than or equal to the specified value, that the position sensing operating mode can be effected.

8. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein the voltage and the frequency of the inverter output is generated based on the specified pattern of said synchronous operation control means, and, when said decision means decides that the position sensing operating mode cannot be effected, said synchronous operation control means reduces the ratio V/F of the voltage V to the frequency F of the inverter output until said decision means decides that the position sensing operating mode can be effected;

wherein said decision means includes position signal mode comparing means for comparing the position signal from the rotational-position sensing means with the inverter output of the inverter section to decide whether the position signal and the inverter output have a specified relation, and deciding, when the position signal and the inverter output have the specified relation, that the position sensing operating mode can be effected.

9. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein the voltage and the frequency of the inverter output is generated based on the specified pattern of said synchronous operation control means, and, when said decision means decides that the position sensing operating mode cannot be effected, said synchronous operation control means reduces the ratio V/F of the voltage V to the frequency F of the inverter output until said decision means decides that the position sensing operating mode can be effected;

wherein said decision means includes position signal cycle comparing means for comparing an absolute value of a difference between a value of a position signal cycle and a value corresponding to a position signal cycle based on a frequency of the inverter output with a specified value to decide whether the absolute value is less than or equal to the specified value, and decides, when the absolute value of the difference between the value of the position signal cycle and the value corresponding to the position signal cycle based on the frequency of the inverter output is less than or equal to the specified value, that the position sensing operating mode can be effected.

10. A brushless DC motor system including a rotor having a multipolar magnet, a stator having armature coils connected in a three-phase star configuration, a resistor circuit connected in a three-phase star configuration in parallel with the armature coils, a rotational-position sensing means which detects a rotational position of the rotor relative to the stator based on a voltage difference between a neutral point of the armature coils and a neutral point of the resistor circuit to output a position signal, and an inverter section which switches a voltage pattern of the armature coils based on the position signal from the rotational-position sensing means, the brushless DC motor system comprising:

synchronous operation control means for outputting a voltage and a frequency of an inverter output of the inverter section based on a specified pattern for a starting stage during a synchronous operating mode;

position sensing operation control means for controlling the inverter output of the inverter section based on the position signal from the rotational-position sensing means during a position sensing operating mode;

decision means for deciding, during synchronous operating mode, whether the Position sensing operating mode which uses the position signal from the rotational-position sensing means can be effected; and operation switching means for switching control means of the inverter section from said synchronous operation control means to said position sensing operation control means when said decision means decides that the position sensing operating mode can be effected;

wherein the voltage and the frequency of the inverter output is generated based on the specified pattern of said synchronous operation control means, and, when said decision means decides that the position sensing operating mode cannot be effected, said synchronous operation control means reduces the ratio V/F of the voltage V to the frequency F of the inverter output until said decision means decides that the position sensing operating mode can be effected;

wherein said decision means includes at least two of;

level decision means for deciding whether the voltage difference between the neutral point of the armature coils and the neutral point of the resistor circuit is greater than or equal to a specified value, and indicating, when the voltage difference is greater than or equal to the specified value, that the position sensing operating mode can be effected, position signal mode comparing means for comparing the position signal from the rotational-position sensing means with the inverter output of the inverter section to decide whether the position signal and the inverter output have a specified relation, and indicating, when the position signal and the inverter output have the specified relation, that the position sensing operating mode can be effected, and position signal cycle comparing means for comparing an absolute value of a difference between a value of a position signal cycle and a value corresponding to a position signal cycle based on a frequency of the inverter output with a specified value, and indicating, when the absolute value of the difference between the value of the position signal cycle and the value corresponding to the position signal cycle based on the frequency of the inverter output is less than or equal to the specified value, that the position sensing operating mode can be effected.

* * * * *